US012465646B2

(12) United States Patent
Raz et al.

(10) Patent No.: US 12,465,646 B2
(45) Date of Patent: Nov. 11, 2025

(54) LINKERS

(71) Applicants: Oxford University Innovation Limited, Oxford (GB); United Kingdom Research and Innovation, Swindon (GB)

(72) Inventors: Richard Raz, London (GB); Matthew Wood, Oxford (GB); Caroline Godfrey, Wolvercote (GB); Graham McClorey, Oxford (GB); Subhashis Banerjee, Kolkata (IN); Michael Gait, Cambridge (GB); Miguel Varela, Oxford (GB); Ashling Holland, Oxford (GB)

(73) Assignees: Oxford University Innovation Limited, Oxford (GB); United Kingdom Research and Innovation, Swindon (GB)

( * ) Notice: Subject to any disclaimer, the term of this patent is extended or adjusted under 35 U.S.C. 154(b) by 975 days.

(21) Appl. No.: 17/311,062

(22) PCT Filed: Dec. 6, 2019

(86) PCT No.: PCT/GB2019/053445
§ 371 (c)(1),
(2) Date: Jun. 4, 2021

(87) PCT Pub. No.: WO2020/115494
PCT Pub. Date: Jun. 11, 2020

(65) Prior Publication Data
US 2022/0125934 A1    Apr. 28, 2022

(30) Foreign Application Priority Data
Dec. 7, 2018 (GB) ..................................... 1820020
Aug. 9, 2019 (GB) ..................................... 1911405

(51) Int. Cl.
*A61K 47/54* (2017.01)
*A61K 47/64* (2017.01)

(52) U.S. Cl.
CPC ............ *A61K 47/542* (2017.08); *A61K 47/64* (2017.08); *A61K 47/645* (2017.08)

(58) Field of Classification Search
CPC ............ A61K 31/5377; A61K 31/7088; A61K 31/712; A61K 31/7125; A61K 47/64; A61K 47/6455; A61K 47/542; A61K 47/645; A61K 47/183
See application file for complete search history.

(56) References Cited

U.S. PATENT DOCUMENTS

| 7,807,816 | B2 | 10/2010 | Wilton et al. |
|---|---|---|---|
| 7,838,657 | B2 | 11/2010 | Singh et al. |
| 8,324,371 | B2 | 12/2012 | Popplewell et al. |
| 8,361,979 | B2 | 1/2013 | Aartsma-Rus et al. |
| 8,575,305 | B2 | 11/2013 | Gait et al. |
| 8,637,483 | B2 | 1/2014 | Wilton et al. |
| 8,741,863 | B2 | 6/2014 | Moulton et al. |
| 8,835,402 | B2 | 9/2014 | Kole et al. |
| 9,018,368 | B2 | 4/2015 | Wilton et al. |
| 9,079,934 | B2 | 7/2015 | Watanabe et al. |
| 9,161,948 | B2 | 10/2015 | Hanson |
| 9,238,052 | B2 | 1/2016 | Kameyama et al. |
| 9,302,014 | B2 | 4/2016 | Gait et al. |
| 9,447,417 | B2 | 9/2016 | Sazani et al. |
| 9,528,109 | B2 | 12/2016 | De Kimpe et al. |
| 9,582,637 | B1 | 2/2017 | Fernandez et al. |
| 9,926,557 | B2 | 3/2018 | De Kimpe et al. |
| 10,160,969 | B2 | 12/2018 | Meena et al. |
| 10,385,092 | B2 | 8/2019 | Watanabe et al. |
| 10,781,450 | B2 | 9/2020 | Wilton et al. |
| 10,876,114 | B2 | 12/2020 | Van Deutekom |
| 12,268,749 | B2 | 4/2025 | Wood et al. |
| 2008/0306001 | A1 | 12/2008 | Liik et al. |
| 2010/0016215 | A1 | 1/2010 | Moulton et al. |
| 2011/0105403 | A1 | 5/2011 | Gait et al. |
| 2011/0269665 | A1 | 11/2011 | Kole |
| 2012/0289457 | A1 | 11/2012 | Hanson |
| 2014/0051646 | A1 | 2/2014 | Gait et al. |
| 2014/0315977 | A1 | 10/2014 | Bestwick et al. |
| 2014/0342992 | A1* | 11/2014 | Gait ................. C12N 15/00 |

(Continued)

FOREIGN PATENT DOCUMENTS

| CN | 103619356 A | 3/2014 |
|---|---|---|
| CN | 103998458 A | 8/2014 |

(Continued)

OTHER PUBLICATIONS

Cell-Penetrating Peptides: Design, Synthesis, and Applications Dana Maria Copolovici, Kent Langel, Elo Eriste, and Ülo Langel ACS Nano 2014 8 (3), 1972-1994 DOI: 10.1021/nn4057269 (Year: 2014).*
"Peptide Design," ThermoFisher Scientific, <https://www.thermofisher.com/us/en/home/life-science/protein-biology/protein-biology-learning-center/protein-biology-resource-library/pierce-protein-methods/peptide-design.html>, retrieved on Oct. 18, 2022 (9 pages).
Ablan et al., "Charge Distribution Fine-Tunes the Translocation of [alpha]-Helical Amphipathic Peptides across Membranes," Biophys J. 111(8):1738-49 (2016).
Amantana et al., "Pharmacokinetics, biodistribution, stability and toxicity of a cell-penetrating peptide-morpholino oligomer conjugate," Bioconjug Chem. 18(4): 1325-31 (Jun. 2007).
Bahal et al., "In vivo correction of anaemia in beta-thalassemic mice by gammaPNA-mediated gene editing with nanoparticle delivery," Nature Communications, 7:13304 (2016) (14 pages).

(Continued)

*Primary Examiner* — Jeanette M Lieb
*Assistant Examiner* — David Paul Bowles
(74) *Attorney, Agent, or Firm* — Clark & Elbing LLP

(57) ABSTRACT

The present invention relates to linkers for connecting a carrier molecule to a therapeutic molecule to form a conjugate, in particular linkers formed of amino acids such as glutamic acid, succinic acid, and gamma-aminobutyric acid. The present invention further relates to a conjugate comprising a linker of the invention, and the use of the conjugate in the treatment of various diseases.

8 Claims, 17 Drawing Sheets

Specification includes a Sequence Listing.

(56) References Cited

U.S. PATENT DOCUMENTS

| | | |
|---|---|---|
| 2015/0183827 A1 | 7/2015 | Milletti |
| 2015/0238627 A1 | 8/2015 | Leger et al. |
| 2015/0246958 A1* | 9/2015 | Han .................. A61K 47/60 514/1.3 |
| 2016/0237426 A1 | 8/2016 | Hanson |
| 2019/0177723 A1 | 6/2019 | Dickson |
| 2019/0241892 A1 | 8/2019 | Van Deutekom |
| 2020/0131231 A1 | 4/2020 | Wood et al. |
| 2021/0024922 A1* | 1/2021 | Zain-Luqman ...... C12N 15/113 |
| 2021/0299263 A1 | 9/2021 | Wood et al. |
| 2021/0299264 A1 | 9/2021 | Wood et al. |
| 2021/0388353 A1 | 12/2021 | Popplewell et al. |
| 2022/0041662 A1 | 2/2022 | Wood et al. |
| 2022/0090066 A1 | 3/2022 | Wood et al. |
| 2022/0275372 A1* | 9/2022 | Wood .................. A61P 25/28 |
| 2022/0288218 A1 | 9/2022 | Yokota et al. |
| 2024/0189434 A1 | 6/2024 | Godfrey et al. |
| 2024/0200062 A1 | 6/2024 | Godfrey et al. |
| 2024/0299563 A1 | 9/2024 | Wood et al. |
| 2025/0177543 A1 | 6/2025 | Wood et al. |

FOREIGN PATENT DOCUMENTS

| | | |
|---|---|---|
| CN | 104837997 A | 8/2015 |
| EP | 2394665 A1 | 12/2011 |
| EP | 3034074 A1 | 6/2016 |
| EP | 2344637 B2 | 2/2018 |
| EP | 3443976 A1 | 2/2019 |
| EP | 3031920 B1 | 8/2019 |
| GB | 2563964 A | 1/2019 |
| JP | 2006-514602 A | 5/2006 |
| JP | 2007-509978 A | 4/2007 |
| JP | 2009-544749 A | 12/2009 |
| JP | 2011-523557 A | 8/2011 |
| JP | 2013-531988 A | 8/2013 |
| JP | 2014-515762 A | 7/2014 |
| JP | 2014-526238 A | 10/2014 |
| JP | 2015-522264 A | 8/2015 |
| JP | 2018-532695 A | 11/2018 |
| RU | 2556800 C2 | 7/2015 |
| WO | WO-1999/67284 A2 | 12/1999 |
| WO | WO-2000/39139 A1 | 7/2000 |
| WO | WO-2003/106491 A2 | 12/2003 |
| WO | WO-2004/097017 A2 | 11/2004 |
| WO | WO-2005/042539 A1 | 5/2005 |
| WO | WO-2006/000057 A1 | 1/2006 |
| WO | WO-2008/012365 A2 | 1/2008 |
| WO | WO-2008/109105 A2 | 9/2008 |
| WO | WO-2009/005793 A2 | 1/2009 |
| WO | WO-2009/144481 A2 | 12/2009 |
| WO | WO-2009/147368 A1 | 12/2009 |
| WO | WO-2011/157713 A2 | 12/2011 |
| WO | WO-2012012443 A2 | 1/2012 |
| WO | WO-2012/072088 A1 | 6/2012 |
| WO | WO-2012/090150 A2 | 7/2012 |
| WO | WO-2012/150960 A1 | 11/2012 |
| WO | WO-2013/030569 A2 | 3/2013 |
| WO | WO-2013/040429 A1 | 3/2013 |
| WO | WO-2014/001229 A2 | 1/2014 |
| WO | WO-2014/041505 A1 | 3/2014 |
| WO | WO-2014/043544 A1 | 3/2014 |
| WO | WO-2014/052276 A1 | 4/2014 |
| WO | WO-2015/022504 A2 | 2/2015 |
| WO | WO-2015/113922 A1 | 8/2015 |
| WO | WO-2015/155753 A2 | 10/2015 |
| WO | WO-2015/161255 A1 | 10/2015 |
| WO | WO-2016/028187 A1 | 2/2016 |
| WO | WO-2016/154328 A2 | 9/2016 |
| WO | WO-2017/027848 A2 | 2/2017 |
| WO | WO-2018/017190 A2 | 1/2018 |
| WO | WO-2018/053316 A1 | 3/2018 |
| WO | WO-2019/067975 A1 | 4/2019 |
| WO | WO-2019/067979 A1 | 4/2019 |
| WO | WO-2019/067981 A1 | 4/2019 |
| WO | WO-2020/030927 A1 | 2/2020 |
| WO | WO-2020/030928 A1 | 2/2020 |
| WO | WO-2020/115494 A1 | 6/2020 |
| WO | WO-2020/214763 A1 | 10/2020 |
| WO | WO-2020/257489 A1 | 12/2020 |
| WO | WO-2021/003573 A1 | 1/2021 |
| WO | WO-2021/028666 A1 | 2/2021 |
| WO | WO-2022/172019 A1 | 8/2022 |
| WO | WO-2022/192749 A2 | 9/2022 |
| WO | WO-2022/192754 A2 | 9/2022 |

OTHER PUBLICATIONS

Chan et al., "The complexity of antisense transcription revealed by the study of developing male germ cells," Genomics. 87(6):681-92 (2006).
Dutot et al., "Glycosylated cell penetrating peptides and their conjugates to a proapoptotic peptide: Preparation by click chemistry and cell viability studies," Journal of Chemical Biology, 3(2):51-65 (2010).
Dyson et al. "Himiâ sinteticeskih lekarstvennyh vesestv," Chemistry of Synthetic Drugs. (1964) (9 pages).
Egleton et al., "Improved bioavailability to the brain of glycosylated Met-enkephalin analogs," Brain Research, 881 (1):37-46 (2000).
Futaki et al., "Translocation of branched chain arginine peptides through cell membranes: Flexibility in the spatial disposition of positive charges in membrane-permeable peptides," Biochemistry, 41(25):7926-7930 (2002).
González-Barriga et al., "Design and analysis of effects of triplet repeat oligonucleotides in cell models for myotonic dystrophy," Mol Ther Nucleic Acids. 2(3): 1-12 (Mar. 2013).
Hammond et al., "Systemic peptide-mediated oligonucleotide therapy improves long-term survival in spinal muscular atrophy," PNAS, 113(39):10962-10967 (2016).
Ibraheem et al., "Gene therapy and DNA delivery systems," Int J Pharm. 459(1-2): 70-83 (Jan. 2014).
Jahn et al., "How to systematically evaluate immunogenicity of therapeutic proteins—regulatory considerations," N Biotechnol. 25(5):280-6 (2009).
Kalafatovic et al., "Cell-Penetrating Peptides: Design Strategies beyond Primary Structure and Amphipathicity," Molecules. 22(11):1929 (2017) (38 pages).
Kontermann et al., "Bispecific antibodies," Drug Discov Today. 20(7):838-47 (Jul. 2015) (12 pages).
Kuznetsova, "Brackets in text of a legal document as a linguistic and cognitive phenomenon," Vestnik MGOU. N3:37-43 (2015).
Lapidot et al., "Genome-wide natural antisense transcription: coupling its regulation to its different regulatory mechanisms," EMBO Rep. 7(12):1216-22 (2006).
Lécorché et al., "Cellular uptake and biophysical properties of galactose and/or tryptophan containing cell-penetrating peptides," Biochimica et Biophysica Acta, 1818(3):448-457 (2012).
Milletti, "Cell-penetrating peptides: classes, origin, and current landscape," Drug Discov Today. 17(15-16):850-860 (2012).
Nan et al., "Antisense Phosphorodiamidate Morpholino Oligomers as Novel Antiviral Compounds," Front Microbiol. 9: 1-15 (Apr. 2018).
Osman et al., "Morpholino antisense oligonucleotides targeting intronic repressor Element1 improve phenotype in SMA mouse models," Human Molecular Genetics, 23(18):4832-4845 (2014).
Pinto et al., "Impeding Transcription of Expanded Microsatellite Repeats by Deactivated Cas9," Mol Cell. 68(3): 479-490 (Nov. 2017).
Pokrovskij V. I. "Populârnaâ medicinskaâ enciklopediâ [Popular Medical Encyclopedia]," Ul'ânovsk "Knigocej", 4th ed., 1997, p. 317 (drugs) (2 pages).
Rothbard et al., "Arginine-rich molecular transporters for drug delivery: Role of backbone spacing in cellular uptake," Journal of Medicinal Chemistry, 45(17):3612-8 (2002).
Rydberg et al. "Effects of Tryptophan Content and Backbone Spacing on the Uptake Efficiency of Cell-Penetrating Peptides," Biochemistry. 51(27):5531-5539 (Jun. 28, 2021) (9 pages).

(56) References Cited

OTHER PUBLICATIONS

Rydberg et al., "Effects of tryptophan content and backbone spacing on the uptake efficiency of cell-penetrating peptides," Biophysical Journal, Board B253. 102(3):487a (2012).
Shabanpoor et al., "Bi-specific splice-switching PMO oligonucleotides conjugated via a single peptide active in a mouse model of Duchenne muscular dystrophy," Nucleic Acids Res. 43(1):29-39 (2015).
Shabanpoor et al., "Development of a general methodology for labelling peptide-morpholino oligonucleotide conjugates using alkyne-azide click chemistry," Chem Commun (Camb). 49(87):10260-2 (2013) (9 pages).
Shabanpoor et al., "Identification of a peptide for systemic brain delivery of a morpholino oligonucleotide in mouse models of spinal muscular atrophy," Nucleic Acid Therapeutics. 27(3):130-143 (2017) (15 pages).
Shen et al., "Single variable domain-IgG fusion. A novel recombinant approach to Fc domain-containing bispecific antibodies," J Biol Chem. 281(16):10706-14 (2006).
Swenson et al., "Chemical modifications of antisense morpholino oligomers enhance their efficacy against Ebola virus infection," Antimicrob Agents Chemother. 53(5): 2089-99 (May 2015).
Torres et al., "The immunoglobulin constant region contributes to affinity and specificity," Trends Immunol. 29(2):91-7 (2008).
Wermuth et al., "Glossary of terms used in medicinal chemistry," Pure & Appl. Chem. 70(5):1129-43 (1998).
Witt et al., "Peptide drug modifications to enhance bioavailability and blood-brain barrier permeability," Peptides. 22(12):2329-2343 (2001).
Wu et al., "Long-term rescue of dystrophin expression and improvement in muscle pathology and function in dystrophic mdx mice by peptide-conjugated morpholino," Am J Pathol. 181(2): 392-400. (Aug. 2012).
Yin et al., "Pip5 Transduction Peptides Direct High Efficiency Oligonucleotide-mediated Dystrophin Exon Skipping in Heart and Phenotypic Correction in mdx Mice," Molecular Therapy, 19(7):1295-1303 (2011).
Zhou et al., "A Novel Morpholino Oligomer Targeting ISS-N1 Improves Rescue of Severe Spinal Muscular Atrophy Transgenic Mice," Human Gene Therapy. 24(3):331-342 (2013).
Zorko et al., "Cell-penetrating peptides: mechanism and kinetics of cargo delivery," Adv Drug Deliv Rev. 57(4):529-45 (2005).
Rîháček et al. [New Indings in Methotrexate Pharmacology—Diagnostic Possibilities and Impact on Clinical Care] Klin Onkol. 2015;28(3):163-70. doi: 10.14735/amko2015163. (abstract only).
Betts et al., "Pip6-PMO, A New Generation of Peptide-oligonucleotide Conjugates With Improved Cardiac Exon Skipping Activity for DMD Treatment," Molecular Therapy-Nucleic Acids, 1(8): e38 (2012).

Borrelli et al., "Cell Penetrating Peptides as Molecular Carriers for Anti-Cancer Agents," Molecules, 23(2): pp. 1-28 (2018).
International Search Report and Written Opinion for International Application No. PCT/GB2019/053445 dated Feb. 28, 2020.
Lehto et al., "Peptides for nucleic acid delivery," Advanced Drug Delivery Reviews, 106: 172-182 (2016).
McClorey et al., "Cell-Penetrating Peptides to Enhance Delivery of Oligonucleotide-Base Therapeutics," Biomedicines, 6(2): 51 (15 pages)(2018).
Wu et al., "Cell-penetrating peptides as transporters for morpholino oligomers: effects of amino acid composition on intracellular delivery and cytotoxicity," Nucleic Acids Research, 35(15): 5182-5191 (2007).
Alaybeyoglu et al., "Insights into membrane translocation of the cell-penetrating peptide pVEC from molecular dynamics calculations." Journal of Biomolecular Structure and Dynamics. 34(11): 2387-2398 (2016) (14 pages).
Deuss et al., "Parallel synthesis and splicing redirection activity of cell-penetrating peptide conjugate libraries of a PNA cargo." Organic & Biomolecular Chemistry. 11:7621-7630 (2013) (10 pages).
Dimachkie et al., "Distal myopathies," available in PMC Aug. 1, 2015, published in final edited form as: Neurol Clin. 32(3):817-42 (Aug. 2014) (Epub May 2014) (32 pages).
Godfrey et al., "How much dystrophin is enough: the physiological consequences of different levels of dystrophin in the mdx mouse." Human Molecular Genetics. 24(15):4225-4237 (May 1, 2015) (13 pages).
Haurum et al., "Presentation of Cytosolic Glycosylated Peptides by Human Class I Major Histocompatibility Complex Molecules In Vivo". Journal of Experimental Medicine. 190(1): 145-150 (Jul. 5, 1999) (6 pages).
Lehto et al., "Cellular trafficking determines the exon skipping activity of Pip6a-PMO in mdx skeletal and cardiac muscle cells." Nucleic Acids Res. 42(5):3207-3217 (Dec. 23, 2013) (11 pages).
Marks et al., "Spontaneous Membrane-Translocating Peptides by Orthogonal High-Throughput Screening." Journal of the American Chemical Society. 133: 8995-9004 (May 5, 2011) (10 pages).
Nikolenko et al., "Rehabilitation of children with progressive muscular dystrophy Duchenne," Russian Bulletin of Perinatology and Pediatrics. 4:28-31 (2014).
Berezov T. T. et al., Biologičeskaâ himiâ [Biological Chemistry], Moscow, "Medicine", 1998, p. 34 third para., p. 59 last para (3 pages).
LifeTein (<https://www.lifetein.com/Peptide_Modifications_Pegylation_Linker. html?srsltid= AfmBOooYB4PzPAyhHF6IPK1QKG6LeqO0dw4Q_DMII6Nza-fRFSJnlx8G>Oct. 21, 2014). Retrieved on Apr. 5, 2025 (8 pages).

* cited by examiner

LINKERS

RELATED APPLICATIONS

This application is a U.S. national-stage filing under 35 U.S.C. § 371 of PCT Application No. PCT/GB2019/053445, filed Dec. 6, 2019, which claims the benefit of priority to United Kingdom Patent Application Nos. GB 1820020.4, filed Dec. 7, 2018 and GB 1911405.7, filed Aug. 9, 2019.

SEQUENCE LISTING

The instant application contains a Sequence Listing which has been submitted in ASCII format via EFS-Web and is hereby incorporated by reference in its entirety. Said ASCII copy, created on Feb. 13, 2025, is named "51558-006003_Sequence_Listing_2_13_25_ST25.txt" and is 38,661 bytes in size.

FIELD

The present invention relates to linkers for connecting a carrier molecule to a therapeutic molecule to form a conjugate. The present invention further relates to a conjugate comprising a linker of the invention, and the use of said conjugate in the treatment of various diseases.

BACKGROUND

Therapeutic conjugates comprising a carrier molecule and a therapeutic molecule covalently linked together were first developed after the initial realisation that therapeutic molecules often had poor cell penetration if used alone. The use of a partner carrier was suggested to aid the cellular uptake of the therapeutic molecule into cells and/or tissues.

One such group of therapeutic molecules are antisense oligonucleotides (ON). ON therapies have made rapid clinical progress to treat a variety of disease indications due to their targeted nature and high efficacy. ONs can induce targeted modulation of pre-mRNA splicing, making them particularly attractive candidates for new gene therapy drugs. In particular, for the treatment of diseases which are caused by loss of function mutations, such as Duchenne Muscular Dystrophy (DMD). However, despite their wide applicability to treat many genetic diseases, the systemic in vivo administration of ON compounds has achieved limited success in providing therapeutic effects due to their poor penetration into target tissues, and low levels of intracellular uptake.

To address the problem of poor intracellular uptake in the case of oligonucleotide therapeutics, conjugates have been developed which comprise carriers formed from short peptides. In the last few years, cationic, i.e. positively charged cell-penetrating peptides (CPPs) have been used as carriers to facilitate intracellular uptake of charge-neutral species such as therapeutic phosphorodiamidate morpholino oligomers (PMOs). CPP conjugates have been shown to successfully facilitate effective intracellular uptake of PMOs in vivo in various disease models, including in the context of DMD.

However, the application of these carrier-therapeutic conjugates as therapies has been hampered by their associated toxicity.

Amantana et al., Bioconjug Chem, 2007, 1325-1331 described that peptide-PMO conjugates exhibit dose-dependent toxicity. Above a certain threshold toxicity is observed including lethargy, rapid breathing, tubular degeneration in kidney and weight loss. One such CPP conjugate; the B-PMO conjugate, has shown high acute toxicity in mdx mice (Wu et al., Am J Pathol, 2012, 392-400).

Work to reduce the toxicity of such therapeutic conjugates has largely focused on developing the carrier; which is believed to be the source of the toxicity. In relation to peptide carriers, Wu et al., Nuc Acids Res, 2007, 35, 5182-5191 indicated that increased numbers of 6-aminohexanoic acid residues correlates with increased toxicity, and asserted that more active and stable CPPs could be designed by optimising the position and number of Arginine (R, D-R), Aminohexanoic acid (X) and Beta-Alanine (B) residues. Other studies further indicated that the number or frequency of arginine residues in a peptide carrier negatively affected toxicity, and that these should be reduced.

Carrier peptides having various different sequences have since been developed in an attempt to make the conjugates thereof less toxic, however many such conjugates have not reached the clinic. This is either due to intolerable levels of toxicity, or due to an undesirable loss in efficacy of the conjugate. For example, Betts et al., Molecular Therapy-Nucleic Acids, 2012, 1, e38 demonstrated that some promising CPP carriers known in the art as 'Pips' still do not have the appropriate therapeutic index for clinical development. Furthermore US 2016/0237426 contains data demonstrating that other differently designed CPP carriers such as $R_6Gly$ (SEQ ID NO: 87) do have reduced toxicity, but when used in a conjugate with a therapeutic molecule also have reduced efficacy in inducing exon skipping.

Despite the efforts of researchers to vary the sequence of the carrier for use in therapeutic conjugates, until now it has proved very difficult to produce a conjugate with both high efficacy in terms of therapeutic results and acceptable toxicity levels.

Therefore there remains a need for conjugates to deliver therapeutic molecules that exhibit reduced toxicity when administered systemically to patients whilst maintaining therapeutic effectiveness.

One or more aspects of the present invention is intended to solve at least this problem.

STATEMENTS OF INVENTION

According to a first aspect of the present invention, there is provided a conjugate or a pharmaceutically acceptable salt or solvate thereof, comprising at least one carrier, wherein the carrier is covalently linked to at least one linker, and wherein the linker is covalently linked to at least one therapeutic molecule; wherein each of the at least one linkers independently has a structure according to Formula (I) below:

$$\text{-T}_1\text{-(CR}^1\text{R}^2)_n\text{-T}_2\text{-} \quad (I)$$

wherein $T_1$ is for attachment to the carrier and is selected from —NH— or —C(O)—;

$T_2$ is for attachment to a first therapeutic molecule and is selected from —NH— or —C(O)—;

n is an integer selected from 1, 2 or 3; and each occurrence of $R^1$ is independently a group of the formula —$Y^1$—$X^1$—$Z^1$, wherein $Y^1$ is absent or a group of the formula —$[CR^{41}R^{42}]_m$— in which m is an integer selected from 1, 2, 3 or 4, and $R^{41}$ and $R^{42}$ are each independently selected from hydrogen, OH or (1-2C)alkyl;

$X^1$ is absent or —O—, —C(O)—, —C(O)O—, —OC(O)—, —CH(OR$^{43}$)—, —N(R$^{43}$)—, —N(R$^{43}$)—C 

(O)—, —N(R^{A3})—C(O)O—, —C(O)—N(R^{A3})—, —N(R^{A3})C(O)N(R^{A3})—, —N(R^{A3})C(NR^{A3})N(R^{A3})—, —SO—, —S— —SO$_2$—, —S(O)$_2$N(R^{A3})—, or —N(R^{A3})SO$_2$— wherein each R^{A3} is independently selected from hydrogen or methyl; and Z$^1$ is a further therapeutic molecule or is selected from hydrogen, (1-6C)alkyl, (2-6C)alkenyl, (2-6C)alkynyl, aryl, (3-6C)cycloalkyl, (3-6C)cycloalkenyl or heteroaryl, wherein each (1-6C)alkyl, (2-6C)alkenyl, (2-6C)alkynyl, aryl, (3-6C)cycloalkyl, (3-6C)cycloalkenyl or heteroaryl is optionally substituted by one or more substituent groups selected from (1-4C)alkyl, oxo, halo, cyano, nitro, hydroxy, carboxy, NR^{A4}R^{A5} or (1-4C)alkoxy, wherein R^{A4} and R^{A5} are each independently selected from hydrogen or (1-2C)alkyl; and each occurrence of R$^2$ is independently a group of the formula —Y$^2$—X$^2$—Z$^2$, wherein Y$^2$ is absent or a group of the formula —[CR^{B1}R^{B2}]$_m$— in which m is an integer selected from 1, 2, 3 or 4, and R^{B1} and R^{B2} are each independently selected from hydrogen, OH or (1-2C)alkyl;

X$^2$ is absent or —O—, —C(O)—, —C(O)O—, —OC(O)—, —CH(OR^{B3})—, —N(R^{B3})—, —N(R^{B3})—C(O)—, —N(R^{B3})—C(O)O—, —C(O)—N(R^{B3})—, —N(R^{B3})C(O)N(R^{B3})—, —N(R^{B3})C(NR^{B3})N(R^{B3})—, —SO—, —S— —SO$_2$—, —S(O)$_2$N(R^{B3})—, or —N(R^{B3})SO$_2$— wherein each R^{B3} is independently selected from hydrogen or methyl; and Z$^2$ is selected from hydrogen, (1-6C)alkyl, (2-6C)alkenyl, (2-6C)alkynyl, aryl, (3-6C)cycloalkyl, (3-6C)cycloalkenyl or heteroaryl, wherein each (1-6C)alkyl, (2-6C)alkenyl, (2-6C)alkynyl, aryl, (3-6C)cycloalkyl, (3-6C)cycloalkenyl or heteroaryl is optionally substituted by one or more substituent groups selected from (1-4C) alkyl, oxo, halo, cyano, nitro, hydroxy, carboxy, NR^{B4}R^{B5} or (1-4C)alkoxy, wherein R^{B4} and R^{B5} are each independently selected from hydrogen or (1-2C)alkyl;

with the proviso that;
when n=1 and T$_1$ and T$_2$ are different to one another, then R$^1$ and R$^2$ are not both H;
when n=1, T$_1$ and T$_2$ are different to one another and one of R$^1$ and R$^2$ is H then the other of R$^1$ and R$^2$ is not methyl; or
when n=2 and each occurrence of R$^1$ and R$^2$ is H, then T$_1$ and T$_2$ are both —C(O)— or are both —NH—.
when the carrier is a peptide, the peptide is not glycosylated According to a second aspect of the present invention, there is provided the conjugate according to the first aspect for use as a medicament.

According to a third aspect of the present invention, there is provided a pharmaceutical composition comprising a conjugate according to the first aspect.

According to the fourth aspect of the present invention there is provided a pharmaceutical composition of the third aspect for use as a medicament.

The present inventors have discovered that a linker located between the carrier and the therapeutic molecule within a conjugate has a surprising effect on the toxicity of the conjugate.

If a linker is used within a conjugate it is typically a small molecule that is used with the sole reason of connecting the carrier molecule to the therapeutic molecule. Until now, the linker itself was not expected or intended to have any role in the properties of the conjugate.

As far as the inventors are aware, there has been no research into how the choice of linker affects the properties of the conjugate, especially not as to how the choice of linker affects the toxicity of the conjugate.

In the present invention, the inventors have conducted research into the effect of using different linkers on the toxicity of several peptide carrier conjugates. The inventors have identified several linkers that actively improve the toxicity of therapeutic conjugates.

Surprisingly, the inventors have found that linkers falling within the structure of the first aspect of the invention act to reduce the toxicity of carrier-therapeutic conjugates by a significant amount when compared with other linkers that have been used in the art.

Without being bound by theory, and purely from scientific speculation, the inventors believe that the linkers falling within the definition of the first aspect of the invention have the ability to arrange the carrier and the therapeutic molecule in a spatial orientation which is stabilised and protected against cleavage from proteases. This could result in the conjugate as a whole having a reduced toxicity when compared to similar conjugates using prior linkers. This advantageous orientation may be derived from the length of the carbon chain that connects the carrier to the therapeutic molecule. The inventors believe the particular length of carbon chain provides enough distance between the charge of the carrier and the therapeutic molecule. In addition, the inventors believe that the metabolites produced upon breakdown of said linkers may be less toxic.

Advantageously, the discovery of linkers with such reduced toxicity means that previously developed and newly developed therapeutic conjugates may now be useable in a clinical setting. Furthermore, because the linkers are a separate moiety from the carrier and the therapeutic molecule, they can easily be used in many different conjugates with different carriers and therapeutic molecules without affecting the cell penetrating properties of the carrier, or the efficacy of the therapeutic molecule.

Certain features of any of the above aspects of the present invention will now be defined further under the headings below.

The invention includes any combination of the aspects and features described except where such a combination is clearly impermissible or expressly avoided.

The section headings used herein are for organisational purposes only and are not to be construed as limiting the subject matter described.

Linker

The linker is used to covalently connect a carrier to a therapeutic molecule. Conjugates according to the invention comprise at least one linker that is defined by Formula (I).

Suitably, the or each linker has a structure according to Formula (I), defined hereinbefore, i.e.

$$-T_1-(CR^1R^2)_n-T_2-  \qquad (I)$$

In an embodiment, T$_1$ is —NH—. In another embodiment T$_1$ is —C(O)—.

In an embodiment, T$_2$ is —C(O)—.

In an embodiment, each occurrence of R$_1$ is independently a group of the formula —Y$^1$—X$^1$—Z$^1$, wherein:

Y$^1$ is absent or a group of the formula —[CR^{A1}R^{A2}]$_m$— in which m is an integer selected from 1, 2, 3 or 4, and R^{A1} and R^{A2} are each independently selected from hydrogen or (1-2C)alkyl;

$X^1$ is absent or —O—, —C(O)—, —C(O)O—, —N($R^{43}$)—, —N($R^{43}$)—C(O)—, —C(O)—N($R^{43}$)—N($R^{43}$)C(O)N($R^{43}$)—, —N($R^{43}$)C(N$R^{43}$)N($R^{43}$)— or —S— wherein each $R^{43}$ is independently selected from hydrogen or methyl; and $Z^1$ is a further therapeutic molecule or is selected from hydrogen, (1-6C)alkyl, (2-6C)alkenyl, (2-6C)alkynyl, aryl, (3-6C)cycloalkyl, (3-6C)cycloalkenyl or heteroaryl, wherein each (1-6C)alkyl, (2-6C)alkenyl, (2-6C)alkynyl, aryl, (3-6C)cycloalkyl, (3-6C)cycloalkenyl or heteroaryl is optionally substituted by one or more substituent groups selected from (1-4C) alkyl, oxo, halo, cyano, nitro, hydroxy, carboxy, $NR^{44}R^{45}$ or (1-4C)alkoxy, wherein $R^{44}$ and $R^{45}$ are each independently selected from hydrogen or (1-2C)alkyl.

In an embodiment, each occurrence of $R_1$ is independently a group of the formula —$Y^1$—$X^1$—$Z^1$, wherein:

$Y^1$ is absent or a group of the formula —[$CR^{41}R^{42}$]$_m$— in which m is an integer selected from 1, 2, 3 or 4, and $R^{41}$ and $R^{42}$ are each independently selected from hydrogen or (1-2C)alkyl;

$X^1$ is absent or —O—, —C(O)—, —C(O)O—, —N($R^{43}$)—, —N($R^{43}$)—C(O)—, —C(O)—N($R^{43}$)—N($R^{43}$)C(O)N($R^{43}$)—, —N($R^{43}$)C(N$R^{43}$)N($R^{43}$)— or —S— wherein each $R^{43}$ is independently selected from hydrogen or methyl; and $Z^1$ is selected from hydrogen, (1-6C)alkyl, (2-6C)alkenyl, (2-6C)alkynyl, aryl, (3-6C)cycloalkyl, (3-6C)cycloalkenyl or heteroaryl, wherein each (1-6C)alkyl, (2-6C)alkenyl, (2-6C)alkynyl, aryl, (3-6C)cycloalkyl, (3-6C)cycloalkenyl or heteroaryl is optionally substituted by one or more substituent groups selected from (1-4C) alkyl, oxo, halo, cyano, nitro, hydroxy, carboxy, $NR^{44}R^{45}$ or (1-4C)alkoxy, wherein $R^{44}$ and $R^{45}$ are each independently selected from hydrogen or (1-2C)alkyl.

In another embodiment, each occurrence of $R_1$ is independently a group of the formula —$Y^1$—$X^1$—$Z^1$, wherein:

$Y^1$ is absent or a group of the formula —[$CR^{41}R^{42}$]$_m$— in which m is an integer selected from 1, 2, 3 or 4, and $R^{41}$ and $R^{AZ}$ are each independently selected from hydrogen or (1-2C)alkyl;

$X^1$ is absent or —O—, —C(O)—, —C(O)O—, —N($R^{43}$)—, —N($R^{43}$)—C(O)—, —C(O)—N($R^{43}$)—N($R^{43}$)C(O)N($R^{43}$)—, —N($R^{43}$)C(N$R^{43}$)N($R^{43}$)— or —S— wherein each $R^{43}$ is independently selected from hydrogen or methyl;

$Z^1$ is a further therapeutic molecule or is selected from hydrogen, (1-6C)alkyl, aryl, (3-6C)cycloalkyl or heteroaryl, wherein each (1-6C)alkyl, aryl, (3-6C)cycloalkyl or heteroaryl is optionally substituted by one or more substituent groups selected from (1-4C) alkyl, halo or hydroxy.

In an embodiment, each occurrence of $R_1$ is independently a group of the formula —$Y^1$—$X^1$—$Z^1$, wherein:

$Y^1$ is absent or a group of the formula —[$CR^{41}R^{42}$]$_m$— in which m is an integer selected from 1, 2, 3 or 4, and $R^{41}$ and $R^{AZ}$ are each independently selected from hydrogen or (1-2C)alkyl;

$X^1$ is absent or —C(O)—, —C(O)O—, —N($R^{43}$)—C(O)—, C(O)—N($R^{43}$)—, wherein each $R^{43}$ is independently selected from hydrogen or methyl; and $Z^1$ is a further therapeutic molecule or is selected from is hydrogen, (1-6C)alkyl, aryl, (3-6C)cycloalkyl or heteroaryl, wherein each (1-6C)alkyl, aryl, (3-6C)cycloalkyl or heteroaryl is optionally substituted by one or more substituent groups selected from (1-4C) alkyl, halo or hydroxy.

In an embodiment, each occurrence of $R_1$ is independently a group of the formula —$Y^1$—$X^1$—$Z^1$, wherein:

$Y^1$ is absent or a group of the formula —[$CH_2$]$_m$— in which m is an integer selected from 1 or 2;

$X^1$ is absent or —N($R^{43}$)—C(O)—, —C(O)—N($R^{43}$)—, wherein each $R^{43}$ is independently selected from hydrogen or methyl; and $Z^1$ is hydrogen or (1-2C)alkyl.

In certain embodiments, $Z^1$ may be a further therapeutic molecule. The further therapeutic molecule may be the same or different to the first therapeutic molecule linked to $T_2$.

In an embodiment, each occurrence of $R_2$ is independently a group of the formula —$Y^2$—$X^2$—$Z^2$, wherein:

$Y^2$ is absent or a group of the formula —[$CR^{A1}R^{A2}$]$_m$— in which m is an integer selected from 1, 2, 3 or 4, and $R^{A1}$ and $R^{AZ}$ are each independently selected from hydrogen or (1-2C)alkyl;

$X^2$ is absent or —O—, —C(O)—, —C(O)O—, —N($R^{43}$)—, —N($R^{43}$)—C(O)—, —C(O)—N($R^{43}$)—N($R^{43}$)C(O)N($R^{43}$)—, —N($R^{43}$)C(N$R^{43}$)N($R^{43}$)— or —S— wherein each $R^{43}$ is independently selected from hydrogen or methyl; and $Z^2$ is selected from hydrogen, (1-6C)alkyl, (2-6C)alkenyl, (2-6C)alkynyl, aryl, (3-6C)cycloalkyl, (3-6C)cycloalkenyl or heteroaryl, wherein each (1-6C)alkyl, (2-6C)alkenyl, (2-6C)alkynyl, aryl, (3-6C)cycloalkyl, (3-6C)cycloalkenyl or heteroaryl is optionally substituted by one or more substituent groups selected from (1-4C) alkyl, oxo, halo, cyano, nitro, hydroxy, carboxy, $NR^{B4}R^{B5}$ or (1-4C)alkoxy, wherein $R^{B4}$ and $R^{B5}$ are each independently selected from hydrogen or (1-2C)alkyl.

In an embodiment, each occurrence of $R^2$ is independently a group of the formula —$Y^2$—$Z^2$, wherein $Y^2$ is absent or a group of the formula —[$CR^{B1}R^{B2}$]$_m$— in which m is an integer selected from 1, 2, 3 or 4, and $R^{B1}$ and $R^{B2}$ are each independently selected from hydrogen or (1-2C) alkyl; and $Z^2$ is hydrogen or (1-6C)alkyl.

In a preferred embodiment, each occurrence of $R^2$ is H.

In certain embodiments, n is 1.

In certain embodiments, n is 2 or 3.

In an embodiment, there is provided a conjugate as defined herein, which has one of the following structures:

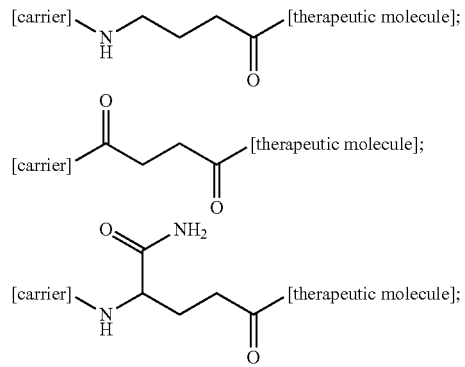

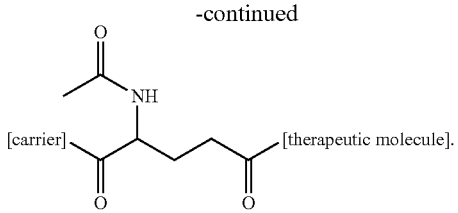

In certain embodiments, the linker is an amino acid or a derivative thereof. Thus, the linker may be an amino acid or modified amino acid that links the carrier with the therapeutic molecule. The amino acid may be modified to include a capping group (e.g. an acetyl capping group formed by capping with acetic anhydride) or a protecting group. Suitably the capping group or protecting group may be present on the side chain of the amino acid.

Suitably, the amino acid may be linked to the at least one carrier and the at least one therapeutic molecule by at least two of either the side chain, the N-terminus or the C-terminus. Suitably, the amino acid linker may be linked to the at least one carrier by the side chain, the N-terminus or the C-terminus. Suitably, the amino acid linker may be linked to the at least one therapeutic molecule by the side chain, the N-terminus or the C-terminus. For example, the amino acid linker may be linked to the at least one carrier and the at least one therapeutic molecule by the N-terminus and the side chain respectively, the C-terminus and the side chain respectively, or the N-terminus and the C-terminus respectively. In one embodiment, the linker is an amino acid linked through the N-terminus and the C-terminus. In one embodiment, the linker is an amino acid linked through the N-terminus to the carrier and through the C-terminus to the therapeutic molecule. In one embodiment, the linker is an amino acid linked through the C-terminus to the carrier and through the N-terminus to the therapeutic molecule.

Suitably, the amino acid side chain may be linked to a second therapeutic molecule.

Suitably, the linker is an amino acid that may be selected from glutamic acid, aspartic acid, lysine, valine, leucine, histidine, tryptophan, threonine, serine, isoleucine, methionine, phenylalanine and tyrosine, or derivatives thereof.

Suitably, the linker is glutamic acid or derivatives thereof. Suitably the linker is glutamic acid and derivatives thereof found within the GABA shunt. Suitably the linker is selected from glutamic acid, succinic acid, or gamma-aminobutyric acid (GABA).

In one embodiment, the linker is GABA linked to a carrier through the N-terminus and linked to a therapeutic molecule through the C-terminus.

In one embodiment, the linker is succinic acid linked to a therapeutic molecule through one of the carboxyl groups and linked to the carrier through the other carboxyl group.

In one embodiment, the linker is glutamic acid linked to a carrier through the N-terminus and a linked to a therapeutic molecule through the side chain of glutamic acid.

In one embodiment, the linker is glutamic acid linked to a carrier through the C-terminus and linked to a therapeutic molecule through the side chain of glutamic acid.

Definitions

References to 'X' throughout denote any form of the amino acid aminohexanoic acid, such as 6-aminohexanoic acid.

References to 'B' throughout denote the amino acid beta-alanine.

Refences to '[Hyp]' throughout denote the amino acid hydroxyproline.

References to 'Ac' throughout denote acetylation of the relevant peptide.

References to other capital letters throughout denote the relevant genetically encoded amino acid residue in accordance with the accepted alphabetic amino acid code.

In this specification the term "alkyl" includes both straight and branched chain alkyl groups.

References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t-butyl. A similar convention applies to other radicals, for example "phenyl(1-6C)alkyl" includes phenyl(1-4C)alkyl, benzyl, 1-phenylethyl and 2-phenylethyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Such substituents may occur on one or more carbons that are included or not included in one or more double bonds. For example, substitution of alkenyl groups by one or more alkyl, carbocyclyl, aryl, heterocyclyl, or heteroaryl groups is contemplated.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Such substituents may occur on one or more carbons that are included or not included in one or more triple bonds. Moreover, such substituents include all those contemplated herein.

The term "(m-nC)" or "(m-nC) group" used alone or as a prefix, refers to any group having m to n carbon atoms.

"(3-8C)cycloalkyl" means a hydrocarbon ring containing from 3 to 8 carbon atoms, for example, cyclopropyl, cyclobutyl, cyclopentyl, cyclohexyl, cycloheptyl or bicyclo [2.2.1]heptyl.

"(3-8C)cycloalkenyl" means a hydrocarbon ring containing at least one double bond, for example, cyclobutenyl, cyclopentenyl, cyclohexenyl or cycloheptenyl, such as 3-cyclohexen-1-yl, or cyclooctenyl.

The term "halo" or "halogeno" refers to fluoro, chloro, bromo and iodo.

By "bridged ring systems" it is meant ring systems in which two rings share more than two atoms, see for example *Advanced Organic Chemistry, by Jerry March, 4th* Edition, Wiley Interscience, pages 131-133, 1992. Examples of bridged heterocyclyl ring systems include, aza-bicyclo [2.2.1]heptane, 2-oxa-5-azabicyclo[2.2.1]heptane, aza-bicyclo[2.2.2]octane, aza-bicyclo[3.2.1]octane and quinuclidine.

The term "aryl" means an aromatic cyclic or polycyclic aromatic ring having from 5 to 12 carbon atoms. The term aryl includes both monovalent species and divalent species. Examples of aryl groups include, but are not limited to, phenyl, biphenyl, naphthyl and the like. In particular embodiments, an aryl is optionally substituted phenyl.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. The term heteroaryl includes both monovalent species and divalent species. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically the heteroaryl ring will contain up to 3 heteroatoms, more usually up to 2, for example a single heteroatom. In one embodiment, the heteroaryl ring contains at least one ring nitrogen atom. The nitrogen atoms in the heteroaryl rings can be basic, as in the case of an imidazole or pyridine, or essentially non-basic as in the case of an indole or pyrrole nitrogen. In general the number of basic nitrogen atoms present in the heteroaryl group, including any amino group substituents of the ring, will be less than five.

Examples of heteroaryl include furyl, pyrrolyl, thienyl, oxazolyl, isoxazolyl, imidazolyl, pyrazolyl, thiazolyl, isothiazolyl, oxadiazolyl, thiadiazolyl, triazolyl, tetrazolyl, pyridyl, pyridazinyl, pyrimidinyl, pyrazinyl, 1,3,5-triazenyl, benzofuranyl, indolyl, isoindolyl, benzothienyl, benzoxazolyl, benzimidazolyl, benzothiazolyl, benzothiazolyl, indazolyl, purinyl, benzofurazanyl, quinolyl, isoquinolyl, quinazolinyl, quinoxalinyl, cinnolinyl, pteridinyl, naphthyridinyl, carbazolyl, phenazinyl, benzisoquinolinyl, pyridopyrazinyl, thieno[2,3-b]furanyl, 2H-furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl. "Heteroaryl" also covers partially aromatic bi- or polycyclic ring systems wherein at least one ring is an aromatic ring and one or more of the other ring(s) is a non-aromatic, saturated or partially saturated ring, provided at least one ring contains one or more heteroatoms selected from nitrogen, oxygen or sulfur. Examples of partially aromatic heteroaryl groups include for example, tetrahydroisoquinolinyl, tetrahydroquinolinyl, 2-oxo-1,2,3,4-tetrahydroquinolinyl, dihydrobenzthienyl, dihydrobenzfuranyl, 2,3-dihydro-benzo[1,4]dioxinyl, benzo[1,3]dioxolyl, 2,2-dioxo-1,3-dihydro-2-benzothienyl, 4,5,6,7-tetrahydrobenzofuranyl, indolinyl, 1,2,3,4-tetrahydro-1,8-naphthyridinyl, 1,2,3,4-tetrahydropyrido[2,3-b]pyrazinyl and 3,4-dihydro-2H-pyrido[3,2-b][1,4]oxazinyl.

Examples of five membered heteroaryl groups include but are not limited to pyrrolyl, furanyl, thienyl, imidazolyl, furazanyl, oxazolyl, oxadiazolyl, oxatriazolyl, isoxazolyl, thiazolyl, isothiazolyl, pyrazolyl, triazolyl and tetrazolyl groups.

Examples of six membered heteroaryl groups include but are not limited to pyridyl, pyrazinyl, pyridazinyl, pyrimidinyl and triazinyl.

A bicyclic heteroaryl group may be, for example, a group selected from:
 a benzene ring fused to a 5- or 6-membered ring containing 1, 2 or 3 ring heteroatoms;
 a pyridine ring fused to a 5- or 6-membered ring containing 1, 2 or 3 ring heteroatoms;
 a pyrimidine ring fused to a 5- or 6-membered ring containing 1 or 2 ring heteroatoms;
 a pyrrole ring fused to a 5- or 6-membered ring containing 1, 2 or 3 ring heteroatoms;
 a pyrazole ring fused to a 5- or 6-membered ring containing 1 or 2 ring heteroatoms;
 a pyrazine ring fused to a 5- or 6-membered ring containing 1 or 2 ring heteroatoms;
 an imidazole ring fused to a 5- or 6-membered ring containing 1 or 2 ring heteroatoms;
 an oxazole ring fused to a 5- or 6-membered ring containing 1 or 2 ring heteroatoms;
 an isoxazole ring fused to a 5- or 6-membered ring containing 1 or 2 ring heteroatoms;
 a thiazole ring fused to a 5- or 6-membered ring containing 1 or 2 ring heteroatoms;
 an isothiazole ring fused to a 5- or 6-membered ring containing 1 or 2 ring heteroatoms;
 a thiophene ring fused to a 5- or 6-membered ring containing 1, 2 or 3 ring heteroatoms;
 a furan ring fused to a 5- or 6-membered ring containing 1, 2 or 3 ring heteroatoms;
 a cyclohexyl ring fused to a 5- or 6-membered heteroaromatic ring containing 1, 2 or 3 ring heteroatoms; and
 a cyclopentyl ring fused to a 5- or 6-membered heteroaromatic ring containing 1, 2 or 3 ring heteroatoms.

Particular examples of bicyclic heteroaryl groups containing a six membered ring fused to a five membered ring include but are not limited to benzfuranyl, benzthiophenyl, benzimidazolyl, benzoxazolyl, benzisoxazolyl, benzthiazolyl, benzisothiazolyl, isobenzofuranyl, indolyl, isoindolyl, indolizinyl, indolinyl, isoindolinyl, purinyl (e.g., adeninyl, guaninyl), indazolyl, benzodioxolyl and pyrazolopyridinyl groups.

Particular examples of bicyclic heteroaryl groups containing two fused six membered rings include but are not limited to quinolinyl, isoquinolinyl, chromanyl, thiochromanyl, chromenyl, isochromenyl, chromanyl, isochromanyl, benzodioxanyl, quinolizinyl, benzoxazinyl, benzodiazinyl, pyridopyridinyl, quinoxalinyl, quinazolinyl, cinnolinyl, phthalazinyl, naphthyridinyl and pteridinyl groups.

The term "optionally substituted" refers to either groups, structures, or molecules that are substituted and those that are not substituted. The term "wherein a/any CH, CH$_2$, CH$_3$ group or heteroatom (i.e. NH) within a R$^1$ group is optionally substituted" suitably means that (any) one of the hydrogen radicals of the R$^1$ group is substituted by a relevant stipulated group.

Where optional substituents are chosen from "one or more" groups it is to be understood that this definition includes all substituents being chosen from one of the specified groups or the substituents being chosen from two or more of the specified groups.

Carrier

The conjugate of the invention comprises a linker that is used to connect a therapeutic molecule to a carrier molecule to form said conjugate.

Typically the carrier molecule aids the transport of the therapeutic molecule to reach the therapeutic target, whether that be a gene, transcript, or protein. The carrier may have a stabilising effect on the therapeutic molecule to allow it to reach the therapeutic target without degradation. Equally, the carrier may have the effect of facilitating the entry of the therapeutic molecule into target cells.

Suitably, any known carrier molecule may be used in the conjugates of the present invention.

Suitable carriers include any biologically tolerated molecule, such as for example: proteins, peptides, fatty acids, polymers, nanoparticles, nucleic acid polymers.

In one embodiment, the carrier molecule is a peptide.

Suitably, the carrier peptide may be connected to the linker at the N-terminus or at the C-terminus of the carrier peptide.

Suitably, in any of the structures disclosed herein, the peptide carrier may be connected to the therapeutic molecule through the linker at the N or C terminus of the peptide, equally the therapeutic molecule may be connected through the linker at the N or C-terminus of the peptide carrier.

Suitable peptide carriers are known in the art. Such peptide carriers are described in, for example: GB1812972.6, GB 1812980.9, WO2009/147368, WO2013/030569, WO2009/005793.

Suitably, if the carrier molecule is a peptide, the peptide is not glycosylated. Suitably, the carrier molecule is not a glycosylated peptide.

Suitably, the peptide carrier is up to 40 amino acids in length. The peptide may therefore be regarded as an oligopeptide.

Suitably, the peptide has a total length of between 3-30 amino acid residues, suitably of between 5-25 amino acid residues, of between 10-25 amino acid residues, of between 13-23 amino acid residues, of between 15-20 amino acid residues.

Suitably, the peptide has a total length of at least 12, at least 13, at least 14, at least 15, at least 16, at least 17 amino acid residues.

Suitably the peptide is capable of penetrating cells. The peptide may therefore be regarded as a cell-penetrating peptide.

Suitably the carrier peptide has a sequence that is a contiguous single molecule, therefore any domains of the peptide are contiguous. Suitably, the peptide may comprise several domains in a linear arrangement between the N-terminus and the C-terminus. Suitably, the peptide carrier may comprise any type of domain, such as: hydrophobic domains, hydrophilic domains, cationic domains, anionic domains, neutral domains, acidic domains, basic domains.

Suitably the peptide carrier may comprise any number of domains in any configuration.

References to 'cationic' herein denote an amino acid or domain of amino acids having an overall positive charge at physiological pH.

Suitably, each cationic domain comprises an isoelectric point (pI) of at least 7.5, at least 8.0, at least 8.5, at least 9.0, at least 9.5, at least 10.0, at least 10.5, at least 11.0, at least 11.5, at least 12.0.

Suitably, each cationic domain comprises an isoelectric point (pI) of at least 10.0.

Suitably, each cationic domain comprises an isoelectric point (pI) of between 10.0 and 13.0 Suitably the isoelectric point of a cationic domain is calculated at physiological pH by any suitable means available in the art. Suitably, by using the IPC (www.isoelectric.org) a web-based algorithm developed by Lukasz Kozlowski, Biol Direct. 2016; 11: 55. DOI: 10.1186/s13062-016-0159-9.

References to 'hydrophobic' herein denote an amino acid or domain of amino acids having the ability to repel water or which do not mix with water.

Suitably, each hydrophobic domain comprises a hydrophobicity of at least 0.3, at least 0.4, at least 0.5, at least 0.6, at least 0.7, at least 0.8, at least 0.8, at least 1.0, at least 1.1, at least 1.2, at least 1.3.

Suitably, each hydrophobic domain comprises a hydrophobicity of between 0.4 and 1.4 Suitably, hydrophobicity is as measured by White and Wimley: W. C. Wimley and S. H. White, "Experimentally determined hydrophobicity scale for proteins at membrane interfaces" Nature Struct Biol 3:842 (1996).

Suitably, the peptide carrier may comprise or consist of hydrophobic domains and/or cationic domains. Suitably the peptide carrier comprises at least one cationic domain and at least one hydrophobic domain. Suitably the peptide carrier comprises or consists of two cationic domains and one hydrophobic domain.

Suitably, the cationic domains are located at the N and C terminus of the peptide carrier.

Suitably at either end of the peptide carrier. Suitably the one or more hydrophobic domains are located in the centre of the peptide carrier. Suitably, a hydrophobic domain separates any two cationic domains. Suitably, each hydrophobic domain is flanked by cationic domains on either side thereof. Suitably no cationic domain is contiguous with another cationic domain.

Suitably each domain has a length of between 3 to 15 amino acid residues. Suitably a length of between 3 to 7 amino acid residues. Suitably, each domain of the same type is of similar length, suitably each domain of the same type is the same length. Suitably, each cationic domain has a length of 4, 5, 6, or 7 amino acid residues.

Suitably, each hydrophobic domain has a length of between 3-6 amino acids. Suitably, each hydrophobic domain has a length of 5 amino acids.

Suitably the peptide carrier is a positively charged peptide.

Suitably the peptide carrier is an arginine rich peptide. Suitably the peptide carrier comprises at least 20%, 30%, at least 32%, at least 34%, at least 36%, at least 38%, at least 40%, at least 42%, at least 44%, at least 46%, at least 48% at least 50%, at least 60%, at least 70%, at least 80%, at least 90% arginine residues. Suitably the peptide carrier comprises a majority of arginine residues.

Suitably, the peptide carrier may not comprise artificial amino acids. Suitably, the peptide carrier may not comprise aminohexanoic acid residues. References to an 'artificial' amino acid or residue herein denotes any amino acid that does not occur in nature and includes synthetic amino acids, modified amino acids (such as those modified with sugars), non-natural amino acids, man-made amino acids, spacers, and non-peptide bonded spacers.

Synthetic amino acids may be those that are chemically synthesised by man.

For the avoidance of doubt, aminohexanoic acid (X) is an artificial amino acid in the context of the present invention.

Suitably the cationic domains are positively charged.

Suitably the cationic domains are arginine rich. Suitably each cationic domain comprises a majority of arginine residues. Suitably, a cationic domain may comprise at least 40%, at least 45%, at least 50%, at least 55%, at least 60%, at least 60%, at least 65%, least 70%, at least 80%, at least 90% arginine residues. Suitably each cationic domain comprises between 40-70% arginine residues.

Suitably, each hydrophobic domain comprises a majority of hydrophobic amino acid residues.

Suitably, each hydrophobic domain comprises at least 70%, at least 75%, at least 80%, at least 85%, at least 90%, at least 95%, 100% hydrophobic amino acids. Suitably, each hydrophobic domain consists of hydrophobic amino acid residues.

Suitably, each cationic domain has at least 3 Arginine residues, suitably at least 4 Arginine Residues. Suitably, each cationic domain contains 4, 5, 6 or more Arginine residues. Suitably the cationic domains comprise no more than 3 contiguous Arginine residues, suitably no more than 2 contiguous Arginine residues.

Suitably, the cationic domains comprise amino acid units selected from the following: RBR, RXR, XXR, XRR, RRX, BXR, RXB, XRB, RBB, BRB, BBR, RRB, BRR, and BRX R, H, B, RR, HH, BB, RH, HR, RB, BR, HB, BH, RBR, RBB, BRR, BBR, BRB, RBH, RHB, HRB, BRH, HRR, RRH, HRH, HBB, BBH, RHR, BHB, HBH, or any combination thereof.

Suitably, the cationic domains are formed of amino acid units selected from: R, RR, RJR, RRJ, JRR in any combination or order. Wherein J represents any non-natural amino acid.

Suitably, the cationic domains may comprise or consist of (RXR)n where n=2, 3 or 4; [SEQ ID NOs:1-3] and/or (RBR)n where n=2, 3 or 4; [SEQ ID NOs:4-6] and/or (RHR)n where n=2, 3, or 4 [SEQ ID NOs: 7-9].

Suitably a cationic domain may also include serine, proline and/or hydroxyproline residues.

Suitably the cationic domains may further comprise amino acid units selected from the following: RP, PR, PP, RPR, RRP, PRR, PRP, Hyp; R[Hyp]R, RR[Hyp], [Hyp]RR, [Hyp]R[Hyp], [Hyp][Hyp]R, R[Hyp][Hyp], SB, BS, or any combination thereof, or any combination with the above listed amino acid units.

Suitably, the hydrophobic domains may comprise one of the following sequences: ZAA, ZA, Z, AZA, AZ, ZAZ, ZZA and ZZZ; Wherein Z represents 1,2,3,4-tetrahydroisoquinoline-3-carboxylic acid (TIC) residue.

Wherein A represents a hydrophobic amino acid residue as defined above.

Suitably the hydrophobic domains are selected from one of the following sequences: GFTGPL (SEQ ID NO. 10), QFL, Z, ZL, F, FL, FQILY (SEQ ID NO. 11), FQ, WF, QF, FQ, and YQFLI (SEQ ID NO. 12). Suitably, the core domains are selected from one of the following sequences Z, F and FL or any combination thereof. Wherein Z represents 1,2,3,4-tetrahydroisoquinoline-3-carboxylic acid (TIC) residue.

Suitably the or each hydrophobic domain comprises one of the following sequences: YQFLI (SEQ ID NO:12), FQILY (SEQ ID NO:11), ILFQY (SEQ ID NO:13), FQIY (SEQ ID NO:14), WWW, WWPWW (SEQ ID NO:15), WPWW (SEQ ID NO:16), WWPW (SEQ ID NO:17), ILFQ (SEQ ID NO: 18), ILIQ (SEQ ID NO: 19), IKILFQN (SEQ ID NO: 20), IHILFQN (SEQ ID NO: 21), IRILFQN (SEQ ID NO: 22), IILFQN (SEQ ID NO: 23), KILFQN (SEQ ID NO: 24), HILFQN (SEQ ID NO: 25), RILFQN (SEQ ID NO: 26), ILFQN (SEQ ID NO: 27), HLIQN (SEQ ID NO: 28), KILIQN (SEQ ID NO: 29), KILIQY (SEQ ID NO: 30), HILIQN (SEQ ID NO: 31), RILIQN (SEQ ID NO: 32), HILIQY (SEQ ID NO: 33), RILIQY (SEQ ID NO: 34), ILIQN (SEQ ID NO: 35), ILIQY (SEQ ID NO: 36) or any combination thereof, or any combination with the above listed amino acid units.

Suitably, the peptide carrier may consist of one of the following sequences:

```
                                        (SEQ ID NO: 37)
RRRRR (SEQ ID NO: 38)
RRRRRR (SEQ ID NO: 39)
RRRRRRR (SEQ ID NO: 40)
RRRRRRRR (SEQ ID NO: 41)
(RXRRBR)2

(SEQ ID NO: 42)
RXRRBRRXRRBRX (SEQ ID NO: 43)
RXRRXRRXRRXRX (SEQ ID NO: 44)
RXRRBRRFQILYRBRXR (SEQ ID NO: 45)
RXRRBRRXRILFQYRXRBRXR (SEQ ID NO: 46)
RXRRBRRXRILFQYRXRXRXR (SEQ ID NO: 47)
RXRRXRILFQYRXRRXR (SEQ ID NO: 48)
RBRRXRRBRILFQYRBRXRBR (SEQ ID NO: 49)
RBRRXRRBRILFQYRXRBRXR (SEQ ID NO: 50)
RBRRXRRBRILFQYRXRRXR (SEQ ID NO: 51)
RBRRXRRBRILFQYRXRBRX (SEQ ID NO: 52)
RXRRBRRXRILFQYRXRRXR (SEQ ID NO: 53)
RXRRBRRXRILFQYRXRBRX (SEQ ID NO: 54)
RXRRBRRXRILFQYRXRBRXR (SEQ ID NO: 55)
RXRRBRRXRYQFLIRXRBRXR (SEQ ID NO: 56)
RXRRBRRXRIQFLIRXRBRXR (SEQ ID NO: 57)
RXRRBRRXRQFLIRXRBRXR (SEQ ID NO: 58)
RXRRBRRXRQFLRXRBRXR (SEQ ID NO: 59)
RXRRBRRXYRFLIRXRBRXR (SEQ ID NO: 60)
RXRRBRRXRFQILYRXRBRXR (SEQ ID NO: 61)
RXRRBRRXYRFRLIXRBRXR (SEQ ID NO: 62)
RXRRBRRXILFRYRXRBRXR (SEQ ID NO: 63)
RXRRBRRXRIYQFLIRXRBRXR
```

Suitably the peptide carrier may consist of one of the following sequences:

```
                                        (SEQ ID NO: 64)
YQFLIRBRRXRBRXBRXRBYQFLI (SEQ ID NO: 65)
YQFLIRBRRBRBRBRRBYQFLI (SEQ ID NO: 66)
YQFLIRBRRBRBRBBRXRBYQFLI
```

Suitably the peptide carrier may consist of one of the following sequences:

RBRRBRRFQILYRBRBR (SEQ ID NO: 67)

RBRRBRRYQFLIRBRBR (SEQ ID NO: 68)

RBRRBRRILFQYRBRBR (SEQ ID NO: 69)

RBRRBRFQILYBRBR (SEQ ID NO: 70)

RBRRBRRFQILYRBHBH (SEQ ID NO: 71)

RBRRBRRFQILYHBHBR (SEQ ID NO: 72)

RBRRBRFQILYRBHBH (SEQ ID NO: 73)

Suitably, the peptide carrier is N-terminally modified. Suitably the peptide carrier is N-acetylated, N-methylated, N-trifluoroacetylated, N-trifluoromethylsulfonylated, or N-methylsulfonylated, or modified with additional fatty acids. Suitably, the peptide carrier is N-acetylated.

Optionally, the N-terminus of the peptide carrier may be unmodified.

In one embodiment, the peptide carrier is N-acetylated.

Suitably the carrier is connected to the linker by covalent bonding. Suitably, the linker may be covalently bonded to the carrier by an amide bond, an ester bond, an ether bond, a disulphide bond, a thioether bond. Suitably the carrier is connected to the linker by an amide bond or an ester bond.

Therapeutic Molecule

The conjugate of the invention comprises a therapeutic molecule connected to a carrier molecule to form said conjugate, the conjugate aids transport of the therapeutic molecule to the relevant therapeutic target.

The therapeutic molecule may be any molecule for treatment of a disease. The therapeutic molecule may be selected from: a nucleic acid, peptide nucleic acid, oligonucleotide, antisense oligonucleotide (such as PNA, PMO), mRNA, gRNA (for example in the use of CRISPR/Cas9 technology), short interfering RNA, micro RNA, antagomiRNA, peptide, cyclic peptide, protein, pharmaceutical, drug, or nanoparticle.

Therapeutic proteins may be selected from: an antibody, an antigen, a VH domain, a VL domain, an scFv molecule, an Fc moiety, a receptor or extracellular domain thereof, an Fab, and a receptor binding portion of a ligand, an enzyme, a growth factor, an interleukin, a cytokine, a chemokine.

Suitably, the therapeutic molecule is a nucleic acid. Suitably the therapeutic molecule is an oligonucleotide, which may be an antisense oligonucleotide.

The therapeutic nucleic acid sequence may be selected from any that are available, for example antisense oligonucleotides for exon skipping in DMD are described in research-repository.uwa.edu.au/en/publications/antisense-oligonucleotide-induced-exon-skipping-across-the-human-, or a therapeutic antisense oligonucleotide complementary to the ISSN1 or IN7 sequence for the treatment of SMA are described in Zhou, H G T, 2013; and Hammond et al, 2016; and Osman et al, HMG, 2014. In one embodiment, the therapeutic molecule is an antisense oligonucleotide.

Suitably the antisense oligonucleotide is comprised of a phosphorodiamidate morpholino oligonucleotide (PMO).

Alternatively the oligonucleotide may be a modified PMO or any other charge-neutral oligonucleotide such as a peptide nucleic acid (PNA), a chemically modified PNA such as a gamma-PNA (Bahal, Nat. Comm. 2016), oligonucleotide phosphoramidate (where the non-bridging oxygen of the phosphate is substituted by an amine or alkylamine such as those described in WO2016028187A1, or any other partially or fully charge-neutralized oligonucleotide.

In one embodiment, the therapeutic molecule of the conjugate is an oligonucleotide complementary to the pre-mRNA of a gene target. In one embodiment, the therapeutic molecule is a siRNA.

Suitably, the oligonucleotide complementary to the pre-mRNA of a gene target gives rise to a steric blocking event that alters the pre-mRNA leading to an altered mRNA and hence a protein of altered sequence.

Suitably the steric blocking event may be exon inclusion or exon skipping. In one embodiment, the steric blocking event is exon skipping. Suitably, the therapeutic molecule is an oligonucleotide sequence for inducing exon skipping. Suitably the therapeutic molecule is an oligonucleotide sequence which may induce exon skipping of one or multiple exons.

Suitably, the therapeutic molecule is for use in the treatment of a genetic disease. Suitably, the therapeutic molecule is for use in the treatment of a hereditary genetic disease. Suitably, the therapeutic molecule is for use in the treatment of a hereditary X-linked genetic disease.

Suitably, the therapeutic molecule is for use in the treatment of a genetic neuromuscular diseases. Suitably, the therapeutic molecule is for use in the treatment of genetic diseases of the neuromuscular system. Suitably, the therapeutic molecule is for use in the treatment of hereditary genetic diseases of the neuromuscular system. Suitably, the therapeutic molecule is for use in the treatment of hereditary genetic neuromuscular diseases. Suitably, the therapeutic molecule is for use in the treatment of hereditary X-linked genetic diseases of the neuromuscular system. Suitably, the therapeutic molecule is for use in the treatment of hereditary X-linked neuromuscular diseases.

Suitably in any of the above embodiments, the therapeutic molecule is a nucleic acid, suitably an oligonucleotide, suitably an antisense oligonucleotide.

Suitably, the therapeutic molecule is for use in the treatment of DMD. Suitably the therapeutic molecule for use in the treatment of DMD is a nucleic acid, suitably an antisense oligonucleotide.

Suitably, the antisense oligonucleotide sequence is for inducing exon skipping in the dystrophin gene for use in the treatment of DMD.

In one embodiment, the antisense oligonucleotide sequence is for inducing exon skipping of a single exon of the dystrophin gene for use in the treatment of DMD. Suitably the single exon is selected from any exon implicated in DMD, which may be any exon in the dystrophin gene, such as for example, exon 45, 51 or 53. Suitably the medical use of the therapeutic molecule is the same as the medical use of the conjugate comprising said therapeutic molecule.

Therefore, suitably, any of the medical uses described herein in relation to the therapeutic molecule apply equally to the conjugate of the invention.

PMO oligonucleotides of any sequence may be purchased (for example from Gene Tools Inc, USA).

Optionally, lysine residues may be added to one or both ends of a therapeutic molecule (such as a PMO or PNA) before attachment to the peptide to improve water solubility.

Suitably the therapeutic molecule has a molecular weight of less than 5,000 Da, suitably less than 3,000 Da or suitably less than 1,000 Da.

Imaging Molecule

The conjugate of the invention may equally comprise an imaging molecule connected to a carrier molecule in order to provide said conjugate.

An imaging molecule may be any molecule that enables visualisation of the conjugate. Suitably, the imaging molecule may indicate the location of the conjugate. Suitably the location of the conjugate in vitro or in vivo. Suitably, there is provided a method of monitoring the location of a conjugate comprising an imaging molecule comprising: administering the conjugate to a subject and imaging the subject to locate the conjugate.

Examples of imaging molecules include detection molecules, contrast molecules, or enhancing molecules. Suitable imaging molecules may be selected from radionuclides; fluorophores; nanoparticles (such as a nanoshell); nanocages; chromogenic agents (for example an enzyme), radioisotopes, dyes, radiopaque materials, fluorescent compounds, and combinations thereof.

Suitably imaging molecules are visualised using imaging techniques, these may be cellular imaging techniques or medical imaging techniques. Suitable cellular imaging techniques include image cytometry, fluorescent microscopy, phase contrast microscopy, SEM, TEM, for example. Suitable medical imaging techniques include X-ray, fluoroscopy, MRI, scintigraphy, SPECT, PET, CT, CAT, FNRI, for example.

In some cases, the imaging molecule may be regarded as a diagnostic molecule. Suitably, a diagnostic molecule enables the diagnosis of a disease using the conjugate. Suitably, diagnosis of a disease may be achieved through determining the location of the conjugate using an imaging molecule. Suitably, there is provided a method of diagnosis of a disease comprising administering an effective amount of a conjugate comprising an imaging molecule to a subject and monitoring the location of the conjugate.

Suitably, the details of the linker of a conjugate comprising an imaging molecule are the same as those described above in relation to a conjugate comprising a therapeutic molecule.

Suitably the conjugate is capable of penetrating into cells and tissues, suitably into the nucleus of cells. Suitably into muscle tissues.

Conjugate

A conjugate of the invention comprises at least one carrier linked to at least one therapeutic molecule using at least one linker as defined in accordance with the first aspect.

Suitably, a linker of the invention may be used to connect a carrier to one or more therapeutic molecules in order to provide a conjugate. Suitably, therefore one or more linkers of the invention may be used to connect a carrier to one or more therapeutic molecules.

Suitably, the carrier is linked to at least one therapeutic molecule via at least one linker.

Suitably therefore, the conjugate of the invention comprises a carrier linked to at least one therapeutic molecule via at least one linker.

Suitably, the conjugate may comprise more than one linker and/or more than one therapeutic molecule.

In one embodiment, the conjugate comprises one carrier covalently linked via a linker to one therapeutic molecule. Suitably, the conjugate may comprise or consist of the following structure:

[carrier]-[linker]-[therapeutic molecule]

Suitably, the carrier may be linked to two therapeutic molecules. In such an embodiment, the conjugate may comprise a carrier covalently linked via one linker to two therapeutic molecules. Suitably, the conjugate may comprise or consist of the following structure:

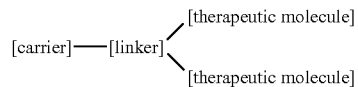

Alternatively, the conjugate may comprise a carrier covalently linked via two linkers to two therapeutic molecules. Suitably, the conjugate may comprise or consist of the following structure:

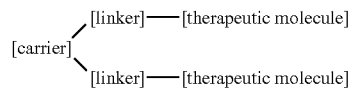

Alternatively, the conjugate may comprise or consist of the following structure:

[therapeutic molecule]-[linker]-[carrier]-[linker]-[therapeutic molecule]

Suitably the conjugate may comprise more than one carrier. Suitably each carrier is covalently linked via a linker. Suitably no two carriers are contiguous. Suitably, the conjugate may comprise two carriers. Suitably therefore the conjugate may comprise a first carrier and a second carrier, suitably linked via a first linker and a second linker. Suitably each carrier may be the same or different. Suitably each linker may be the same or different. Suitably each carrier may have a particular function. Suitably at least one carrier has the function of cell penetration. However, other carrier functions may include receptor binding, enzyme activation, enzyme inhibition, solubility modulation, half-life modulation, indication, detection, stability modulation, conformation or orientation modulation and the like.

In one embodiment, the conjugate comprises a first carrier covalently linked by a first linker to a second carrier, said second carrier being covalently linked to a second linker, and said second linker being covalently linked to a therapeutic molecule.

Suitably, the conjugate may comprise or consist of the following structure:

[carrier]-[linker]-[carrier]-[linker]-[therapeutic molecule]

In one embodiment, the first carrier has the function of cell penetration and the second carrier has the function of receptor binding.

Suitably, the conjugate of the invention may exist in any orientation. Suitably therefore the above conjugate conformations may be reversed.

Suitably, in any of the above embodiments, the or each therapeutic molecule may be replaced by an imaging molecule. Suitably, in any of the above embodiments, the conjugate may further comprise one or more imaging molecules. Suitably the or each imaging molecule may be connected to the or each therapeutic molecule, or the or each carrier. Suitably the or each imaging molecule may be connected by a further linker. Suitably the further linker may be a linker of the invention. Suitably the linker and any further linker may be the same or different.

Suitably any of the carriers listed herein may be used in a conjugate according to the invention.

Suitably, any therapeutic molecule listed herein may be used in a conjugate according to the invention.

Pharmaceutical Compositions

A conjugate of the invention may be formulated into a pharmaceutical composition for delivery to a subject in need thereof.

Suitably the pharmaceutical composition comprises a conjugate of the invention.

Suitably, the pharmaceutical composition may further comprise a pharmaceutically acceptable diluent, adjuvant or carrier.

Suitable pharmaceutically acceptable diluents, adjuvants and carriers are well known in the art.

As used herein, the phrase "pharmaceutically acceptable" refers to those ligands, materials, formulations, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier", as used herein, refers to a pharmaceutically acceptable material, formulation or vehicle, such as a liquid or solid filler, diluent, excipient, solvent or encapsulating material, involved in carrying or transporting the conjugate from one organ or portion of the body, to another organ or portion of the body. Each cell-penetrating peptide must be "acceptable" in the sense of being compatible with the other components of the composition e.g. the peptide and therapeutic molecule, and not injurious to the individual. Lyophilized compositions, which may be reconstituted and administered, are also within the scope of the present composition.

Pharmaceutically acceptable carriers may be, for example, excipients, vehicles, diluents, and combinations thereof. For example, where the compositions are to be administered orally, they may be formulated as tablets, capsules, granules, powders, or syrups; or for parenteral administration, they may be formulated as injections, drop infusion preparations, nebulizers, aerosols, or suppositories. These compositions can be prepared by conventional means, and, if desired, the active compound (i.e. conjugate) may be mixed with any conventional additive, such as an excipient, a binder, a disintegrating agent, a lubricant, a corrigent, a solubilizing agent, a suspension aid, an emulsifying agent, a coating agent, or combinations thereof.

It should be understood that the pharmaceutical compositions of the present disclosure can further include additional known therapeutic agents, drugs, modifications of compounds into prodrugs, and the like for alleviating, mediating, preventing, and treating the diseases, disorders, and conditions described herein under medical use.

Suitably, the pharmaceutical composition is for use as a medicament. Suitably for use as a medicament in the same manner as described herein for the conjugate. All features described herein in relation to medical treatment using the conjugate apply to the pharmaceutical composition.

In a further aspect, there is provided a method of treating a disease or condition in a subject in need thereof comprising administering a therapeutically effective amount of a pharmaceutical composition according to the third aspect to the subject.

Medical Uses

The conjugate of the invention may be used as a medicament for the treatment of a disease.

The medicament may be in the form of a pharmaceutical composition as defined above.

In a further aspect, a method of treating a disease or condition in a subject in need thereof is also provided, the method comprising the step of administering a therapeutically effective amount of the conjugate according to the first aspect to the subject.

Suitably, the medical treatment requires delivery of the therapeutic molecule into a tissue or a cell, suitably into the nucleus of the cell, suitably after systemic injection.

Diseases to be treated may include any disease where improved penetration of the cell and/or nuclear membrane by a therapeutic molecule may lead to an improved therapeutic effect.

Suitably, the conjugate is for use in the treatment of a disease defined by the therapeutic use of the therapeutic molecule.

Suitably, conjugates comprising linkers of the invention are suitable for the treatment of genetic diseases. Suitably conjugates comprising linkers of the invention are suitable for the treatment of hereditary genetic diseases. Suitably conjugates comprising linkers of the invention are suitable for the treatment of hereditary X-linked genetic diseases. Suitably, the conjugate is for use in the treatment of diseases of the neuromuscular system. Suitably conjugates comprising linkers of the invention are suitable for the treatment of genetic diseases of the neuromuscular system. In a suitable embodiment, there is provided a conjugate according to the first aspect for use in the treatment of genetic diseases of the neuromuscular system.

Suitably, the conjugate is for use in the treatment of hereditary genetic diseases of the neuromuscular system. Suitably, the conjugate is for use in the treatment of hereditary genetic neuromuscular diseases. Suitably, the conjugate is for use in the treatment of hereditary X-linked genetic diseases of the neuromuscular system. Suitably, the conjugate is for use in the treatment of hereditary X-linked neuromuscular diseases.

Suitably, the conjugate is for use in the treatment of diseases caused by splicing deficiencies. In such embodiments, the therapeutic molecule may comprise an oligonucleotide capable of preventing or correcting the splicing defect and/or increasing the production of correctly spliced mRNA molecules as described above. Suitably, in such embodiments, the therapeutic molecule is an antisense oligonucleotide as explained above.

Suitably the conjugate is for use in the treatment of any of the following diseases: Duchenne Muscular Dystrophy (DMD), Bucher Muscular Dystrophy (BMD), Menkes disease, Beta-thalassemia, dementia, Parkinson's Disease, Spinal Muscular Atrophy (SMA), Huntington's Disease, Hutchinson-Gilford Progeria Syndrome, Ataxia-telangiectasia, or cancer.

In one embodiment, the conjugate is for use in the treatment of DMD. In one embodiment, there is provided a conjugate according to the first aspect for use in the treatment of DMD.

Suitably, in such an embodiment, the therapeutic molecule of the conjugate is operable to restore the reading frame of the dystrophin transcript. Suitably, the therapeutic molecule of the conjugate is operable to induce the production of an internally truncated partially functional dystrophin protein. Suitably, in such an embodiment, the therapeutic molecule is an antisense oligonucleotide as described above in the relevant section. Suitably, the patient or subject to be treated may be any animal or human. Suitably, the patient or subject may be a non-human mammal. Suitably the patient or subject may be male or female. In one embodiment, the subject is male.

Suitably, the patient or subject to be treated may be any age. Suitably the patient or subject to be treated is aged between 0-40 years, suitably 0-30, suitably 0-25, suitably 0-20 years of age.

Suitably, the conjugate is for systemic administration to a subject for example by intramedullary, intrathecal, intraventricular, intravitreal, enteral, parenteral, intravenous, intraarterial, intramuscular, intratumoral, intracranial, intrastratium, intraventricular, subcutaneous oral or nasal routes.

In one embodiment, the conjugate is for administration to a subject intravenously.

In one embodiment, the conjugate is for administration to a subject by injection.

Suitably, the conjugate is for administration to a subject in a "therapeutically effective amount", by which it is meant that the amount is sufficient to show benefit to the individual. The actual amount administered, and rate and time-course of administration, will depend on the nature and severity of the disease being treated. Decisions on dosage are within the responsibility of general practitioners and other medical doctors. Examples of the techniques and protocols can be found in Remington's Pharmaceutical Sciences, 20th Edition, 2000, pub. Lippincott, Williams & Wilkins.

Exemplary doses may be between 0.01 mg/kg and 200 mg/kg, 0.05 mg/kg and 160 mg/kg, 0.1 mg/kg and 140 mg/kg, 0.5 mg/kg and 120 mg/kg, 1 mg/kg and 100 mg/kg, 2 mg/kg and 80 mg/kg, 5 mg/kg and 60 mg/kg, 10 mg/kg and 50 mg/kg or any value therebetween.

Advantageously, the dosage of the conjugates of the present invention is an order or magnitude lower than the dosage required to see any effect from the therapeutic molecule alone.

Suitably, the conjugate of the present invention may be used in in vitro methods, suitably in vitro laboratory methods. Suitably, the conjugates of the present invention may be used in an in vitro method of testing the efficacy of a candidate therapeutic molecule. Suitably the in vitro method may be an assay. For example, a conjugate of the invention may be used in a splice correction assay, an exon skipping assay, serum stability assay, a cell viability assay, or a restoration of a truncated partially functional protein assay.

Suitably, the term "in vitro" is intended to encompass experiments with cells in culture whereas the term "in vivo" is intended to encompass experiments with intact multicellular organisms.

In one embodiment, the conjugate is for administration to a subject for subsequent in vitro cellular assessment.

Toxicity

The use of the conjugates of the present invention comprising a linker as defined in the first aspect to connect a carrier molecule and a therapeutic molecule advantageously reduces the toxicity of the conjugate. Accordingly, the toxicity of the conjugates of the invention is advantageously lower than prior conjugates, such as those discussed hereinabove and demonstrated in the examples.

Suitably, after administration of the conjugates of the present invention, one or more markers of toxicity are significantly reduced compared to prior conjugates using currently available linkers.

Suitable markers of toxicity may be markers of nephrotoxicity or hepatotoxicity.

Suitable markers of toxicity include KIM-1, NGAL, BUN, creatinine, alkaline phosphatase, alanine transferase, and aspartate aminotransferase.

Suitably the level of at least one of KIM-1, NGAL, and BUN is reduced after administration of the conjugates of the present invention when compared to conjugates using currently available linkers.

Suitably the levels of each of KIM-1, NGAL, and BUN are reduced after administration of the conjugates of the present invention when compared to conjugates using currently available linkers.

Suitably, the levels of the or each marker/s is significantly reduced when compared to prior conjugates.

Suitably the levels of the or each marker/s is reduced by up to 5%, 10%, 15%, 20%, 25%, 30%, 35%, 40%, 45%, 50% after administration of the conjugates of the present invention when compared to conjugates using currently available linkers.

Suitably therefore, the conjugates of the present invention have reduced nephrotoxicity when compared to conjugates using currently available linkers.

KIM-1/creatinine levels are described as being a useful indication for toxicity of CPPs, and CPP conjugates. In particular, KIM-1/creatinine levels are useful for indicating the toxicity of arginine rich CPP conjugates; Vaidya et al., *Annu Rev Pharmacol Toxicol.* 2008, 48, 463-493, Chaturvedi et al., *Int. J. Biol. Sci.* 2009, 5, 128-134, and Zhou et al., *Sci Reports*, 2016, 6, 38930.

Suitably the level of KIM-1/creatinine is reduced after administration of the conjugates of the present invention when compared to conjugates using currently available linkers. Suitably the level of KIM-1/creatinine is significantly reduced after administration of the conjugates of the present invention when compared to conjugates using currently available linkers.

Suitably, the level of KIM-1/creatinine is reduced by up to 5%, 10%, 15%, 20%, 25%, 30%, 35%, 40%, 45%, 50% after administration of the conjugates comprising a linker of the present invention when compared to conjugates using currently available linkers.

Advantageously, the toxicity of the conjugates is significantly reduced compared to prior cell-penetrating peptides and conjugates thereof. In particular, KIM-1/creatinine is a markers of toxicity and this is significantly reduced by up to 10 times, 20 times, 30 times, 50 times, 60 times, 70 times, 80 times, 90 times, 100 times, 110 times, 120 times when using the conjugate of the invention comprising the defined linker compared to prior conjugates.

A reduction in KIM-1/creatinine levels indicates that there is a reduction in kidney injury and increase in glomerular filtration. It is believed that reduced KIM-1/creatinine levels are a consequence of reduced dedifferentiated proximal tubule epithelial cells that are often present in the kidneys after an ischemic or toxic injury (Chaturvedi et al., 2009 Int. J. Biol. Sci.). Kim-1/creatinine levels are widely used to assess the toxicity of therapeutic agents.

BRIEF DESCRIPTION OF THE DRAWINGS

Certain embodiments of the present invention will now be described with reference to the following figures and tables in which.

Figure 1:
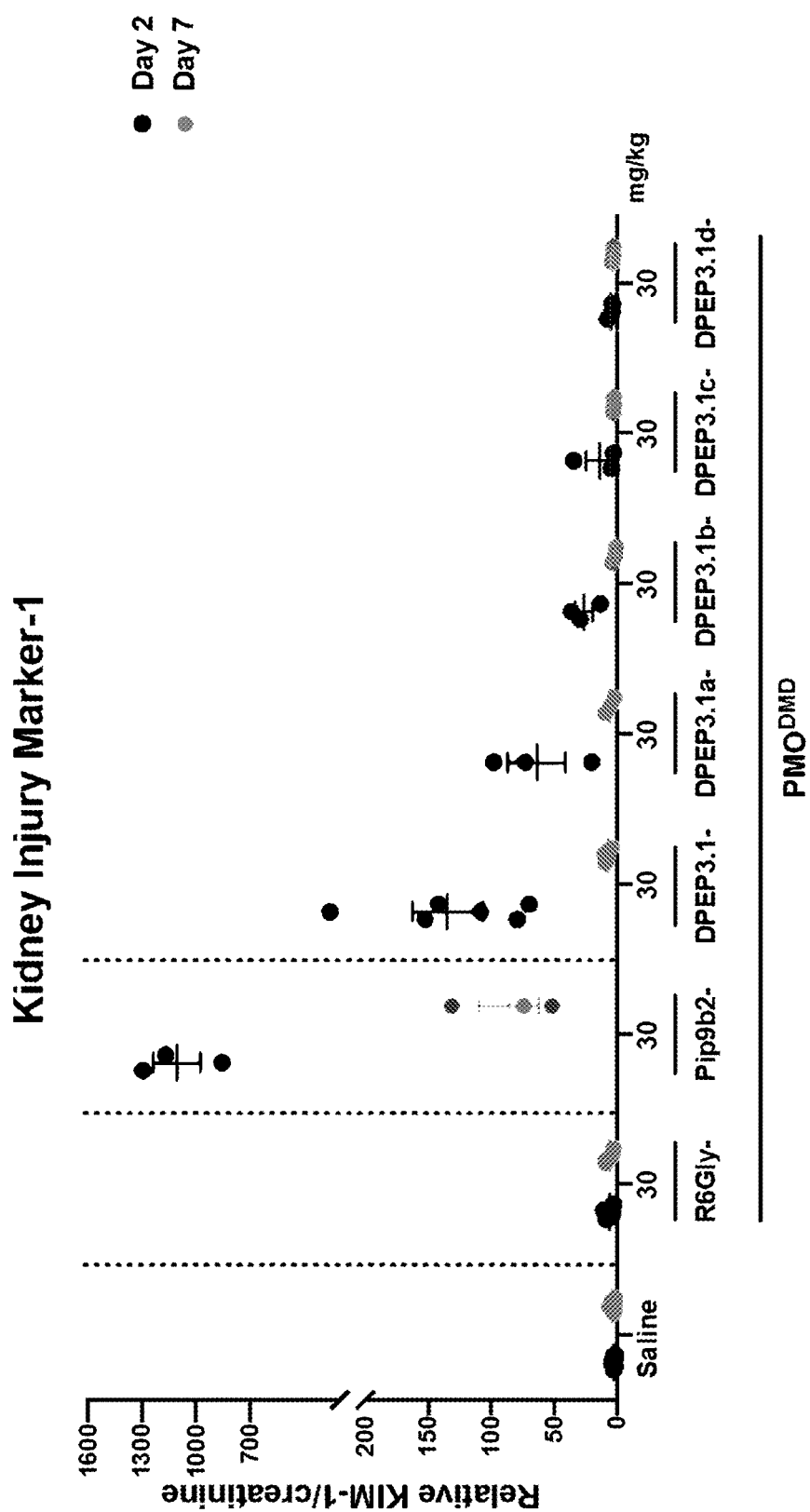
FIG. 1: shows the relative levels of urinary kidney-injury marker-1 (KIM-1) normalized to urinary creatinine measured in the urine of C57BL/6 mice on day 2 and day 7 post administration of a single dose of 30 mg/kg of DPEP3.1 peptide conjugated via different linkers to a therapeutic antisense PMO$^{DMD}$, in comparison with 0.9% saline control and currently available peptide carriers (R6Gly-(SEQ ID NO: 87) and Pip9b2-) conjugated to the same therapeutic antisense PMO$^{DMD}$ (error bars: mean with SEM, n=3-10).
Figure 2A:
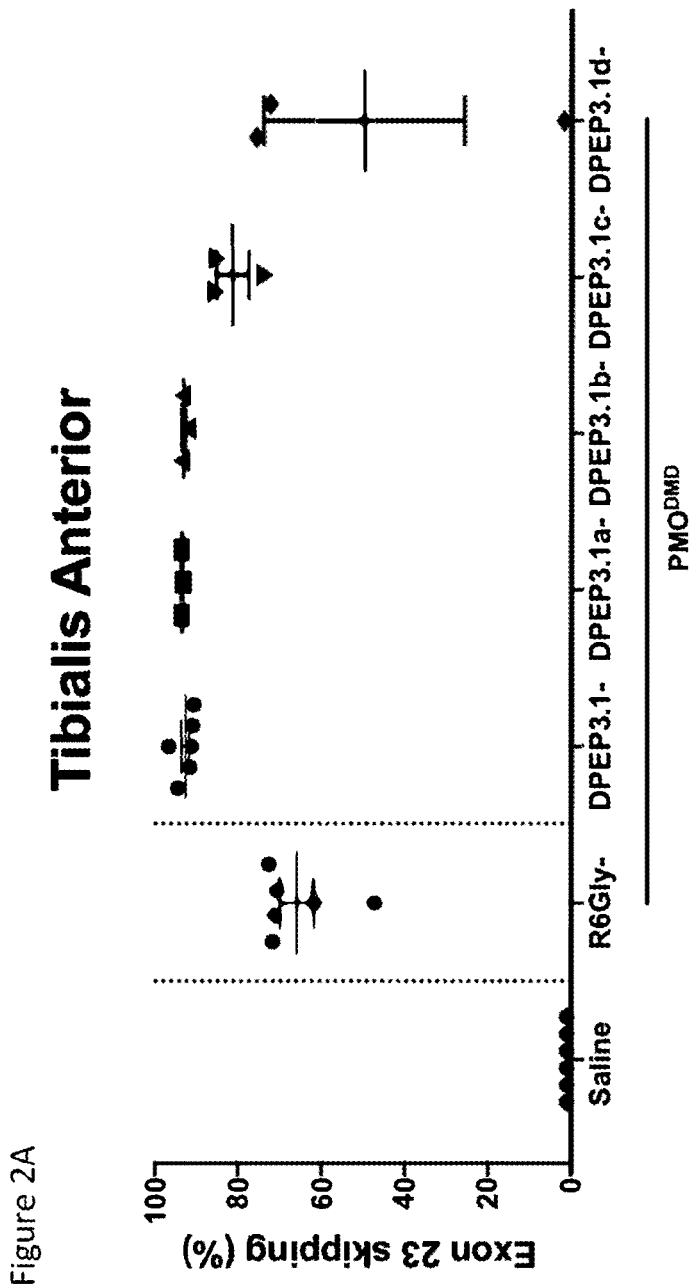
FIG. 2: shows the in vivo efficacy of DPEP3.1 peptide conjugated via different linkers to a therapeutic antisense PMO$^{DMD}$ in (A) tibialis anterior, (B) diaphragm, and (C) heart muscle following a single 30 mg/kg intravenous bolus administration in C57BL/6 mice. Efficacy was measured 7 days post administration by qPCR for exon skipping of dystrophin (exon 23). Exon skipping efficiency was used in comparison with 0.9% saline control and currently available peptide carriers (R6Gly-(SEQ ID NO: 87) and Pip9b2-) conjugated to the same therapeutic antisense PMO$^{DMD}$. Outlier for DPEP3.1d-PMO$^{DMD}$ suggests a missed injection. (error bars: mean with SEM, n=3-10).
Figure 2B:
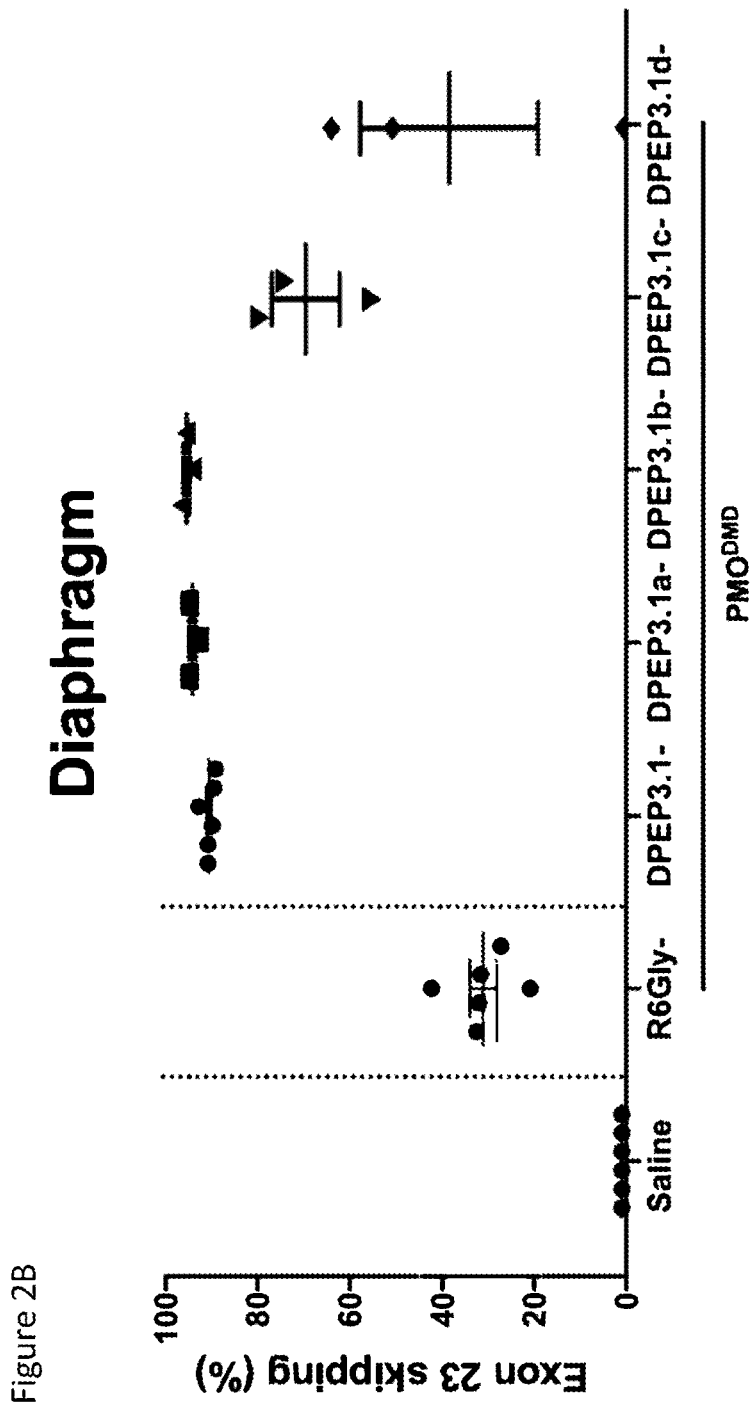
Figure 2C:
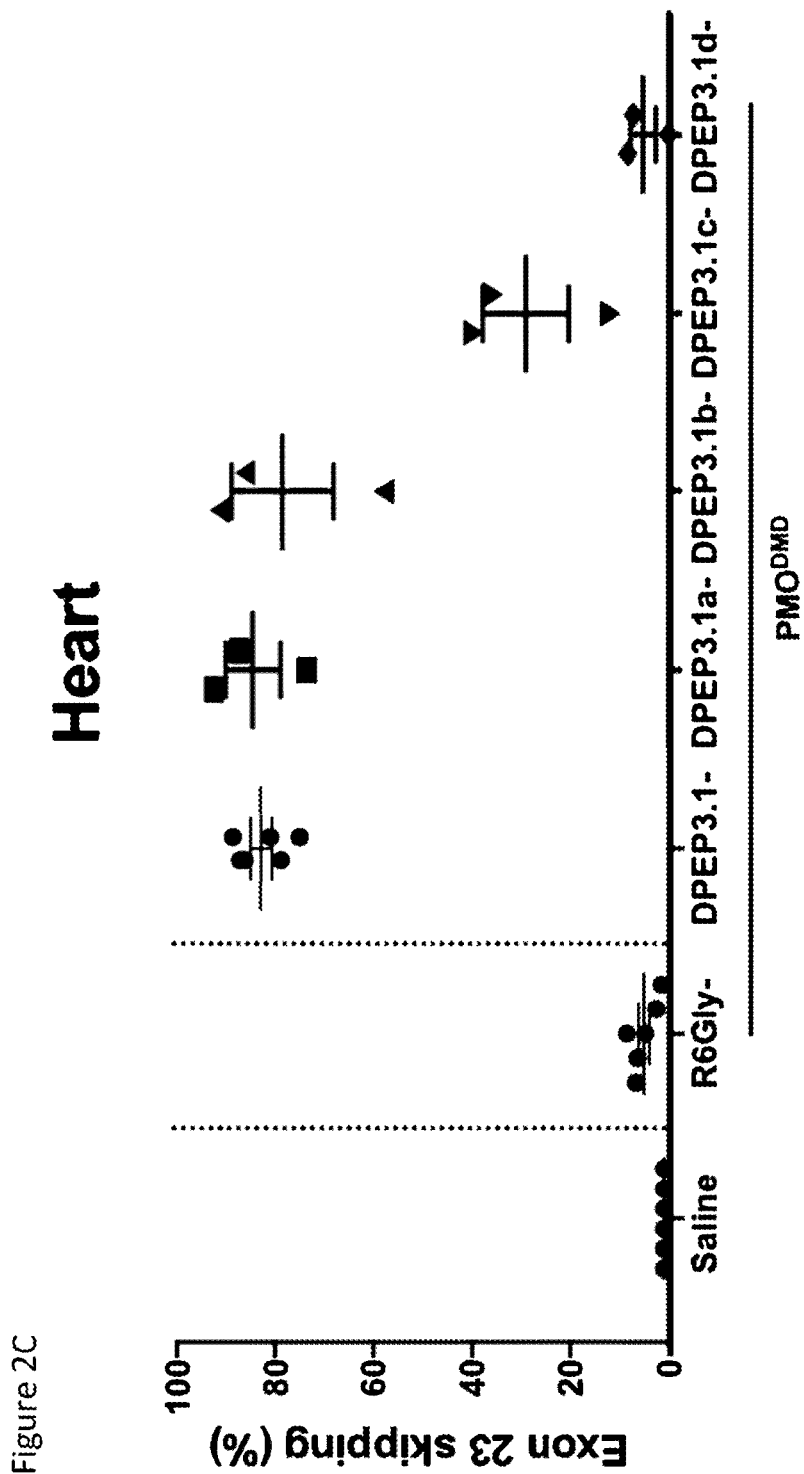
Figure 3:
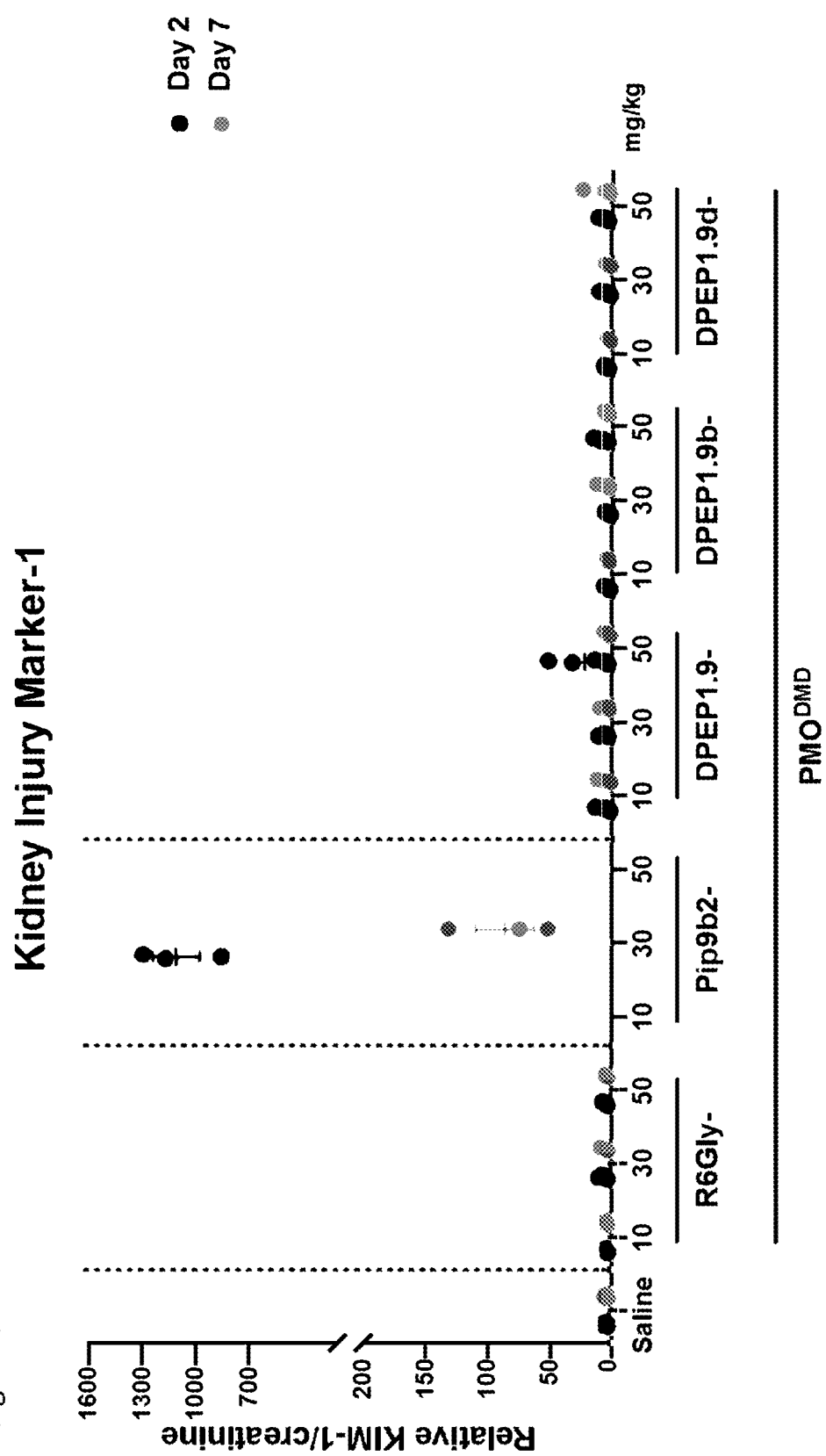
FIG. 3: shows the relative levels of urinary kidney-injury marker-1 (KIM-1) normalized to urinary creatinine measured in the urine of C57BL/6 mice on day 2 and day 7 post administration of a single dose of 10 mg/kg, 30 mg/kg or 50 mg/kg of DPEP1.9 peptide conjugated via different linkers to a therapeutic antisense PMO$^{DMD}$, in comparison with 0.9% saline control and currently available peptide carriers (R6Gly-(SEQ ID NO: 87) and Pip9b2-) conjugated to the same therapeutic antisense PMO$^{DMD}$ (error bars: mean with SEM, n=3-10).
Figure 4A:
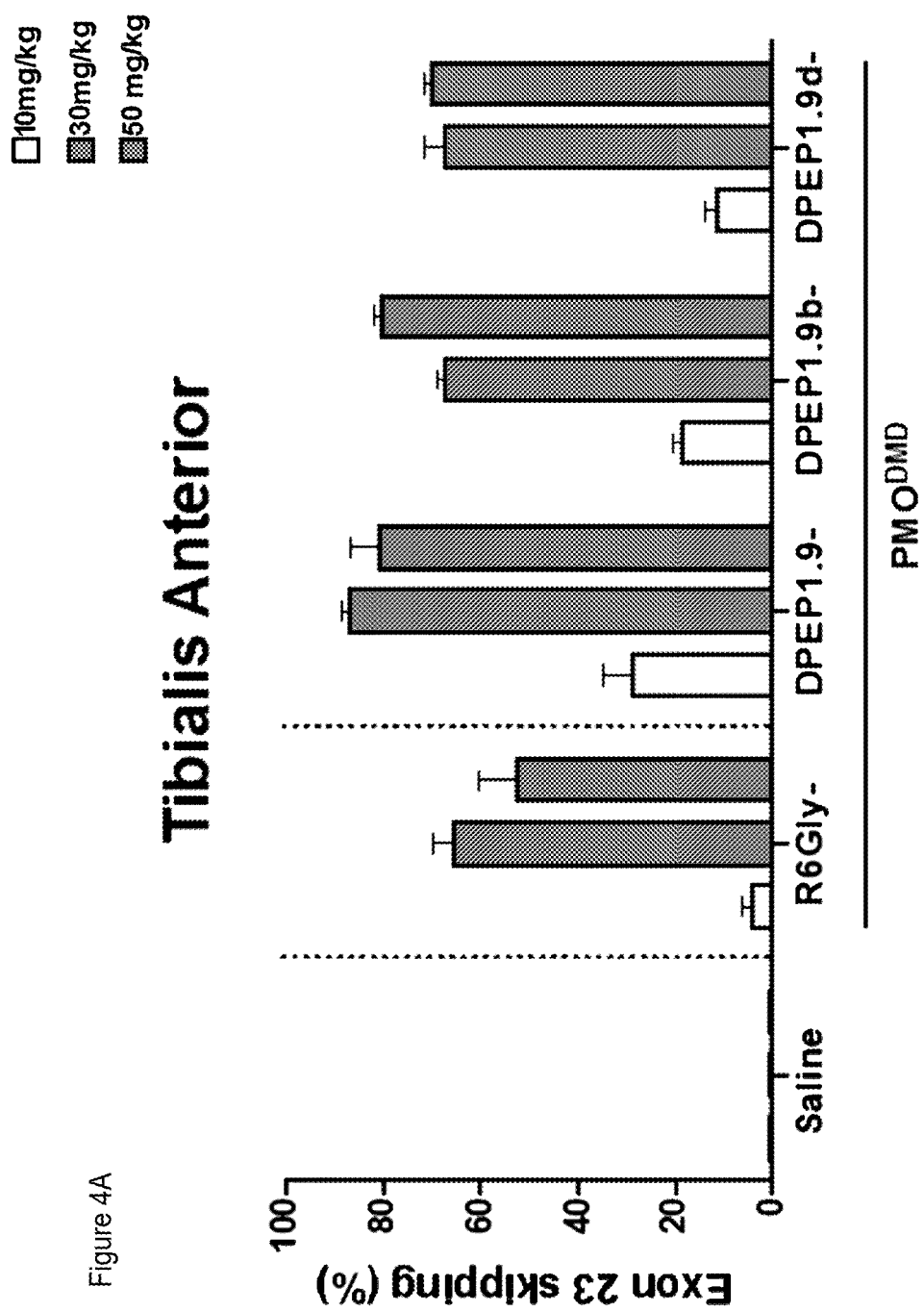
FIG. 4: shows the in vivo efficacy of DPEP1.9 peptide conjugated via different linkers to a therapeutic antisense PMO$^{DMD}$ in (A) tibialis anterior, (B) diaphragm, and (C) heart muscle following a single 10 mg/kg, 30 mg/kg or 50 mg/kg intravenous bolus administration in C57BL/6 mice. Efficacy was measured 7 days post administration by qPCR for exon skipping of dystrophin (exon 23). Exon skipping efficiency was used in comparison with 0.9% saline control and currently available peptide carriers (R6Gly-(SEQ ID NO: 87) and Pip9b2-) conjugated to the same therapeutic antisense PMO$^{DMD}$ (error bars: mean with SEM, n=3-10).
Figure 4B:
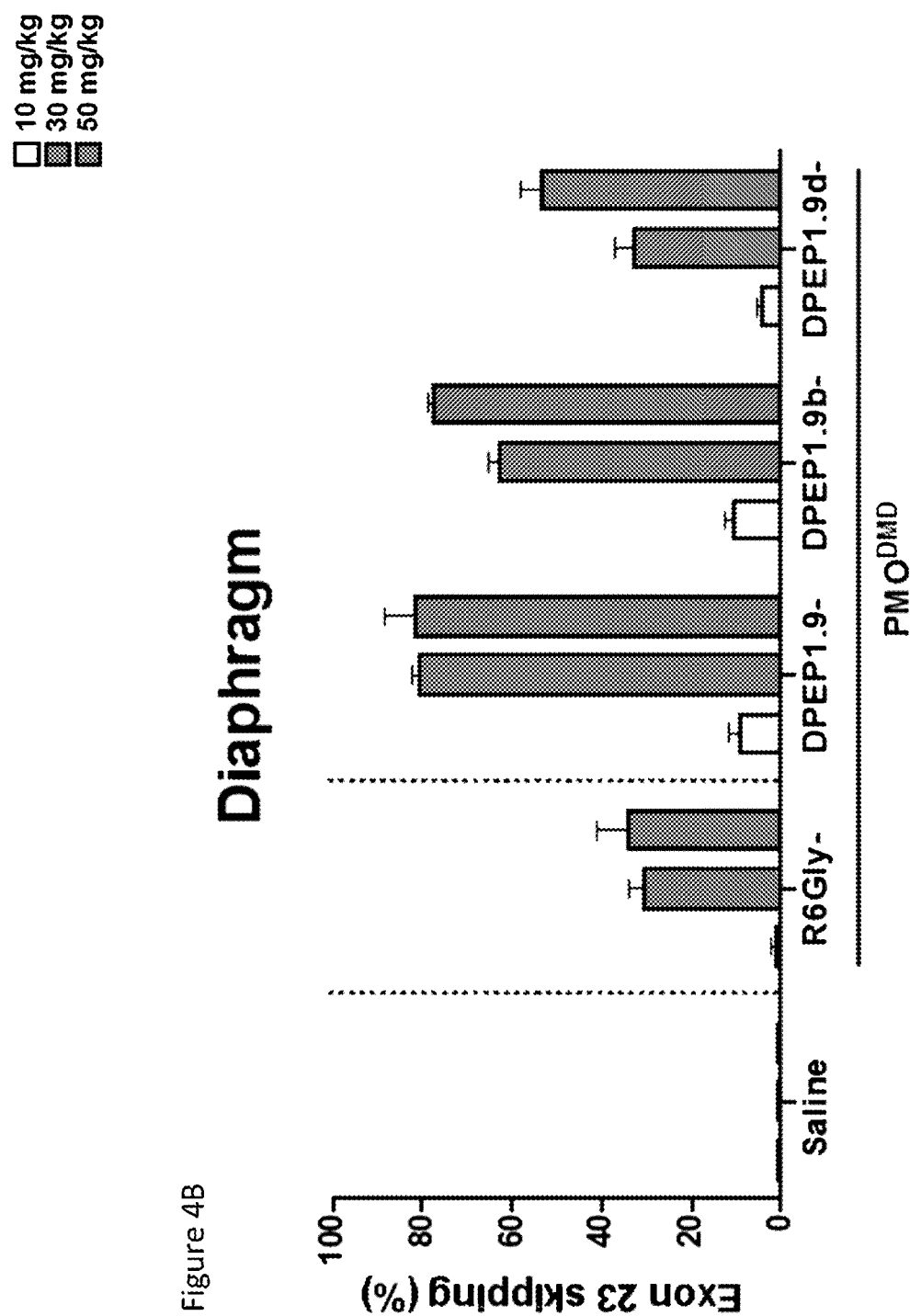
Figure 4C:
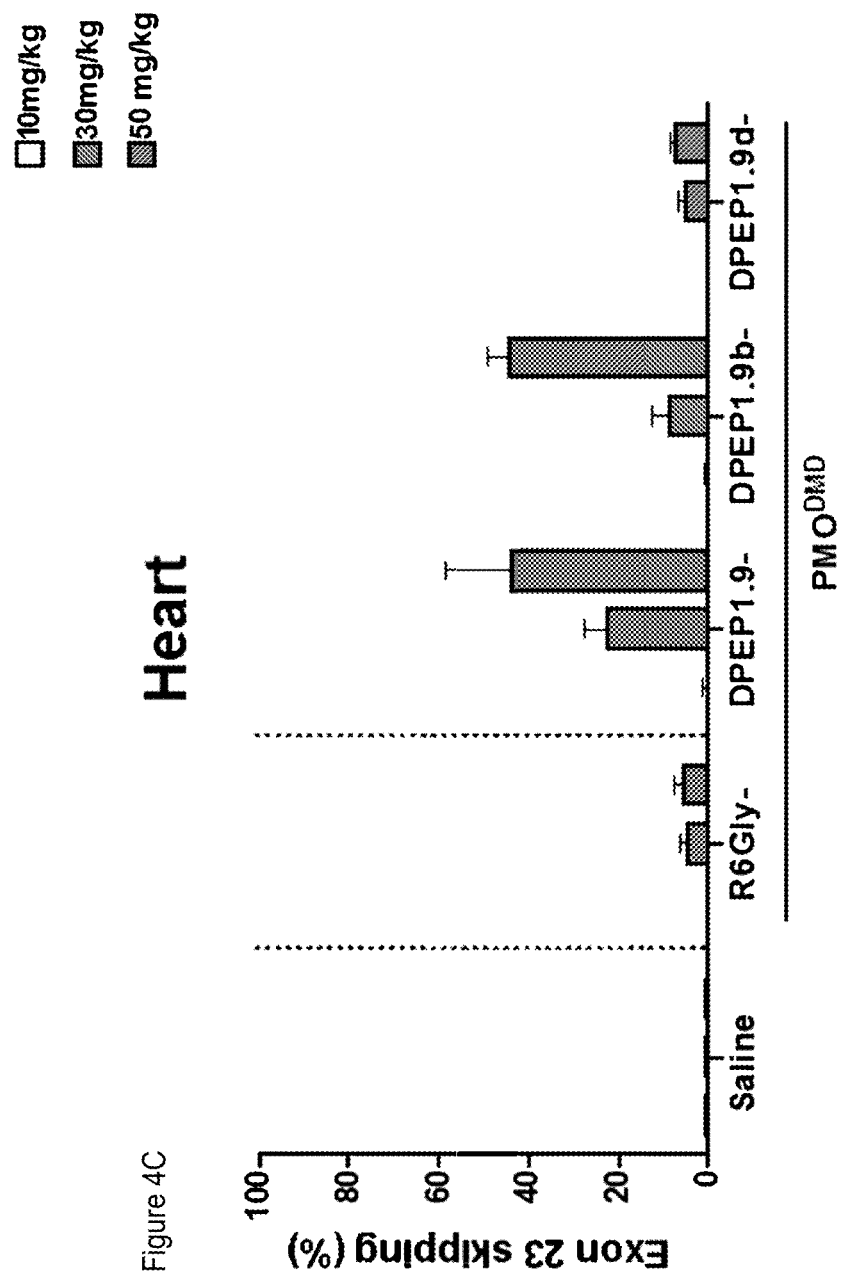
Figure 5:
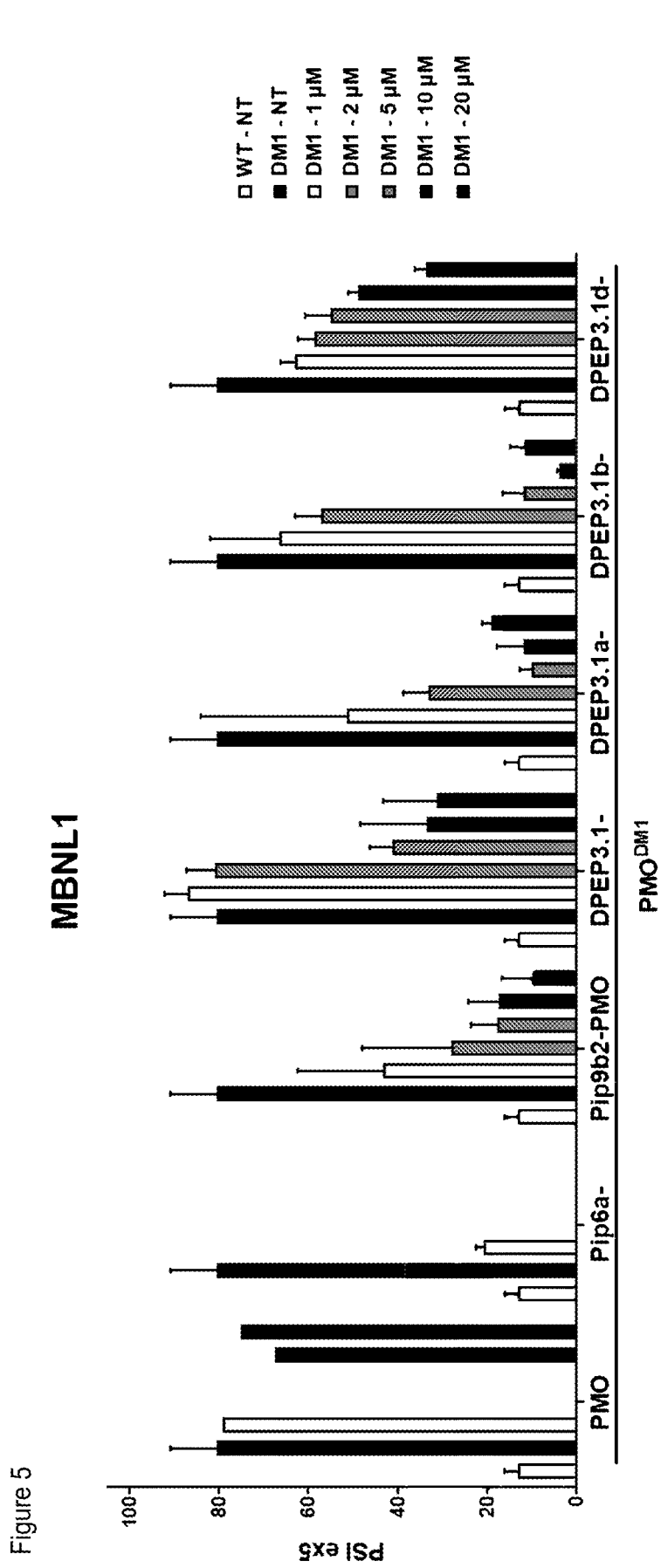
FIGS. 5 and 7: show that different DPEP1/3-[CAG]$_7$ (SEQ ID NO: 81) conjugates using linkers a, b and d at various concentrations corrected splicing defects of Mbnl1-dependent transcripts in DM1 patient myoblasts derived from DM1 patients with 2600 CTG repeats in the DMPK gene.
Figure 6:
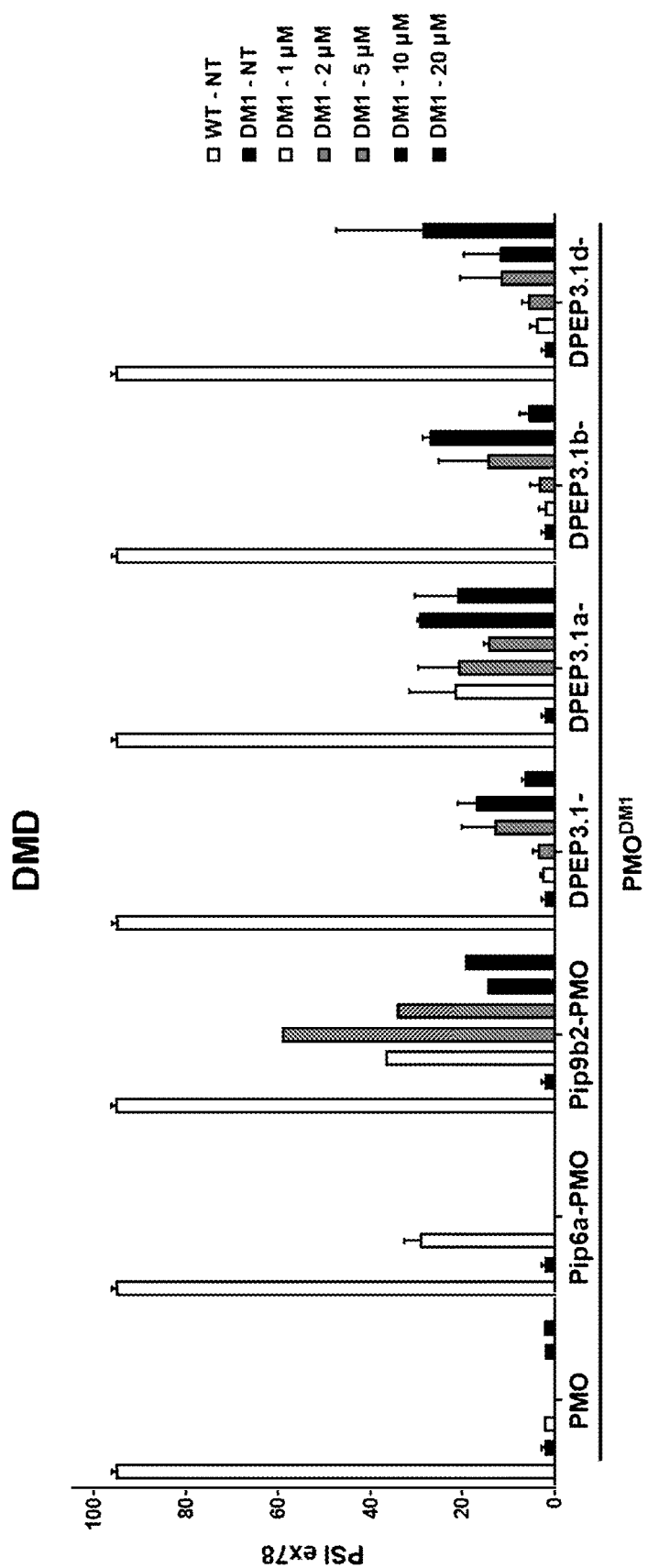
FIG. 6: shows different DPEP1/3-[CAG]$_7$ (SEQ ID NO: 81) PMO conjugates using linkers a, b and d at various concentrations correct splicing defects of DMD transcripts in vitro in DM1 patient myoblasts derived from DM1 patients with 2600 repeats in the DMPK gene at various concentrations.
Figure 7:
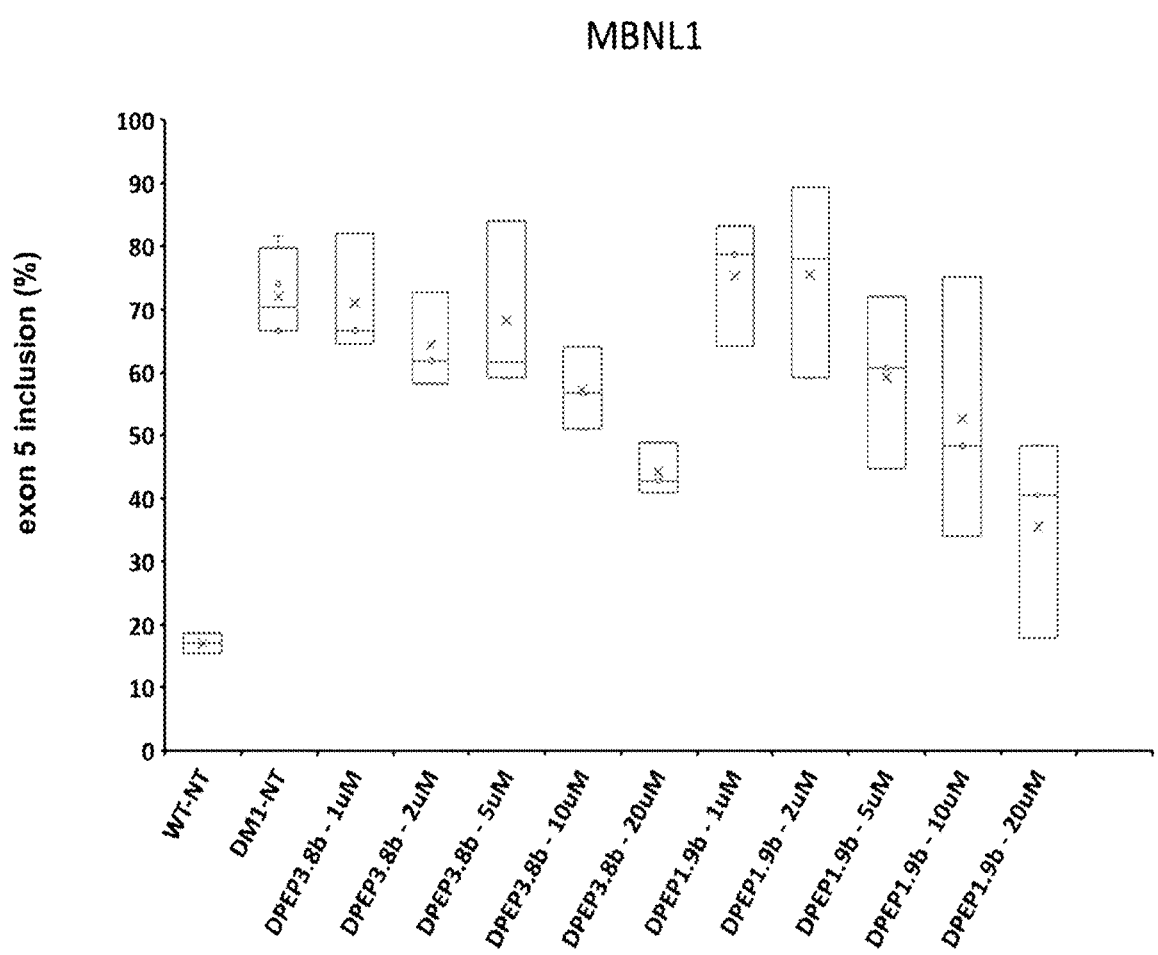
Figure 8:
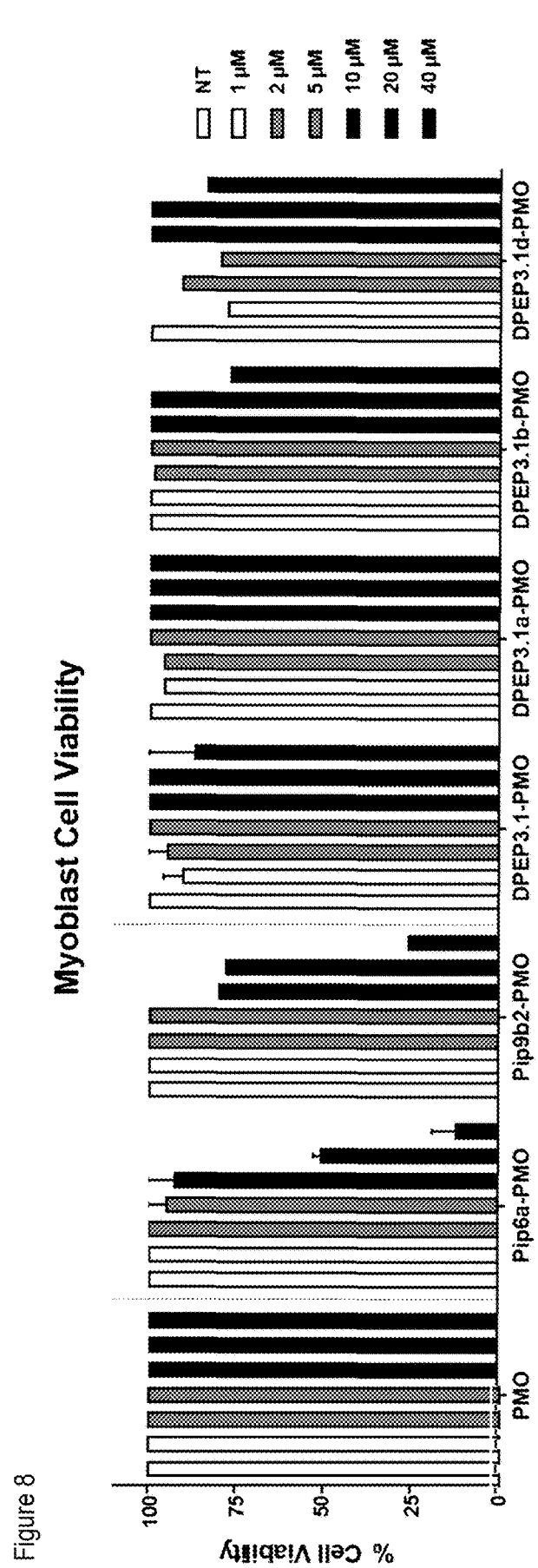
FIG. 8: shows the percentage myoblast cell viability of DM1 patient myoblasts with 2600 CTG repeats 48 hours transfected with various doses of different DPEP1/3-[CAG]$_7$ (SEQ ID NO: 81) conjugates using linkers a, b and d. The concentration of conjugate can be increased several fold from therapeutic levels without causing cell mortality.
Figure 9:
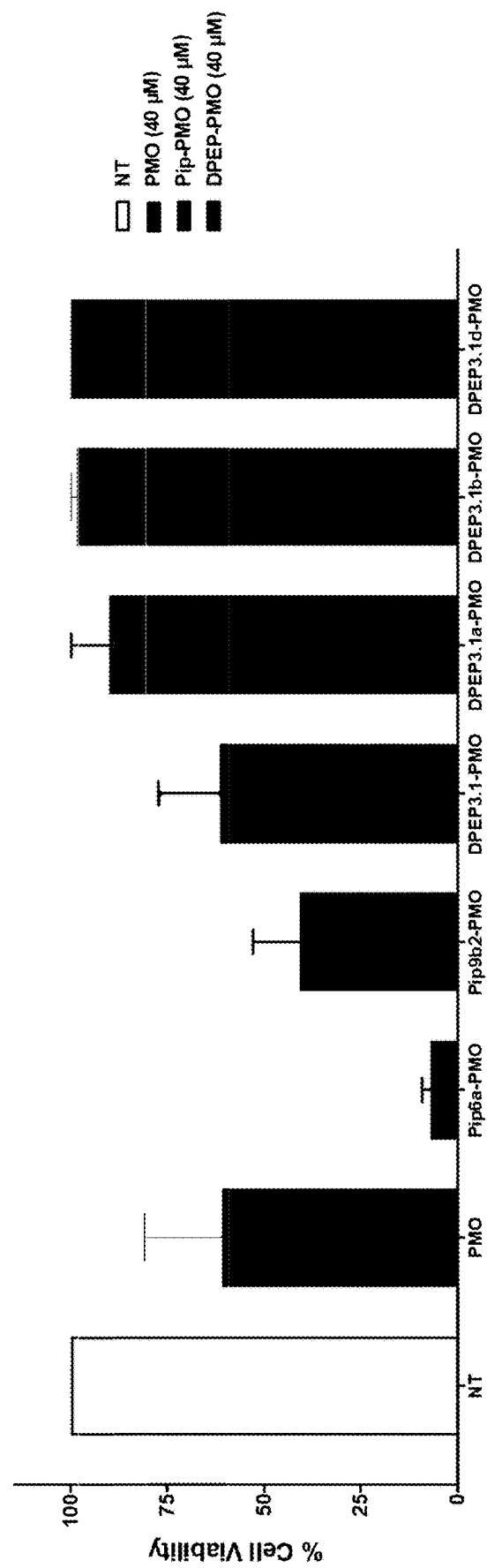
FIG. 9: shows the percentage hepatocyte cell viability transfected with 40 µM of different DPEP1/3-[CAG]$_7$ (SEQ ID NO: 81) conjugates using linkers a, b and d. The concentration of conjugate can be increased several fold from therapeutic levels without causing cell mortality contrary to Pip6a conjugates.
Figure 10:
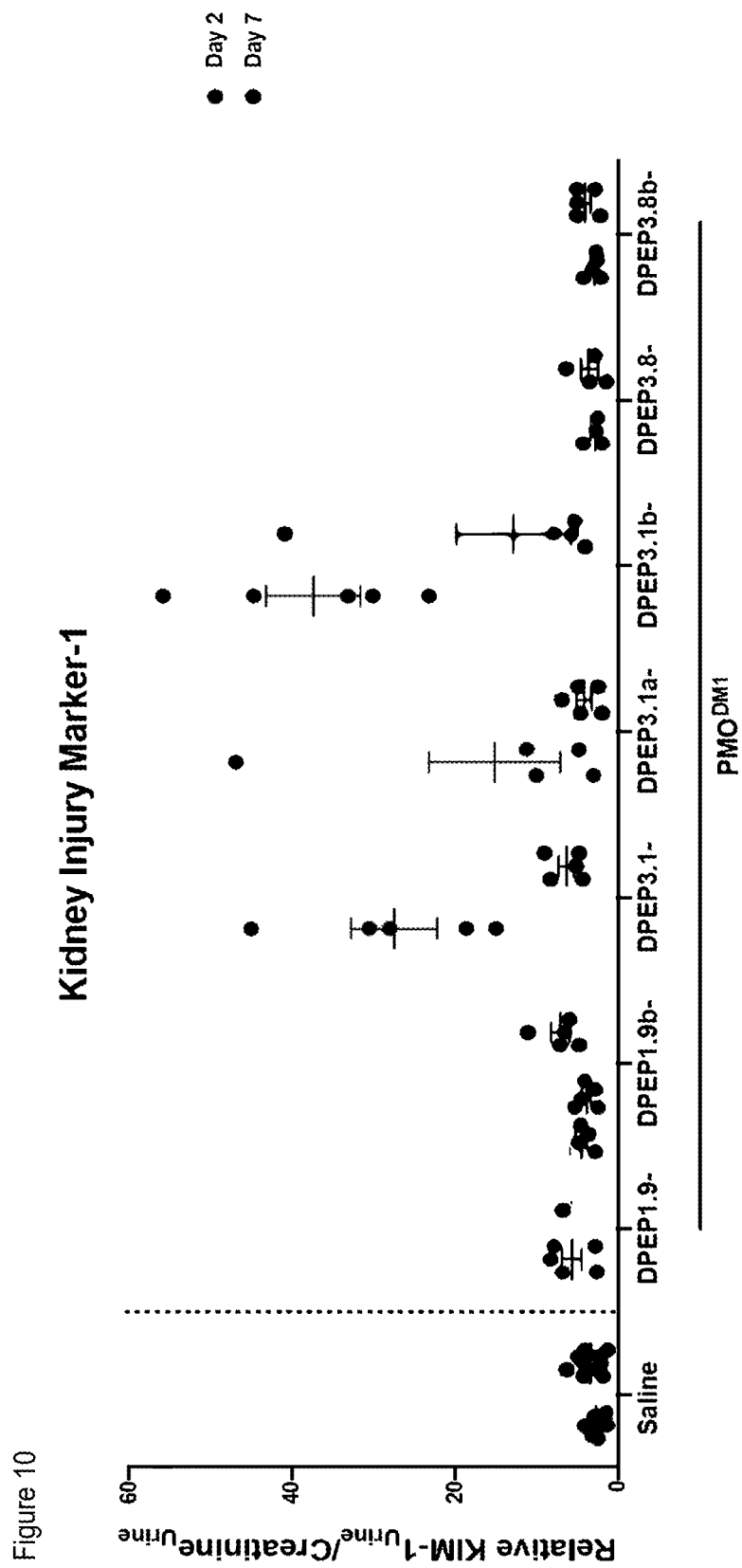
FIGS. 10 and 11: show urine toxicology markers from Day 2 and Day 7 post-injection of different DPEP1/3-[CAG]$_7$ (SEQ ID NO: 81) PMO conjugates to C57BL6 female mice measured by ELISA (R&D cat #MKM100) with samples diluted to fit within standard curve. Values were normalised to urinary creatinine levels (Harwell) to account for urine protein concentration. KIM-1 levels were similar to saline control injections in comparison to the fold increases induced by the prior Pip series of peptide carriers.
Figure 11:
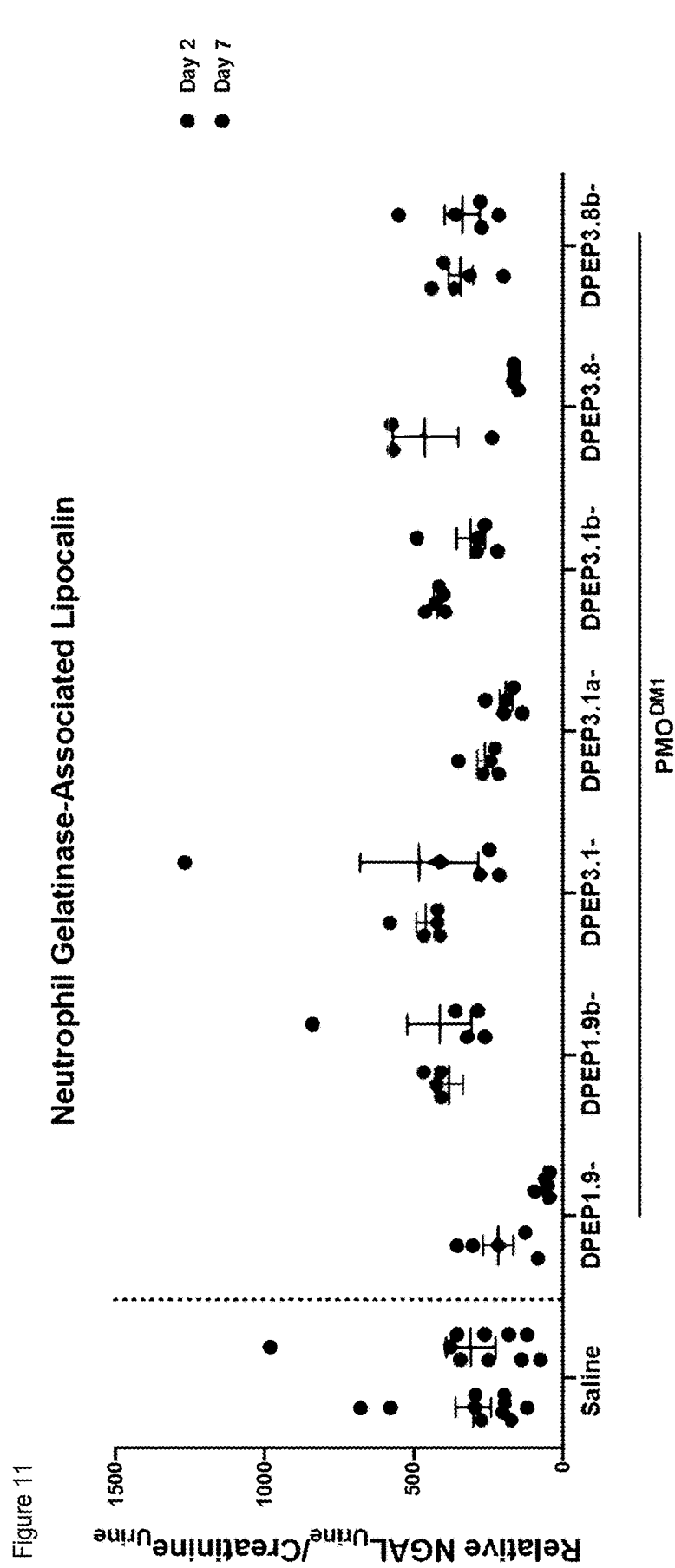
Figure 12:
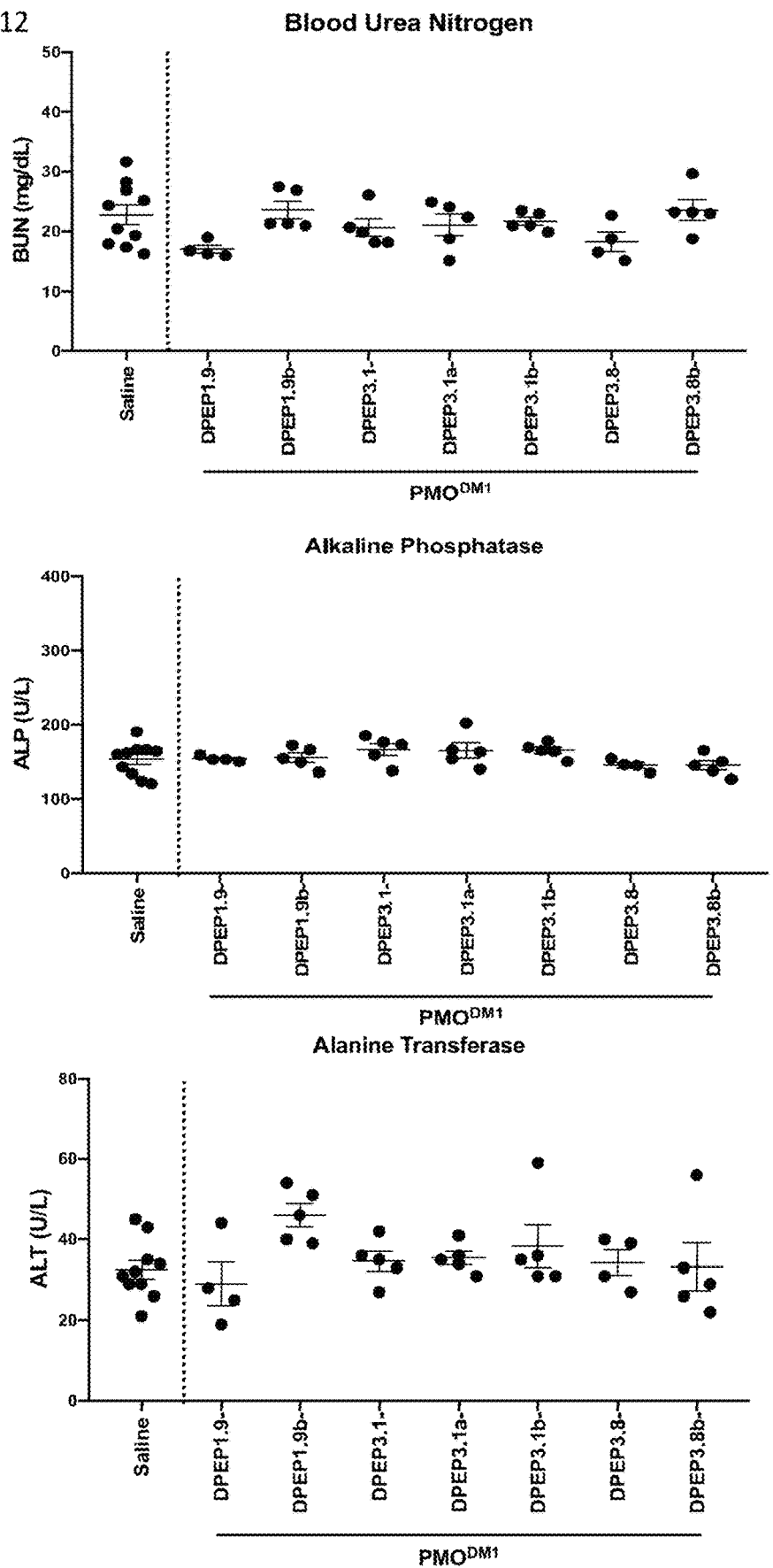
FIGS. 12 and 13: show toxicology markers assessed in serum from C57BL6 female mice (8-10 weeks age, n=5 per group), who were administered bolus IV (tail vein) injection of different DPEP1/3-[CAG]$_7$ (SEQ ID NO: 81) PMO conjugates with different linkers. At day 7 post-injection collection in serum compared to saline. All levels were similar to saline control injections at day 7 post-injection.
Figure 13:
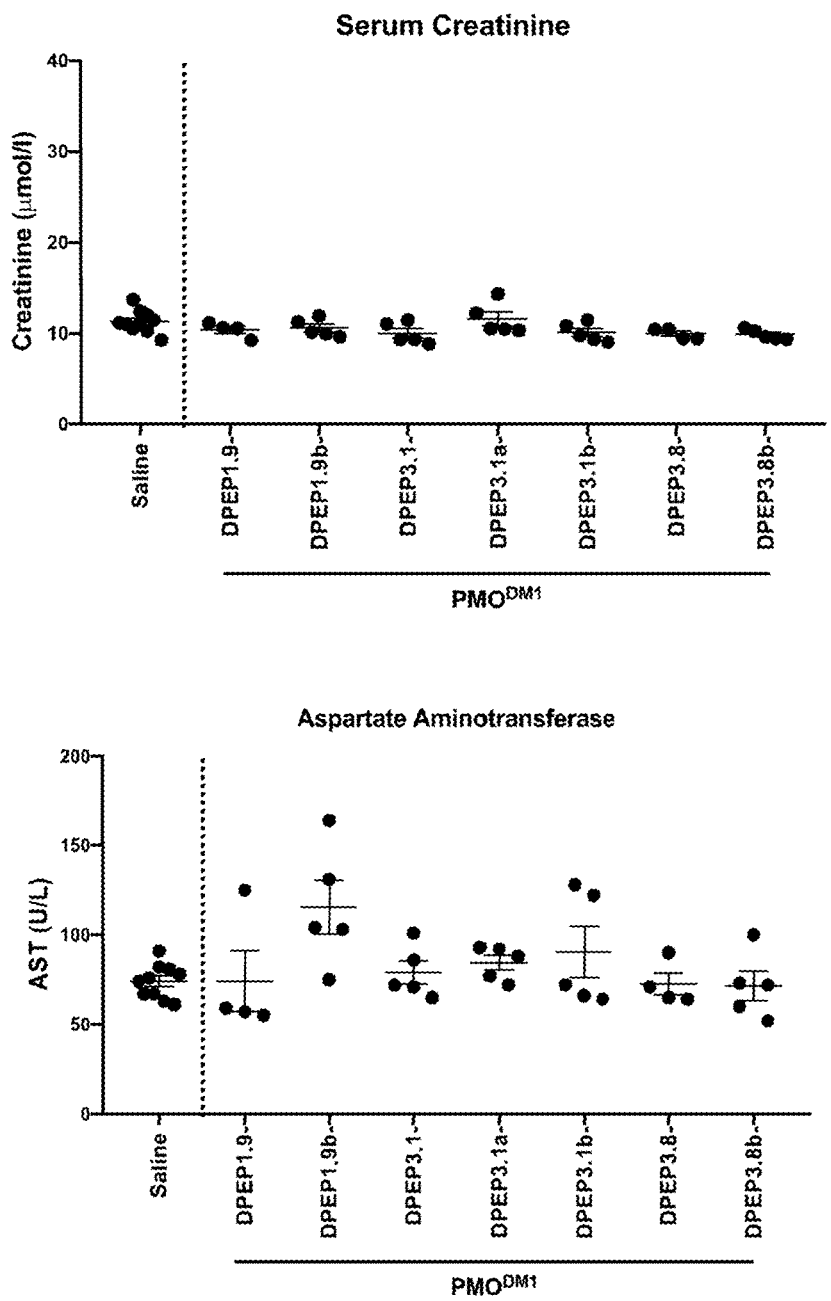

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments.

The invention extends to any novel one, or any novel combination, of the features disclosed in this specification (including any accompanying claims, abstract and drawings), or to any novel one, or any novel combination, of the steps of any method or process so disclosed. The reader's attention is directed to all papers and documents which are filed concurrently with or previous to this specification in connection with this application and which are open to public inspection with this specification, and the contents of all such papers and documents are incorporated herein by reference.

EXAMPLES

1. Material and Methods 1.1 Materials

9-Fluorenylmethoxycarbonyl (Fmoc) protected L-amino acids, benzotriazole-1-yl-oxy-tris-pyrrolidino-phosphonium (PyBOP), Rink amide resin (0.46 mmol·g$^{-1}$), and the Fmoc-B-Ala-OH preloaded Wang resin (0.19 or 0.46 mmol·g$^{-1}$) were obtained from Merck Millipore (Hohenbrunn, Germany). Tentagel® Hydroxy-trityl resin was purchased from Rapp Polymere (Tuebingen, Germany). HPLC grade acetonitrile, methanol and synthesis grade N-methyl-2-pyrrolidone (NMP) were purchased from Fisher Scientific (Loughborough, UK). Peptide synthesis grade N, N-dimethylformamide (DMF) and diethyl ether were obtained from VWR (Leicestershire, UK). Piperidine and trifluoroacetic acid (TFA) were obtained from Alfa Aesar (Heysham, England). PMOs were purchased from Gene Tools Inc. (Philomath, USA). MALDI-TOF mass spectrometry was carried out using a Voyager DE Pro BioSpectrometry (Applied Biosystems, Cheshire UK) workstation. A stock solution of 10 mg·mL$^{-1}$ of a cyano 4 hydroxycinnamic acid or sinapinic acid in 50% acetonitrile in water was used as matrix. Analytical and semi-preparative HPLC was performed on a Varian 940-LC HPLC System (Yarnton, UK). DMEM medium (31966047), fetal bovine serum (FBS) (10270106), antibiotic antimycotic solution (A5955), ethidium bromide (15585011), 2× ReddyMix PCR Master Mix (AB0575DCLDB), M-MLV first-strand synthesis system (28025013) and TRIzol® reagent (15596026) were purchased from ThermoFisher Scientific. RealTime-Glo™ MT Cell Viability Assay (G9711), Maxwell® 16 Total RNA Purification Kit (AS1050) were purchased from Promega. Myoblast cells were cultured with PromoCell's skeletal muscle cell growth media kit (C-23160). Insulin (91077C) and agarose (A9539) were from SigmaAldrich. DNA Marker-HyperLadder® 50 bp (BIO-33039) was from Bio-Line Reagents. All primers were ordered through IDT. For urine collection mice were singly house in metabolic cages from Tecniplast, UK and urinary biomarker ELISA for kidney injury marker-1 (KIM-1) (MKM100) was from R&D. All other reagents were obtained from Sigma-Aldrich (United Kingdom) unless otherwise stated.

1.2 Synthesis of Peptide-PMO Conjugates

1.2.1 Synthesis of Peptide Variants Via Microwave Synthesiser

Peptides were synthesized on a 100 μmol scale using a CEM Liberty Blue™ microwave Peptide Synthesizer (Buckingham, UK) and Fmoc chemistry following manufacturer's recommendations. Peptides synthesised with glutamic acid, or succinic acid as linker were synthesised with a Rink amide resin to afford an amide on the carboxyl terminus of the peptide after TFA cleavage. Peptides with a β-alanine linker were synthesised using a preloaded Wang resin. A full list of the peptides synthesised with their methods and linkers are summarised in Table 1. The side chain protecting groups used were labile to TFA treatment and the peptide was synthesized using a 5-fold excess of Fmoc-protected amino acids (0.25 mmol) that were activated using PyBOP (5-fold excess) in the presence of DIPEA. Piperidine (20% v/v in DMF) was used to remove N-Fmoc protecting groups. The coupling was carried out once at 75° C. for 5 min at 60-watt microwave power except for arginine residues, which were coupled twice each. Each deprotection reaction was carried out at 75° C. twice, once for 30 sec and then once for 3 min at 35-watt microwave power. Once the synthesis was complete, the resin was washed with DMF (3×50 mL) and the N-terminus of the solid phase bound peptide was acetylated with acetic anhydride in the presence of DIPEA at room temperature for 15 min. After acetylation of the N-terminus, the peptide resin was washed with DMF (3×20 mL) and DCM (3×20 mL). For DPEP peptides with succinic acid on the N-terminus, acetylation of the N-terminus was not performed. Instead, the free N-terminus of the peptide was treated with succinic anhydride in the presence of DIPEA at room temperature for 30 min followed by washing with DMF (3×20 mL). For DPEP peptides carrying glutamic acid on the N-terminus as a linker, the N-terminus was acetylated as described, but attachment of the PMO was performed on the side chain carboxylic group.

1.2.2 Synthesis of Peptide Variants Via Intavis Multipep Synthesiser

Peptides synthesised with a γ-aminobutyric acid linker were synthesised on a Tentagel Cl-trityl resin at room temperature using an Intavis Multipep Synthesiser and Fmoc chemistry following manufacturer's recommendations. The Tentagel® Cl-trityl resin was prepared from Tentagel® Hydroxy-trityl resin using acetyl chloride as per manufacturer's recommendations. Briefly, the resin (1 g) was washed with DMF (2×10 mL), dry DCM (3×10 mL) and dry toluene (3×10 mL) transferred to a round bottom tube fitted with a condenser. Enough toluene was added to cover the resin and then acetyl chloride was added dropwise (1 mL·g$^{-1}$ of resin, total volume 1 mL) and the mixture was heated for 3 h at 60-70° C. with gentle stirring. Upon completion, the resin was allowed to cool to room temperature and then washed thoroughly with toluene (5×15 mL), DMF (5×15 mL) and finally dry DCM (3×15 mL). The resin was then loaded with Fmoc-γ-aminobutyric acid (3 equivalents) in DCM with DIEA (8 equivalents) for 15 min, after which additional DIEA (4 equivalents) was added and the reaction was allowed to mix for a total of 1 h. After 1 h, resin was then capped with MeOH (0.8 mL·g$^{-1}$) for 15 min and then washed with DMF (5×10 mL) and DCM (5×15 mL). The yield and loading of the resin was performed by Fmoc determination on a UV/visible spectrophotometer at 304 nm to be 0.41 mmol·g$^{-1}$ and the resin was used immediately.

Typically, peptides were synthesised on a 100 μmol scale using standard Fmoc amino acids with side chain protecting groups labile to TFA and the peptide was synthesized using a 5-fold excess of Fmoc-protected amino acids (0.50 mmol) that were activated using PyBOP (5-fold excess) in the presence of 4-methylmorpholine. Double coupling steps were used followed by acetic anhydride capping after each step. Piperidine (20% v/v in DMF) was used to remove N-Fmoc protecting groups. Each deprotection cycle was carried out at room temperature twice, each for 10 min. Once synthesis was complete, the resin was washed with DMF (3×50 mL) and the N-terminus of the solid phase bound peptide was acetylated with acetic anhydride in the presence of DIPEA at room temperature for 15 min. After acetylation of the N-terminus, the peptide resin was washed with DMF (3×20 mL) and DCM (3×20 mL).

TABLE 1

Synthesis method and resins used of the peptides with different linkers and the resulting C-terminal modification.

| DPEP peptide | Linker | Location of linker with respect to peptide | Modification of C-term | Resin used | Synthesis method |
|---|---|---|---|---|---|
| DPEP1.9 | β-Ala | C-terminus | Carboxylic acid | Pre-loaded Wang resin | microwave synthesiser |
| DPEP1.9b | Glu | C-terminus | Amide | Rink amide resin | microwave synthesiser |
| DPEP1.9d | Glu | N-terminus | Amide | Rink amide resin | microwave synthesiser |

TABLE 1-continued

Synthesis method and resins used of the peptides with different linkers and the resulting C-terminal modification.

| DPEP peptide | Linker | Location of linker with respect to peptide | Modification of C-term | Resin used | Synthesis method |
|---|---|---|---|---|---|
| DPEP3.1 | β-Ala | C-terminus | Carboxylic acid | Pre-loaded Wang resin | microwave synthesiser |
| DPEP3.1a | γ-Ab | C-terminus | Carboxylic acid | Cl-Trityl tentagel resin | Intavis Multipep |
| DPEP3.1b | Glu | C-terminus | Amide | Rink amide resin | microwave synthesiser |
| DPEP3.1c | Succ | N-terminus | Amide | Rink amide resin | microwave synthesiser |
| DPEP3.1d | Glu | N-terminus | Amide | Rink amide resin | microwave synthesiser |
| DPEP3.8b | Glu | C-terminus | Amide | Rink amide resin | microwave synthesiser |

1.2.3 Cleavage from the Solid Support and Purification of the Peptide Via Semi-Prep HPLC The peptide was cleaved from the solid support by treatment with a cleavage cocktail consisting of TFA/H$_2$O/triisopropylsilane (TIPS) (95:2.5:2.5, 10 mL) for 3 h at room temperature. Excess TFA was removed by sparging with nitrogen. The cleaved peptide was precipitated via the addition of ice-cold diethyl ether and centrifuged at 3000 rpm for 5 min. The crude peptide pellet was washed thrice with cold diethyl ether (3×40 mL) and purified by RP-HPLC using a Varian 940-LC HPLC System fitted with a 445-LC Scale-up module and 440-LC fraction collector. Peptides were purified by semi-preparative HPLC on an RP-C18 column (10×250 mm, Phenomenex Jupiter) using a linear gradient of CH$_3$CN in 0.1% TFA/H$_2$O (0-99%, 0.1% TFA in CH$_3$CN) with a flow rate of 15 mL·min$^{-1}$ over 15 min. Detection was performed at 220 nm and 260 nm.

ID NO:74) was used. The peptide was conjugated to the 3'-end of the PMO through either its C-terminal carboxyl group or N-terminal amino group depending on the linker attachment site. This was achieved using 2.3 and 2-fold equivalents of PyBOP and HOAt in NMP respectively in the presence of 2.3 equivalents of DIPEA over peptide and a 2.5-fold excess of peptide over PMO dissolved in DMSO. In general, to a solution of peptide (10 mol) in N-methylpyrrolidone (NMP, 100 L) were added PyBOP (76.6 μL of 0.3 M in NMP), HOAt in (66.7 μL of 0.3 M NMP), DIPEA (4.0 L) and PMO (4 μmol, 400 μL of 10 mM in DMSO). The mixture was left for 2 h at 40° C. and the reaction was quenched by the addition of H$_2$O (1 mL). The reaction was purified on a cation exchange chromatography column (Resource S 6 mL column, GE Healthcare) using a linear gradient of sodium chloride (0 to 1 M) in sodium phosphate buffer (25 mM, pH 7.0) containing 20% CH$_3$CN at a flow rate of 6 mL·min$^{-1}$. The removal of excess salts from the

TABLE 2

Peptide sequences as synthesised for testing in the examples with varying linkers and attachment points. $^a$Linkers are listed as their single amino acid abbreviations, $^b$Linker attachment is with respect to the peptide, C-term = carboxyl terminus, N-term = amino terminus. The Sequence ID number refers to the sequence of the peptide without any additional N and C terminal modifications such as linkers.

| Peptide number | Sequence ID NO. incorporated | Sequence tested (with additional C and N terminal modifications)$^a$ | Linker/ attachment point$^b$ | Yield |
|---|---|---|---|---|
| DPEP1.9 | 70 | Ac-RBRRBRFQILYBRBR-B | B (C-term) | 38% |
| DPEP1.9b | 70 | Ac-RBRRBRFQILYBRBR-E | E (C-term) | 40% |
| DPEP1.9d | 70 | E-RBRRBRFQILYBRBR-NH$_2$ | E (N-term) | 36% |
| DPEP3.1 | 71 | Ac-RBRRBRRFQILYRBHBH-B | B (C-term) | 34% |
| DPEP3.1a | 71 | Ac-RBRRBRRFQILYRBHBH-Ab | Ab (C-term) | 37% |
| DPEP3.1b | 71 | Ac-RBRRBRRFQILYRBHBH-E | E (C-term) | 34% |
| DPEP3.1c | 71 | Succ-RBRRBRRFQILYRBHBH-NH$_2$ | Succ (N-term) | 26% |
| DPEP3.1d | 71 | E-RBRRBRRFQILYRBHBH-NH$_2$ | E (N-term) | 34% |
| DPEP3.8b | 73 | Ac- RBRRBRFQILYRBHBH-E | E (C-term) | 34% |

1.2.4 Synthesis of Peptide-PMO Conjugates

A 25-mer PMO antisense sequence for mouse dystrophin exon-23 (GGCCAAACCTCGGCTTACCTGAAAT (SEQ peptide-PMO (P-PMO) conjugate was afforded through the filtration of the fractions collected after ion exchange using an Amicon® ultra-15 3K centrifugal filter device. The conjugate was lyophilized and analysed by MALDI-TOF.

The conjugates were dissolved in sterile water and filtered through a 0.22 m cellulose acetate membrane before use. The concentration of P-PMO was determined by the molar absorption of the conjugates at 265 nm in 0.1 M HCl solution. Overall yields (Table 3) were 26-64% based on P-PMO.

TABLE 3

Yields of P-PMO conjugates synthesized on larger scale for in vivo analysis (the yields are calculated via UV-Vis spectroscopy and are based on the extinction coefficient of the PMO). The purity for the P-PMOs is greater than 95% as ascertained by normal phase HPLC at 220 nm and 260 nm. [a]The PMO used to conjugate to the peptide has the following sequence, 5'-GGCCAAACCTCGGCTTACCTGAAAT-3' (SEQ ID NO: 74). [b]The attachment of the PMO is given here in bold italics, the linker in brackets.

| P-PMO conjugates[a] | Conjugate Sequence[b] | Yield | SEQ ID NO. |
|---|---|---|---|
| DPEP1.9b | Ac-RBRRBRFQILYBRBR-(E)-*PMO* | 39% | 88 |
| DPEP1.9d | *PMO*-(E)-RBRRBRFQILYBRBR-NH$_2$ | 29% | 89 |
| DPEP3.1a | Ac-RBRRBRRFQILYRBHBH-(Ab)-*PMO* | 26% | 71 |
| DPEP3.1b | Ac-RBRRBRRFQILYRBHBH-(E)-*PMO* | 27% | 90 |
| DPEP3.1c | *PMO*-(Succ)-RBRRBRRFQILYRBHBH-NH$_2$ | 64% | 71 |
| DPEP3.1d | *PMO*-(E)-RBRRBRRFQILYRBHBH-NH$_2$ | 48% | 91 |
| DPEP3.8b | Ac-RBRRBRFQILYRBHBH-(E)-*PMO* | 49% | 92 |

The following comparison conjugates were also synthesised/obtained and the same PMO was conjugated to the peptide using comparative linkers.

TABLE 4 comparison peptides

| Peptide class | Peptide Name | Sequence (N→C terminal) with linker | SEQ ID NO. Incorporated | Linker | PMO attachment site |
|---|---|---|---|---|---|
| Comparison peptide | R6Gly | Ac-RRRRRR-(G) | 38 | Glycine | Terminal extremity of the peptide |
| | Pip9b2 | Ac-RXRRBRRFQILYRB RXR-(B) | 44 | β-Alanine | Terminal extremity of the peptide |
| | Pip6a | Ac-RXRRBRRXR-YQFLI-RXRBRXR-(B) | 82 | β-Alanine | Terminal extremity of the peptide |

1.3 Quantification and Reconstitution of P-PMO

The P-PMO was dissolved in RNase-free water. From this solution, an aliquot was diluted 100 fold in 0.1 M HCl and measured via UV-VIS at 265 nm. The concentration was determined using the Beer-Lambert law:

$$c = \frac{A_{265}}{\varepsilon_{265} l}$$

Prior to use, the P-PMO was thawed to room temperature (if frozen beforehand) and vortexed briefly, then incubated for 30 min at 37° C. The P-PMO aliquot was subsequently sonicated for 5 min in a sonicator bath. Finally, the P-PMO was briefly vortexed and pulse spun.

The injection solution was prepared by combining the P-PMO at the desired treatment concentration diluted in RNase free water and 9% saline (to a final concentration of 0.9% saline).

1.4 In Vivo P-PMO Treatment Assessment

1.4.1 Systemic Administration of P-PMO

All animal experiments were conducted in the Biomedical Sciences Unit, University of Oxford, under Home Office Project Licence (UK) authorisation and in accordance with The Animals (Scientific Procedures) Act 1986 and institutional ethical review. Mice were housed in a specific pathogen free disease facility; the environment was temperature and humidity controlled with a 12-hour light-dark cycle. All animals received commercial rodent chow and water ad libitum.

Experiments were performed on female C57BL/6 mice aged 8-10 weeks old. Mice were administered a single bolus intravenous tail vein injection of 0.9% saline, 10 mg/kg, 30 mg/kg or 50 mg/kg of P-PMO. One-week post injection mice were sacrificed and tibialis anterior, diaphragm and heart muscles removed and snap frozen on dry-ice and stored at −80° C.

1.4.2 Toxicological Assessment of P-PMO

Following intravenous administration of P-PMO (See Section 1.4.1) urine was non-invasively collected under chilled conditions at day 2 and day 7 post-administration following 20 hours housing in metabolic cages. Blood was collected from jugular vein at day 7 during necropsy and the blood was fractionated and serum collected. Tibialis anterior, diaphragm and heart tissue was collected at day 7 during necropsy.

Urinary levels of kidney injury molecule-1 (KIM-1) was quantified by ELISA following appropriate dilution of urine to fit standard curves. KIM-1 values were normalised to urinary creatinine levels that were quantified at MRC Harwell Institute, Mary Lyon Centre, Oxfordshire, UK.

1.4.3 qPCR Analysis of P-PMO Induced Exon Skipping

Quantification of P-PMO induced exon skipping was performed on tibialis anterior (TA), diaphragm and heart muscles 7 days post administration. Briefly, RNA was extracted from homogenised tissue using TRIzol-based extraction method and cDNA synthesised using random primers. Primer/probes were synthesised by Integrated DNA Technologies and designed to amplify a region spanning exon 23-24 representing unskipped product (mDMD23-24, see Table 4), or to amplify specifically transcripts lacking exon 23 using a probe spanning the boundary of exon 22 and 24 (mDMD22-24). Levels of respective transcripts were determined by skipped and unskipped transcripts and expressed as percentage of skipped versus total (skipped and unskipped) transcripts (see Table 5 for sequences).

TABLE 5

Primer and probe sequences for quantification of mouse dystrophin (exon 23) exon skipping by qPCR methods.

| Transcript | Forward primer (5'-3') | SEQ ID NO: | Reverse primer (5'-3') | SEQ ID NO: | Probe | SEQ ID NO: |
|---|---|---|---|---|---|---|
| mDMD (exon 23-24) | CAGGCCATTCCTCTTTCAGG | 75 | GAAACTTTCCTCCCAGTTGGT | 76 | /5FAM/TCAACTTCA/ZEN/GCCATCCATTTCTGTAAGGT/3IABkFQ/ | 77 |
| mDMD (exon 22-24) | CTGAATATGAAATAATGGAGGAGAGACTCG | 78 | CTTCAGCCATCCATTTCTGTAAGGT | 79 | /5FAM/ATGTGATTC/ZEN/TGTAATTTCC/3IABkFQ/ | 80 |

2. FURTHER EXAMPLES

Synthesis of Peptide-PMO Conjugates.

Peptides were synthesized and conjugated to PMO as described previously. The PMO sequence targeting CUG expanded repeats (5'-CAGCAGCAGCAGCAGCAGCAG-3' (SEQ ID NO: 81) was purchased from Gene Tools LLC and used to make further conjugates.

Cell Culture and Peptide-PMO Treatment.

Immortalized myoblasts from healthy individual or DM1 patient with 2600 CTG repeats were cultivated in a growth medium consisting of a mix of M199:DMEM (1:4 ratio; Life technologies) supplemented with 20% FBS (Life technologies), 50 µg/ml gentamycin (Life technologies), 25 µg/ml fetuin, 0.5 ng/ml bFGF, 5 ng/ml EGF and 0.2 µg/ml dexamethasone (Sigma-Aldrich). Myogenic differentiation was induced by switching confluent cell cultures to DMEM medium supplemented with 5 µg/ml insulin (Sigma-Aldrich) for myoblasts. For treatment, WT or DM1 cells are differentiated for 4 days. Then, medium was changed with fresh differentiation medium with peptide-PMOs at a 1, 2, 5 10, 20 or 40 µM concentration. Cells were harvested for analysis 48 h after treatment. Cell viability was quantified in after 2 days of transfection of peptide-PMOs at 40 µM in human hepatocytes or at a 1, 2, 5 10, 20 or 40 µM concentration in human myoblasts using a fluorescent-based assay (Promega).

RNA Isolation, RT-PCR

For human cells: prior to RNA extraction, cells were lysed in a proteinase K buffer (500 mM NaCl, 10 mM Tris-HCl, pH 7.2, 1.5 mM $MgCl_2$, 10 mM EDTA, 2% SDS and 0.5 mg/ml of proteinase K) for 45 min at 55° C. Total RNAs were isolated using TriReagent according to the manufacturer's protocol. One microgram of RNA was reverse transcribed using M-MLV first-strand synthesis system (Life Technologies) according to the manufacturer's instructions in a total of 20 µL. One microliter of cDNA preparation was subsequently used in a semi-quantitative PCR analysis according to standard protocol (ReddyMix, Thermo Scientific). PCR amplification was carried out for 25-35 cycles within the linear range of amplification for each gene. PCR products were resolved on 1.5-2% agarose gels, ethidium bromide-stained and quantified with ImageJ software. The ratios of exon inclusion were quantified as a percentage of inclusion relative to total intensity of isoform signals. To quantify the mRNA expression, real-time PCR was performed according to the manufacturer's instructions. PCR cycles were a 15-min denaturation step followed by 50 cycles with a 94° C. denaturation for 15 s, 58° C. annealing for 20 s and 72° C. extension for 20 s.

Animal experiments and ASO injections. Experiments were carried out in the University of Oxford according to UK legislation. The intravenous injections in HSA-LR C57BL/6 mice were performed by single or repeated administrations via the tail vein. Doses of 30, 12.5, 7.5 and 5 mg/kg of peptide-PMO-CAG7 (SEQ ID NO: 81) were diluted in 0.9% saline and given at a volume of 5-6 µL/g of body weight. KIM-1 levels in C57BL6 female mice measured by ELISA (R&D cat #MKM100) with samples diluted to fit within standard curve. Values were normalised to urinary creatinine levels (Harwell) to account for urine protein concentration.

TABLE 7

Recovery times of C57BL6 mice after injections with DPEP based $[CAG]_7$ (SEQ ID NO: 81) PMO conjugates are shorter than after injection with conjugates formed with prior peptide carriers such as Pip6a.

| Summary of recovery times after injection with peptide-PMOCAG7 | mouse | age | time AV ± SD |
|---|---|---|---|
| DPEP1.9 6× 5 mg/kg repeated injections | HSA-LR | 8-12 weeks | 0 min |
| DPEP3.8 6× 5 mg/kg repeated injections | HSA-LR | 8-12 weeks | 0 min |
| DPEP1.9 4× 7.5 mg/kg repeated injections | HSA-LR | 8-12 weeks | 0 min |
| DPEP3.8 4× 7.5 mg/kg repeated injections | HSA-LR | 8-12 weeks | 0 min |

TABLE 6 primers for PCR

| Primer Name | SEQ ID NO. | Species/Gene/Exon | Sequence (5'-3') |
|---|---|---|---|
| Mbnl1.F | 83 | Mouse-Human/mbnl1/exon5 | GCTGCCCAATACCAGGTCAAC |
| Mbnl1.R | 84 | Mouse-Human/mbnl1/exon5 | TGGTGGGAGAAATGCTGTATGC |
| DMD.F | 85 | Human/DMD/exon78 | TTAGAGGAGGTGATGGAGCA |
| DMD.R | 86 | Human/DMD/exon78 | GATACTAAGGACTCCATCGC |

TABLE 7-continued

Recovery times of C57BL6 mice after injections with DPEP based [CAG]₇ (SEQ ID NO: 81) PMO conjugates are shorter than after injection with conjugates formed with prior peptide carriers such as Pip6a.

| Summary of recovery times after injection with peptide-PMOCAG7 | mouse | age | time AV ± SD |
|---|---|---|---|
| DPEP1.9 7.5 mg/kg | HSA-LR | 8-12 weeks | 0 min |
| DPEP3.8 7.5 mg/kg | HSA-LR | 8-12 weeks | 0 min |
| DPEP1.9 30 mg/kg | WT | 8-12 weeks | 17.5 min ± 2.5 |
| DPEP1.9b 30 mg/kg | WT | 8-12 weeks | 15 min |
| DPEP3.8 30 mg/kg | WT | 8-12 weeks | 7.5 min ± 2.5 |
| DPEP3.1a 30 mg/kg | WT | 8-12 weeks | 10 min |
| DPEP3.8 30 mg/kg | HSA-LR | 8-12 weeks | 60 min ± 10 |
| DPEP1.9 40 mg/kg | HSA-LR | 8-12 weeks | 57.5 min ± 26 |
| DPEP3.8 40 mg/kg | HSA-LR | 8-12 weeks | 60 min ± 15.5 |
| DPEP3.8 30 mg/kg | HSA-LR | 30 weeks | 60 min |
| DPEP1.9 30 mg/kg | HSA-LR | 30 weeks | >60 min |
| pip6a 12.5 mg/kg | HSA-LR | 8-12 weeks | >60 min |

The invention claimed is:
1. A conjugate or a pharmaceutically acceptable salt or solvate thereof of the structure

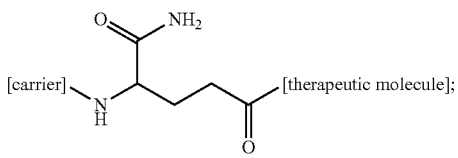

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO.

2. A conjugate or a pharmaceutically acceptable salt thereof, of the structure:

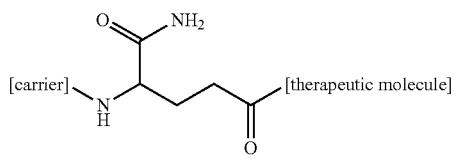

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO.

3. A conjugate of the structure:

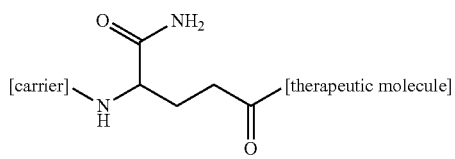

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO.

4. A pharmaceutically acceptable salt of a conjugate of the structure:

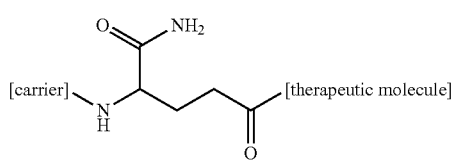

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO.

5. A pharmaceutical composition comprising:
a conjugate or a pharmaceutically acceptable salt or solvate thereof, of the structure:

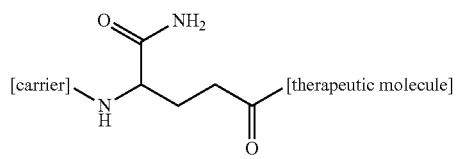

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO; and
a pharmaceutically acceptable carrier.

6. A pharmaceutical composition comprising:
a conjugate or a pharmaceutically acceptable salt thereof, of the structure:

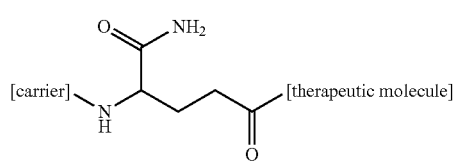

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO; and
a pharmaceutically acceptable carrier.

7. A pharmaceutical composition comprising:
a conjugate of the structure:

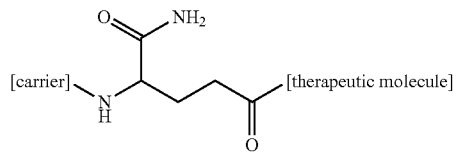

wherein the carrier is a peptide consisting of the sequence RBRRBRFQILYBRBR (SEQ ID NO: 70), wherein the peptide is N-acetylated, and
wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO; and a pharmaceutically acceptable carrier.

8. A pharmaceutical composition comprising:

a pharmaceutically acceptable salt of a conjugate of the structure:

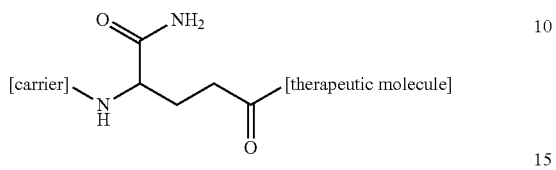

wherein the carrier is a peptide consisting of the sequence RBRRBRFQILYBRBR (SEQ ID NO: 70), wherein the peptide is N-acetylated, and wherein the therapeutic molecule is an antisense oligonucleotide consisting of the sequence 5'-CAGCAGCAGCAGCAGCAGCAG-3' (SEQ ID NO: 81), wherein the antisense oligonucleotide is a PMO; and a pharmaceutically acceptable carrier.

* * * * *

SEQUENCE LISTING

```
<160> NUMBER OF SEQ ID NOS: 94

<210> SEQ ID NO 1
<211> LENGTH: 6
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is aminohexanoic acid

<400> SEQUENCE: 1

Arg Xaa Arg Arg Xaa Arg
1               5

<210> SEQ ID NO 2
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is aminohexanoic acid
<220> FEATURE:
<221> NAME/KEY: MISC_FEATURE
<222> LOCATION: (8)..(8)
<223> OTHER INFORMATION: X is aminohexanoic acid

<400> SEQUENCE: 2

Arg Xaa Arg Arg Xaa Arg Arg Xaa Arg
1               5

<210> SEQ ID NO 3
<211> LENGTH: 12
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
```

```
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is aminohexanoic acid
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (11)..(11)
<223> OTHER INFORMATION: X is aminohexanoic acid

<400> SEQUENCE: 3

Arg Xaa Arg Arg Xaa Arg Arg Xaa Arg Arg Xaa Arg
1               5                   10

<210> SEQ ID NO 4
<211> LENGTH: 6
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla

<400> SEQUENCE: 4

Arg Xaa Arg Arg Xaa Arg
1               5

<210> SEQ ID NO 5
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is bAla

<400> SEQUENCE: 5

Arg Xaa Arg Arg Xaa Arg Arg Xaa Arg
1               5

<210> SEQ ID NO 6
<211> LENGTH: 12
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
```

```
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is bAla
<220> FEATURE:
<221> NAME/KEY: MISC_FEATURE
<222> LOCATION: (11)..(11)
<223> OTHER INFORMATION: X is bAla

<400> SEQUENCE: 6

Arg Xaa Arg Arg Xaa Arg Arg Xaa Arg Arg Xaa Arg
1               5                   10

<210> SEQ ID NO 7
<211> LENGTH: 6
<212> TYPE: PRT
<213> ORGANISM: Artificial Sequence
<220> FEATURE:
<223> OTHER INFORMATION: Synthetic Construct

<400> SEQUENCE: 7

Arg His Arg Arg His Arg
1               5

<210> SEQ ID NO 8
<211> LENGTH: 9
<212> TYPE: PRT
<213> ORGANISM: Artificial Sequence
<220> FEATURE:
<223> OTHER INFORMATION: Synthetic Construct

<400> SEQUENCE: 8

Arg His Arg Arg His Arg Arg His Arg
1               5

<210> SEQ ID NO 9
<211> LENGTH: 12
<212> TYPE: PRT
<213> ORGANISM: Artificial Sequence
<220> FEATURE:
<223> OTHER INFORMATION: Synthetic Construct

<400> SEQUENCE: 9

Arg His Arg Arg His Arg Arg His Arg Arg His Arg
1               5                   10

<210> SEQ ID NO 10
<211> LENGTH: 6
<212> TYPE: PRT
<213> ORGANISM: Artificial Sequence
<220> FEATURE:
<223> OTHER INFORMATION: Synthetic Construct

<400> SEQUENCE: 10

Gly Phe Thr Gly Pro Leu
1               5

<210> SEQ ID NO 11
<211> LENGTH: 5
<212> TYPE: PRT
<213> ORGANISM: Artificial Sequence
<220> FEATURE:
<223> OTHER INFORMATION: Synthetic Construct

<400> SEQUENCE: 11

Phe Gln Ile Leu Tyr
```

```
1               5
```

```
<210> SEQ ID NO 12
<211> LENGTH: 5
<212> TYPE: PRT
<213> ORGANISM: Artificial Sequence
<220> FEATURE:
<223> OTHER INFORMATION: Synthetic Construct

<400> SEQUENCE: 12

Tyr Gln Phe Leu Ile
1               5

<210> SEQ ID NO 13
<211> LENGTH: 5
<212> TYPE: PRT
<213> ORGANISM: Artificial Sequence
<220> FEATURE:
<223> OTHER INFORMATION: Synthetic Construct

<400> SEQUENCE: 13

Ile Leu Phe Gln Tyr
1               5

<210> SEQ ID NO 14
<211> LENGTH: 4
<212> TYPE: PRT
<213> ORGANISM: Artificial Sequence
<220> FEATURE:
<223> OTHER INFORMATION: Synthetic Construct

<400> SEQUENCE: 14

Phe Gln Ile Tyr
1

<210> SEQ ID NO 15
<211> LENGTH: 5
<212> TYPE: PRT
<213> ORGANISM: Artificial Sequence
<220> FEATURE:
<223> OTHER INFORMATION: Synthetic Construct

<400> SEQUENCE: 15

Trp Trp Pro Trp Trp
1               5

<210> SEQ ID NO 16
<211> LENGTH: 4
<212> TYPE: PRT
<213> ORGANISM: Artificial Sequence
<220> FEATURE:
<223> OTHER INFORMATION: Synthetic Construct

<400> SEQUENCE: 16

Trp Pro Trp Trp
1

<210> SEQ ID NO 17
<211> LENGTH: 4
<212> TYPE: PRT
<213> ORGANISM: Artificial Sequence
<220> FEATURE:
<223> OTHER INFORMATION: Synthetic Construct

<400> SEQUENCE: 17

Trp Trp Pro Trp
1
```

```
<210> SEQ ID NO 18
<211> LENGTH: 4
<212> TYPE: PRT
<213> ORGANISM: Artificial Sequence
<220> FEATURE:
<223> OTHER INFORMATION: Synthetic Construct

<400> SEQUENCE: 18

Ile Leu Phe Gln
1

<210> SEQ ID NO 19
<211> LENGTH: 4
<212> TYPE: PRT
<213> ORGANISM: Artificial Sequence
<220> FEATURE:
<223> OTHER INFORMATION: Synthetic Construct

<400> SEQUENCE: 19

Ile Leu Ile Gln
1

<210> SEQ ID NO 20
<211> LENGTH: 7
<212> TYPE: PRT
<213> ORGANISM: Artificial Sequence
<220> FEATURE:
<223> OTHER INFORMATION: Synthetic Construct

<400> SEQUENCE: 20

Ile Lys Ile Leu Phe Gln Asn
1               5

<210> SEQ ID NO 21
<211> LENGTH: 7
<212> TYPE: PRT
<213> ORGANISM: Artificial Sequence
<220> FEATURE:
<223> OTHER INFORMATION: Synthetic Construct

<400> SEQUENCE: 21

Ile His Ile Leu Phe Gln Asn
1               5

<210> SEQ ID NO 22
<211> LENGTH: 7
<212> TYPE: PRT
<213> ORGANISM: Artificial Sequence
<220> FEATURE:
<223> OTHER INFORMATION: Synthetic Construct

<400> SEQUENCE: 22

Ile Arg Ile Leu Phe Gln Asn
1               5

<210> SEQ ID NO 23
<211> LENGTH: 6
<212> TYPE: PRT
<213> ORGANISM: Artificial Sequence
<220> FEATURE:
<223> OTHER INFORMATION: Synthetic Construct

<400> SEQUENCE: 23

Ile Ile Leu Phe Gln Asn
1               5
```

```
<210> SEQ ID NO 24
<211> LENGTH: 6
<212> TYPE: PRT
<213> ORGANISM: Artificial Sequence
<220> FEATURE:
<223> OTHER INFORMATION: Synthetic Construct

<400> SEQUENCE: 24

Lys Ile Leu Phe Gln Asn
1               5

<210> SEQ ID NO 25
<211> LENGTH: 6
<212> TYPE: PRT
<213> ORGANISM: Artificial Sequence
<220> FEATURE:
<223> OTHER INFORMATION: Synthetic Construct

<400> SEQUENCE: 25

His Ile Leu Phe Gln Asn
1               5

<210> SEQ ID NO 26
<211> LENGTH: 6
<212> TYPE: PRT
<213> ORGANISM: Artificial Sequence
<220> FEATURE:
<223> OTHER INFORMATION: Synthetic Construct

<400> SEQUENCE: 26

Arg Ile Leu Phe Gln Asn
1               5

<210> SEQ ID NO 27
<211> LENGTH: 5
<212> TYPE: PRT
<213> ORGANISM: Artificial Sequence
<220> FEATURE:
<223> OTHER INFORMATION: Synthetic Construct

<400> SEQUENCE: 27

Ile Leu Phe Gln Asn
1               5

<210> SEQ ID NO 28
<211> LENGTH: 5
<212> TYPE: PRT
<213> ORGANISM: Artificial Sequence
<220> FEATURE:
<223> OTHER INFORMATION: Synthetic Construct

<400> SEQUENCE: 28

His Leu Ile Gln Asn
1               5

<210> SEQ ID NO 29
<211> LENGTH: 6
<212> TYPE: PRT
<213> ORGANISM: Artificial Sequence
<220> FEATURE:
<223> OTHER INFORMATION: Synthetic Construct

<400> SEQUENCE: 29

Lys Ile Leu Ile Gln Asn
1               5
```

```
<210> SEQ ID NO 30
<211> LENGTH: 6
<212> TYPE: PRT
<213> ORGANISM: Artificial Sequence
<220> FEATURE:
<223> OTHER INFORMATION: Synthetic Construct

<400> SEQUENCE: 30

Lys Ile Leu Ile Gln Tyr
1               5

<210> SEQ ID NO 31
<211> LENGTH: 6
<212> TYPE: PRT
<213> ORGANISM: Artificial Sequence
<220> FEATURE:
<223> OTHER INFORMATION: Synthetic Construct

<400> SEQUENCE: 31

His Ile Leu Ile Gln Asn
1               5

<210> SEQ ID NO 32
<211> LENGTH: 6
<212> TYPE: PRT
<213> ORGANISM: Artificial Sequence
<220> FEATURE:
<223> OTHER INFORMATION: Synthetic Construct

<400> SEQUENCE: 32

Arg Ile Leu Ile Gln Asn
1               5

<210> SEQ ID NO 33
<211> LENGTH: 6
<212> TYPE: PRT
<213> ORGANISM: Artificial Sequence
<220> FEATURE:
<223> OTHER INFORMATION: Synthetic Construct

<400> SEQUENCE: 33

His Ile Leu Ile Gln Tyr
1               5

<210> SEQ ID NO 34
<211> LENGTH: 6
<212> TYPE: PRT
<213> ORGANISM: Artificial Sequence
<220> FEATURE:
<223> OTHER INFORMATION: Synthetic Construct

<400> SEQUENCE: 34

Arg Ile Leu Ile Gln Tyr
1               5

<210> SEQ ID NO 35
<211> LENGTH: 5
<212> TYPE: PRT
<213> ORGANISM: Artificial Sequence
<220> FEATURE:
<223> OTHER INFORMATION: Synthetic Construct

<400> SEQUENCE: 35

Ile Leu Ile Gln Asn
1               5

<210> SEQ ID NO 36
```

```
<211> LENGTH: 5
<212> TYPE: PRT
<213> ORGANISM: Artificial Sequence
<220> FEATURE:
<223> OTHER INFORMATION: Synthetic Construct

<400> SEQUENCE: 36

Ile Leu Ile Gln Tyr
1               5

<210> SEQ ID NO 37
<211> LENGTH: 5
<212> TYPE: PRT
<213> ORGANISM: Artificial Sequence
<220> FEATURE:
<223> OTHER INFORMATION: Synthetic Construct

<400> SEQUENCE: 37

Arg Arg Arg Arg Arg
1               5

<210> SEQ ID NO 38
<211> LENGTH: 6
<212> TYPE: PRT
<213> ORGANISM: Artificial Sequence
<220> FEATURE:
<223> OTHER INFORMATION: Synthetic Construct

<400> SEQUENCE: 38

Arg Arg Arg Arg Arg Arg
1               5

<210> SEQ ID NO 39
<211> LENGTH: 7
<212> TYPE: PRT
<213> ORGANISM: Artificial Sequence
<220> FEATURE:
<223> OTHER INFORMATION: Synthetic Construct

<400> SEQUENCE: 39

Arg Arg Arg Arg Arg Arg Arg
1               5

<210> SEQ ID NO 40
<211> LENGTH: 8
<212> TYPE: PRT
<213> ORGANISM: Artificial Sequence
<220> FEATURE:
<223> OTHER INFORMATION: Synthetic Construct

<400> SEQUENCE: 40

Arg Arg Arg Arg Arg Arg Arg Arg
1               5

<210> SEQ ID NO 41
<211> LENGTH: 12
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
```

```
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (11)..(11)
<223> OTHER INFORMATION: X is bAla

<400> SEQUENCE: 41

Arg Xaa Arg Arg Xaa Arg Arg Xaa Arg Arg Xaa Arg
1               5                   10

<210> SEQ ID NO 42
<211> LENGTH: 13
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is a bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (11)..(11)
<223> OTHER INFORMATION: X is a bAla
<220> FEATURE:
<221> NAME/KEY: MISC_FEATURE
<222> LOCATION: (13)..(13)
<223> OTHER INFORMATION: X is aminohexanoic acid

<400> SEQUENCE: 42

Arg Xaa Arg Arg Xaa Arg Arg Xaa Arg Arg Xaa Arg Xaa
1               5                   10

<210> SEQ ID NO 43
<211> LENGTH: 13
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is aminohexanoic acid
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (11)..(11)
<223> OTHER INFORMATION: X is aminohexanoic acid
<220> FEATURE:
<221> NAME/KEY: MISC_FEATURE
<222> LOCATION: (13)..(13)
<223> OTHER INFORMATION: X is aminohexanoic acid

<400> SEQUENCE: 43

Arg Xaa Arg Arg Xaa Arg Arg Xaa Arg Arg Xaa Arg Xaa
1               5                   10
```

```
<210> SEQ ID NO 44
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is aminohexanoic acid

<400> SEQUENCE: 44

Arg Xaa Arg Arg Xaa Arg Arg Phe Gln Ile Leu Tyr Arg Xaa Arg Xaa
1               5                   10                  15

Arg

<210> SEQ ID NO 45
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 45

Arg Xaa Arg Arg Xaa Arg Arg Xaa Arg Ile Leu Phe Gln Tyr Arg Xaa
1               5                   10                  15

Arg Xaa Arg Xaa Arg
            20

<210> SEQ ID NO 46
<211> LENGTH: 21
<212> TYPE: PRT
<213> ORGANISM: Artificial Sequence
<220> FEATURE:
<223> OTHER INFORMATION: Synthetic Construct
<220> FEATURE:
```

```
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is aminohexanoic acid
<220> FEATURE:
<221> NAME/KEY: MISC_FEATURE
<222> LOCATION: (20)..(20)
<223> OTHER INFORMATION: X is aminohexanoic acid

<400> SEQUENCE: 46

Arg Xaa Arg Arg Xaa Arg Arg Xaa Arg Ile Leu Phe Gln Tyr Arg Xaa
1               5                   10                  15

Arg Xaa Arg Xaa Arg
            20

<210> SEQ ID NO 47
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is aminohexanoic acid
<220> FEATURE:
<221> NAME/KEY: MISC_FEATURE
<222> LOCATION: (13)..(13)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid

<400> SEQUENCE: 47

Arg Xaa Arg Arg Xaa Arg Ile Leu Phe Gln Tyr Arg Xaa Arg Arg Xaa
1               5                   10                  15

Arg

<210> SEQ ID NO 48
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is aminohexanoic acid
<220> FEATURE:
```

```
<221> NAME/KEY: MISC_FEATURE
<222> LOCATION: (8)..(8)
<223> OTHER INFORMATION: X is bAla
<220> FEATURE:
<221> NAME/KEY: MISC_FEATURE
<222> LOCATION: (16)..(16)
<223> OTHER INFORMATION: X is bAla
<220> FEATURE:
<221> NAME/KEY: MISC_FEATURE
<222> LOCATION: (18)..(18)
<223> OTHER INFORMATION: X is aminohexanoic acid
<220> FEATURE:
<221> NAME/KEY: MISC_FEATURE
<222> LOCATION: (20)..(20)
<223> OTHER INFORMATION: X is bAla

<400> SEQUENCE: 48

Arg Xaa Arg Arg Xaa Arg Arg Xaa Arg Ile Leu Phe Gln Tyr Arg Xaa
1               5                   10                  15

Arg Xaa Arg Xaa Arg
            20

<210> SEQ ID NO 49
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is Aminohexanoic acid
<220> FEATURE:
<221> NAME/KEY: MISC_FEATURE
<222> LOCATION: (8)..(8)
<223> OTHER INFORMATION: X is bAla
<220> FEATURE:
<221> NAME/KEY: MISC_FEATURE
<222> LOCATION: (16)..(16)
<223> OTHER INFORMATION: X is Aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is Aminohexanoic acid

<400> SEQUENCE: 49

Arg Xaa Arg Arg Xaa Arg Arg Xaa Arg Ile Leu Phe Gln Tyr Arg Xaa
1               5                   10                  15

Arg Xaa Arg Xaa Arg
            20

<210> SEQ ID NO 50
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is aminohexanoic acid
```

```
<220> FEATURE:
<221> NAME/KEY: MISC_FEATURE
<222> LOCATION: (8)..(8)
<223> OTHER INFORMATION: X is bAla
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (19)..(19)
<223> OTHER INFORMATION: X is aminohexanoic acid

<400> SEQUENCE: 50

Arg Xaa Arg Arg Xaa Arg Arg Xaa Arg Ile Leu Phe Gln Tyr Arg Xaa
1               5                   10                  15

Arg Arg Xaa Arg
            20

<210> SEQ ID NO 51
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is aminohexanoic acid
<220> FEATURE:
<221> NAME/KEY: MISC_FEATURE
<222> LOCATION: (8)..(8)
<223> OTHER INFORMATION: X is bAla
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 51

Arg Xaa Arg Arg Xaa Arg Arg Xaa Arg Ile Leu Phe Gln Tyr Arg Xaa
1               5                   10                  15

Arg Xaa Arg Xaa
            20

<210> SEQ ID NO 52
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
```

```
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (19)..(19)
<223> OTHER INFORMATION: X is aminohexanoic acid

<400> SEQUENCE: 52

Arg Xaa Arg Arg Xaa Arg Arg Xaa Arg Ile Leu Phe Gln Tyr Arg Xaa
1               5                   10                  15

Arg Arg Xaa Arg
            20

<210> SEQ ID NO 53
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 53

Arg Xaa Arg Arg Xaa Arg Arg Xaa Arg Ile Leu Phe Gln Tyr Arg Xaa
1               5                   10                  15

Arg Xaa Arg Xaa
            20

<210> SEQ ID NO 54
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
```

```
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 54

Arg Xaa Arg Arg Xaa Arg Arg Xaa Arg Ile Leu Phe Gln Tyr Arg Xaa
1               5                   10                  15

Arg Xaa Arg Xaa Arg
            20

<210> SEQ ID NO 55
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 55

Arg Xaa Arg Arg Xaa Arg Arg Xaa Arg Tyr Gln Phe Leu Ile Arg Xaa
1               5                   10                  15

Arg Xaa Arg Xaa Arg
            20

<210> SEQ ID NO 56
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
```

```
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 56

Arg Xaa Arg Arg Xaa Arg Arg Xaa Arg Ile Gln Phe Leu Ile Arg Xaa
1               5                   10                  15

Arg Xaa Arg Xaa Arg
            20

<210> SEQ ID NO 57
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (15)..(15)
<223> OTHER INFORMATION: X is aminohexanoic acid
<220> FEATURE:
<221> NAME/KEY: MISC_FEATURE
<222> LOCATION: (17)..(17)
<223> OTHER INFORMATION: X is bAla
<220> FEATURE:
<221> NAME/KEY: MISC_FEATURE
<222> LOCATION: (19)..(19)
<223> OTHER INFORMATION: X is aminohexanoic acid

<400> SEQUENCE: 57

Arg Xaa Arg Arg Xaa Arg Arg Xaa Arg Gln Phe Leu Ile Arg Xaa Arg
1               5                   10                  15

Xaa Arg Xaa Arg
            20

<210> SEQ ID NO 58
<211> LENGTH: 19
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
```

```
<220> FEATURE:
<221> NAME/KEY: MISC_FEATURE
<222> LOCATION: (14)..(14)
<223> OTHER INFORMATION: X is aminohexanoic acid
<220> FEATURE:
<221> NAME/KEY: MISC_FEATURE
<222> LOCATION: (16)..(16)
<223> OTHER INFORMATION: X is bAla
<220> FEATURE:
<221> NAME/KEY: MISC_FEATURE
<222> LOCATION: (18)..(18)
<223> OTHER INFORMATION: X is aminohexanoic acid

<400> SEQUENCE: 58

Arg Xaa Arg Arg Xaa Arg Arg Xaa Arg Gln Phe Leu Arg Xaa Arg Xaa
1               5                   10                  15

Arg Xaa Arg

<210> SEQ ID NO 59
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (15)..(15)
<223> OTHER INFORMATION: X is aminohexanoic acid
<220> FEATURE:
<221> NAME/KEY: MISC_FEATURE
<222> LOCATION: (17)..(17)
<223> OTHER INFORMATION: X is bAla
<220> FEATURE:
<221> NAME/KEY: MISC_FEATURE
<222> LOCATION: (19)..(19)
<223> OTHER INFORMATION: X is aminohexanoic acid

<400> SEQUENCE: 59

Arg Xaa Arg Arg Xaa Arg Arg Xaa Tyr Arg Phe Leu Ile Arg Xaa Arg
1               5                   10                  15

Xaa Arg Xaa Arg
            20

<210> SEQ ID NO 60
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
```

```
<220> FEATURE:
<221> NAME/KEY: MISC_FEATURE
<222> LOCATION: (16)..(16)
<223> OTHER INFORMATION: X is aminohexanoic acid
<220> FEATURE:
<221> NAME/KEY: MISC_FEATURE
<222> LOCATION: (18)..(18)
<223> OTHER INFORMATION: X is bAla
<220> FEATURE:
<221> NAME/KEY: MISC_FEATURE
<222> LOCATION: (20)..(20)
<223> OTHER INFORMATION: X is aminohexanoic acid

<400> SEQUENCE: 60

Arg Xaa Arg Arg Xaa Arg Arg Xaa Arg Phe Gln Ile Leu Tyr Arg Xaa
1               5                   10                  15

Arg Xaa Arg Xaa Arg
            20

<210> SEQ ID NO 61
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (15)..(15)
<223> OTHER INFORMATION: X is aminohexanoic acid
<220> FEATURE:
<221> NAME/KEY: MISC_FEATURE
<222> LOCATION: (17)..(17)
<223> OTHER INFORMATION: X is bAla
<220> FEATURE:
<221> NAME/KEY: MISC_FEATURE
<222> LOCATION: (19)..(19)
<223> OTHER INFORMATION: X is aminohexanoic acid

<400> SEQUENCE: 61

Arg Xaa Arg Arg Xaa Arg Arg Xaa Tyr Arg Phe Arg Leu Ile Xaa Arg
1               5                   10                  15

Xaa Arg Xaa Arg
            20

<210> SEQ ID NO 62
<211> LENGTH: 20
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
```

```
<223> OTHER INFORMATION: X is aminohexanoic acid
<220> FEATURE:
<221> NAME/KEY: MISC_FEATURE
<222> LOCATION: (15)..(15)
<223> OTHER INFORMATION: X is aminohexanoic acid
<220> FEATURE:
<221> NAME/KEY: MISC_FEATURE
<222> LOCATION: (17)..(17)
<223> OTHER INFORMATION: X is bAla
<220> FEATURE:
<221> NAME/KEY: MISC_FEATURE
<222> LOCATION: (19)..(19)
<223> OTHER INFORMATION: X is aminohexanoic acid

<400> SEQUENCE: 62

Arg Xaa Arg Arg Xaa Arg Arg Xaa Ile Leu Phe Arg Tyr Arg Xaa Arg
1               5                   10                  15

Xaa Arg Xaa Arg
            20

<210> SEQ ID NO 63
<211> LENGTH: 22
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is aminohexanoic acid
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (8)..(8)
<223> OTHER INFORMATION: X is aminohexanoic acid
<220> FEATURE:
<221> NAME/KEY: MISC_FEATURE
<222> LOCATION: (17)..(17)
<223> OTHER INFORMATION: X is aminohexanoic acid
<220> FEATURE:
<221> NAME/KEY: MISC_FEATURE
<222> LOCATION: (19)..(19)
<223> OTHER INFORMATION: X is bAla
<220> FEATURE:
<221> NAME/KEY: MISC_FEATURE
<222> LOCATION: (21)..(21)
<223> OTHER INFORMATION: X is aminohexanoic acid

<400> SEQUENCE: 63

Arg Xaa Arg Arg Xaa Arg Arg Xaa Arg Ile Tyr Gln Phe Leu Ile Arg
1               5                   10                  15

Xaa Arg Xaa Arg Xaa Arg
            20

<210> SEQ ID NO 64
<211> LENGTH: 24
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (7)..(7)
<223> OTHER INFORMATION: X is bAla
<220> FEATURE:
<221> NAME/KEY: MISC_FEATURE
<222> LOCATION: (10)..(10)
<223> OTHER INFORMATION: X is aminohexanoic acid
<220> FEATURE:
<221> NAME/KEY: MISC_FEATURE
```

-continued

```
<222> LOCATION: (12)..(12)
<223> OTHER INFORMATION: X is bAla
<220> FEATURE:
<221> NAME/KEY: MISC_FEATURE
<222> LOCATION: (14)..(14)
<223> OTHER INFORMATION: X is aminohexanoic acid
<220> FEATURE:
<221> NAME/KEY: MISC_FEATURE
<222> LOCATION: (15)..(15)
<223> OTHER INFORMATION: X is bAla
<220> FEATURE:
<221> NAME/KEY: MISC_FEATURE
<222> LOCATION: (17)..(17)
<223> OTHER INFORMATION: X is aminohexanoic acid
<220> FEATURE:
<221> NAME/KEY: MISC_FEATURE
<222> LOCATION: (19)..(19)
<223> OTHER INFORMATION: X is bAla

<400> SEQUENCE: 64

Tyr Gln Phe Leu Ile Arg Xaa Arg Arg Xaa Arg Xaa Arg Xaa Xaa Arg
1               5                   10                  15

Xaa Arg Xaa Tyr Gln Phe Leu Ile
            20

<210> SEQ ID NO 65
<211> LENGTH: 22
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (7)..(7)
<223> OTHER INFORMATION: X is bAla
<220> FEATURE:
<221> NAME/KEY: MISC_FEATURE
<222> LOCATION: (10)..(10)
<223> OTHER INFORMATION: X is bAla
<220> FEATURE:
<221> NAME/KEY: MISC_FEATURE
<222> LOCATION: (12)..(12)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (17)..(17)
<223> OTHER INFORMATION: X is bAla

<400> SEQUENCE: 65

Tyr Gln Phe Leu Ile Arg Xaa Arg Arg Xaa Arg Xaa Arg Xaa Arg Arg
1               5                   10                  15

Xaa Tyr Gln Phe Leu Ile
            20

<210> SEQ ID NO 66
<211> LENGTH: 24
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (7)..(7)
<223> OTHER INFORMATION: X is bAla
<220> FEATURE:
<221> NAME/KEY: MISC_FEATURE
<222> LOCATION: (10)..(10)
<223> OTHER INFORMATION: X is bAla
<220> FEATURE:
```

```
<221> NAME/KEY: MISC_FEATURE
<222> LOCATION: (12)..(12)
<223> OTHER INFORMATION: X is bAla
<220> FEATURE:
<221> NAME/KEY: MISC_FEATURE
<222> LOCATION: (14)..(15)
<223> OTHER INFORMATION: X is bAla
<220> FEATURE:
<221> NAME/KEY: MISC_FEATURE
<222> LOCATION: (17)..(17)
<223> OTHER INFORMATION: X is Aminohexanoic acid
<220> FEATURE:
<221> NAME/KEY: MISC_FEATURE
<222> LOCATION: (19)..(19)
<223> OTHER INFORMATION: X is bAla

<400> SEQUENCE: 66

Tyr Gln Phe Leu Ile Arg Xaa Arg Arg Xaa Arg Xaa Arg Xaa Xaa Arg
1               5                  10                  15

Xaa Arg Xaa Tyr Gln Phe Leu Ile
            20

<210> SEQ ID NO 67
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is bAla

<400> SEQUENCE: 67

Arg Xaa Arg Arg Xaa Arg Arg Phe Gln Ile Leu Tyr Arg Xaa Arg Xaa
1               5                  10                  15

Arg

<210> SEQ ID NO 68
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is bAla
```

```
<400> SEQUENCE: 68

Arg Xaa Arg Arg Xaa Arg Arg Tyr Gln Phe Leu Ile Arg Xaa Arg Xaa
1               5                   10                  15

Arg

<210> SEQ ID NO 69
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is bAla

<400> SEQUENCE: 69

Arg Xaa Arg Arg Xaa Arg Arg Ile Leu Phe Gln Tyr Arg Xaa Arg Xaa
1               5                   10                  15

Arg

<210> SEQ ID NO 70
<211> LENGTH: 15
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (12)..(12)
<223> OTHER INFORMATION: X is bAla
<220> FEATURE:
<221> NAME/KEY: MISC_FEATURE
<222> LOCATION: (14)..(14)
<223> OTHER INFORMATION: X is bAla

<400> SEQUENCE: 70

Arg Xaa Arg Arg Xaa Arg Phe Gln Ile Leu Tyr Xaa Arg Xaa Arg
1               5                   10                  15

<210> SEQ ID NO 71
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
```

```
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is bAla

<400> SEQUENCE: 71

Arg Xaa Arg Arg Xaa Arg Arg Phe Gln Ile Leu Tyr Arg Xaa His Xaa
1               5                   10                  15

His

<210> SEQ ID NO 72
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (14)..(14)
<223> OTHER INFORMATION: X is bAla
<220> FEATURE:
<221> NAME/KEY: MISC_FEATURE
<222> LOCATION: (16)..(16)
<223> OTHER INFORMATION: X is bAla

<400> SEQUENCE: 72

Arg Xaa Arg Arg Xaa Arg Arg Phe Gln Ile Leu Tyr His Xaa His Xaa
1               5                   10                  15

Arg

<210> SEQ ID NO 73
<211> LENGTH: 16
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: X is bAla
<220> FEATURE:
<221> NAME/KEY: MISC_FEATURE
<222> LOCATION: (5)..(5)
<223> OTHER INFORMATION: X is bAla
<220> FEATURE:
<221> NAME/KEY: MISC_FEATURE
<222> LOCATION: (13)..(13)
<223> OTHER INFORMATION: X is bAla
<220> FEATURE:
<221> NAME/KEY: MISC_FEATURE
<222> LOCATION: (15)..(15)
<223> OTHER INFORMATION: X is bAla

<400> SEQUENCE: 73

Arg Xaa Arg Arg Xaa Arg Phe Gln Ile Leu Tyr Arg Xaa His Xaa His
1               5                   10                  15
```

<210> SEQ ID NO 74
<211> LENGTH: 25
<212> TYPE: DNA
<213> ORGANISM: Artificial Sequence
<220> FEATURE:
<223> OTHER INFORMATION: Synthetic Construct

<400> SEQUENCE: 74
ggccaaacct cggcttacct gaaat                                              25

<210> SEQ ID NO 75
<211> LENGTH: 20
<212> TYPE: DNA
<213> ORGANISM: Artificial Sequence
<220> FEATURE:
<223> OTHER INFORMATION: Synthetic Construct

<400> SEQUENCE: 75
caggccattc ctctttcagg                                                    20

<210> SEQ ID NO 76
<211> LENGTH: 21
<212> TYPE: DNA
<213> ORGANISM: Artificial Sequence
<220> FEATURE:
<223> OTHER INFORMATION: Synthetic Construct

<400> SEQUENCE: 76
gaaactttcc tcccagttgg t                                                  21

<210> SEQ ID NO 77
<211> LENGTH: 29
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (1)..(1)
<223> OTHER INFORMATION: labelled with FAM
<220> FEATURE:
<221> NAME/KEY: misc_feature
<222> LOCATION: (9)..(10)
<223> OTHER INFORMATION: linked through an internal quencher ZEN
<220> FEATURE:
<221> NAME/KEY: misc_feature
<222> LOCATION: (29)..(29)
<223> OTHER INFORMATION: labelled with IABkFQ

<400> SEQUENCE: 77
tcaacttcag ccatccattt ctgtaaggt                                          29

<210> SEQ ID NO 78
<211> LENGTH: 30
<212> TYPE: DNA
<213> ORGANISM: Artificial Sequence
<220> FEATURE:
<223> OTHER INFORMATION: Synthetic Construct

<400> SEQUENCE: 78
ctgaatatga aataatggag gagagactcg                                         30

<210> SEQ ID NO 79
<211> LENGTH: 25
<212> TYPE: DNA
<213> ORGANISM: Artificial Sequence
<220> FEATURE:
<223> OTHER INFORMATION: Synthetic Construct

<400> SEQUENCE: 79
cttcagccat ccatttctgt aaggt                                    25

<210> SEQ ID NO 80
<211> LENGTH: 19
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (1)..(1)
<223> OTHER INFORMATION: Labelled with FAM
<220> FEATURE:
<221> NAME/KEY: misc_feature
<222> LOCATION: (9)..(10)
<223> OTHER INFORMATION: are linked through an internal quencher ZEN
<220> FEATURE:
<221> NAME/KEY: misc_feature
<222> LOCATION: (9)..(10)
<223> OTHER INFORMATION: linked through an internal quencher ZEN
<220> FEATURE:
<221> NAME/KEY: misc_feature
<222> LOCATION: (19)..(19)
<223> OTHER INFORMATION: Labelled with IABkFQ

<400> SEQUENCE: 80
atgtgattct gtaatttcc                                           19

<210> SEQ ID NO 81
<211> LENGTH: 21
<212> TYPE: DNA
<213> ORGANISM: Artificial Sequence
<220> FEATURE:
<223> OTHER INFORMATION: Synthetic Construct

<400> SEQUENCE: 81
cagcagcagc agcagcagca g                                        21

<210> SEQ ID NO 82
<211> LENGTH: 21
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: x is aminohexanoic acid
<220> FEATURE:
<221> NAME/KEY: MISC_FEATURE
<222> LOCATION: (5)..(5)
<223> OTHER INFORMATION: x is bAla
<220> FEATURE:
<221> NAME/KEY: MISC_FEATURE
<222> LOCATION: (8)..(8)
<223> OTHER INFORMATION: x is aminohexanoic acid
<220> FEATURE:
<221> NAME/KEY: MISC_FEATURE
<222> LOCATION: (16)..(16)
<223> OTHER INFORMATION: x is aminohexanoic acid
<220> FEATURE:
<221> NAME/KEY: MISC_FEATURE
<222> LOCATION: (18)..(18)
<223> OTHER INFORMATION: x is bAla
<220> FEATURE:
<221> NAME/KEY: MISC_FEATURE
<222> LOCATION: (20)..(20)
<223> OTHER INFORMATION: x is aminohexanoic acid

<400> SEQUENCE: 82

```
Arg Xaa Arg Arg Xaa Arg Arg Xaa Arg Tyr Gln Phe Leu Ile Arg Xaa
1               5                   10                  15

Arg Xaa Arg Xaa Arg
            20

<210> SEQ ID NO 83
<211> LENGTH: 21
<212> TYPE: DNA
<213> ORGANISM: Artificial Sequence
<220> FEATURE:
<223> OTHER INFORMATION: Synthetic Construct

<400> SEQUENCE: 83
gctgcccaat accaggtcaa c                                           21

<210> SEQ ID NO 84
<211> LENGTH: 22
<212> TYPE: DNA
<213> ORGANISM: Artificial Sequence
<220> FEATURE:
<223> OTHER INFORMATION: Synthetic Construct

<400> SEQUENCE: 84
tggtgggaga aatgctgtat gc                                          22

<210> SEQ ID NO 85
<211> LENGTH: 20
<212> TYPE: DNA
<213> ORGANISM: Artificial Sequence
<220> FEATURE:
<223> OTHER INFORMATION: Synthetic Construct

<400> SEQUENCE: 85
ttagaggagg tgatggagca                                             20

<210> SEQ ID NO 86
<211> LENGTH: 20
<212> TYPE: DNA
<213> ORGANISM: Artificial Sequence
<220> FEATURE:
<223> OTHER INFORMATION: Synthetic Construct

<400> SEQUENCE: 86
gatactaagg actccatcgc                                             20

<210> SEQ ID NO 87
<211> LENGTH: 7
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: ACETYLATION

<400> SEQUENCE: 87

Arg Arg Arg Arg Arg Arg Gly
1               5

<210> SEQ ID NO 88
<211> LENGTH: 16
<212> TYPE: PRT
<213> ORGANISM: Artificial Sequence
<220> FEATURE:
<223> OTHER INFORMATION: Synthetic Construct
<220> FEATURE:
```

```
<221> NAME/KEY: MOD_RES
<222> LOCATION: (1)..(1)
<223> OTHER INFORMATION: ACETYLATION
<220> FEATURE:
<221> NAME/KEY: misc_feature
<222> LOCATION: (2)..(2)
<223> OTHER INFORMATION: X is bAla
<220> FEATURE:
<221> NAME/KEY: misc_feature
<222> LOCATION: (5)..(5)
<223> OTHER INFORMATION: X is bAla
<220> FEATURE:
<221> NAME/KEY: misc_feature
<222> LOCATION: (12)..(12)
<223> OTHER INFORMATION: X is bAla
<220> FEATURE:
<221> NAME/KEY: misc_feature
<222> LOCATION: (14)..(14)
<223> OTHER INFORMATION: X is bAla

<400> SEQUENCE: 88

Arg Xaa Arg Arg Xaa Arg Phe Gln Ile Leu Tyr Xaa Arg Xaa Arg Glu
1               5                   10                  15

<210> SEQ ID NO 89
<211> LENGTH: 16
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (3)..(3)
<223> OTHER INFORMATION: X is bAla
<220> FEATURE:
<221> NAME/KEY: misc_feature
<222> LOCATION: (6)..(6)
<223> OTHER INFORMATION: X is bAla
<220> FEATURE:
<221> NAME/KEY: misc_feature
<222> LOCATION: (13)..(13)
<223> OTHER INFORMATION: X is bAla
<220> FEATURE:
<221> NAME/KEY: misc_feature
<222> LOCATION: (15)..(15)
<223> OTHER INFORMATION: X is bAla

<400> SEQUENCE: 89

Glu Arg Xaa Arg Arg Xaa Arg Phe Gln Ile Leu Tyr Xaa Arg Xaa Arg
1               5                   10                  15

<210> SEQ ID NO 90
<211> LENGTH: 18
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: ACETYLATION
<220> FEATURE:
<221> NAME/KEY: misc_feature
<222> LOCATION: (2)..(2)
<223> OTHER INFORMATION: X is bAla
<220> FEATURE:
<221> NAME/KEY: misc_feature
<222> LOCATION: (5)..(5)
<223> OTHER INFORMATION: X is bAla
<220> FEATURE:
<221> NAME/KEY: misc_feature
<222> LOCATION: (14)..(14)
<223> OTHER INFORMATION: X is bAla
<220> FEATURE:
<221> NAME/KEY: misc_feature
```

<222> LOCATION: (16)..(16)
<223> OTHER INFORMATION: X is bAla

<400> SEQUENCE: 90

Arg Xaa Arg Arg Xaa Arg Arg Phe Gln Ile Leu Tyr Arg Xaa His Xaa
1               5                   10                  15

His Glu

<210> SEQ ID NO 91
<211> LENGTH: 18
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (3)..(3)
<223> OTHER INFORMATION: X is bAla
<220> FEATURE:
<221> NAME/KEY: misc_feature
<222> LOCATION: (6)..(6)
<223> OTHER INFORMATION: X is bAla
<220> FEATURE:
<221> NAME/KEY: misc_feature
<222> LOCATION: (15)..(15)
<223> OTHER INFORMATION: X is bAla
<220> FEATURE:
<221> NAME/KEY: misc_feature
<222> LOCATION: (17)..(17)
<223> OTHER INFORMATION: X is bAla

<400> SEQUENCE: 91

Glu Arg Xaa Arg Arg Xaa Arg Arg Phe Gln Ile Leu Tyr Arg Xaa His
1               5                   10                  15

Xaa His

<210> SEQ ID NO 92
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: ACETYLATION
<220> FEATURE:
<221> NAME/KEY: misc_feature
<222> LOCATION: (2)..(2)
<223> OTHER INFORMATION: X is bAla
<220> FEATURE:
<221> NAME/KEY: misc_feature
<222> LOCATION: (5)..(5)
<223> OTHER INFORMATION: X is bAla
<220> FEATURE:
<221> NAME/KEY: misc_feature
<222> LOCATION: (13)..(13)
<223> OTHER INFORMATION: X is bAla
<220> FEATURE:
<221> NAME/KEY: misc_feature
<222> LOCATION: (15)..(15)
<223> OTHER INFORMATION: X is bAla

<400> SEQUENCE: 92

Arg Xaa Arg Arg Xaa Arg Phe Gln Ile Leu Tyr Arg Xaa His Xaa His
1               5                   10                  15

Glu

<210> SEQ ID NO 93
<211> LENGTH: 16

```
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: ACETYLATION
<220> FEATURE:
<221> NAME/KEY: misc_feature
<222> LOCATION: (2)..(2)
<223> OTHER INFORMATION: X is bAla
<220> FEATURE:
<221> NAME/KEY: misc_feature
<222> LOCATION: (5)..(5)
<223> OTHER INFORMATION: X is bAla
<220> FEATURE:
<221> NAME/KEY: misc_feature
<222> LOCATION: (12)..(12)
<223> OTHER INFORMATION: X is bAla
<220> FEATURE:
<221> NAME/KEY: misc_feature
<222> LOCATION: (14)..(14)
<223> OTHER INFORMATION: X is bAla
<220> FEATURE:
<221> NAME/KEY: misc_feature
<222> LOCATION: (16)..(16)
<223> OTHER INFORMATION: X is bAla

<400> SEQUENCE: 93

Arg Xaa Arg Arg Xaa Arg Phe Gln Ile Leu Tyr Xaa Arg Xaa Arg Xaa
1               5                   10                  15

<210> SEQ ID NO 94
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: MOD_RES
<222> LOCATION: (1)..(1)
<223> OTHER INFORMATION: ACETYLATION
<220> FEATURE:
<221> NAME/KEY: misc_feature
<222> LOCATION: (2)..(2)
<223> OTHER INFORMATION: X is bAla
<220> FEATURE:
<221> NAME/KEY: misc_feature
<222> LOCATION: (5)..(5)
<223> OTHER INFORMATION: X is bAla
<220> FEATURE:
<221> NAME/KEY: misc_feature
<222> LOCATION: (13)..(13)
<223> OTHER INFORMATION: X is bAla
<220> FEATURE:
<221> NAME/KEY: misc_feature
<222> LOCATION: (15)..(15)
<223> OTHER INFORMATION: X is bAla
<220> FEATURE:
<221> NAME/KEY: misc_feature
<222> LOCATION: (17)..(17)
<223> OTHER INFORMATION: X is bAla

<400> SEQUENCE: 94

Arg Xaa Arg Arg Xaa Arg Phe Gln Ile Leu Tyr Arg Xaa His Xaa His
1               5                   10                  15

Xaa
```